Dec. 28, 1937.  T. CAHILL  2,103,766
SYNCHRONIZED SOUND AND PICTURE CONTROL
Filed Nov. 24, 1930  21 Sheets-Sheet 1
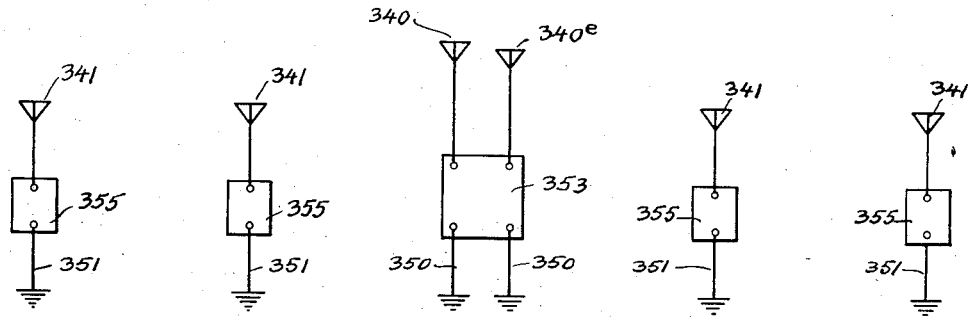
Fig. 1.
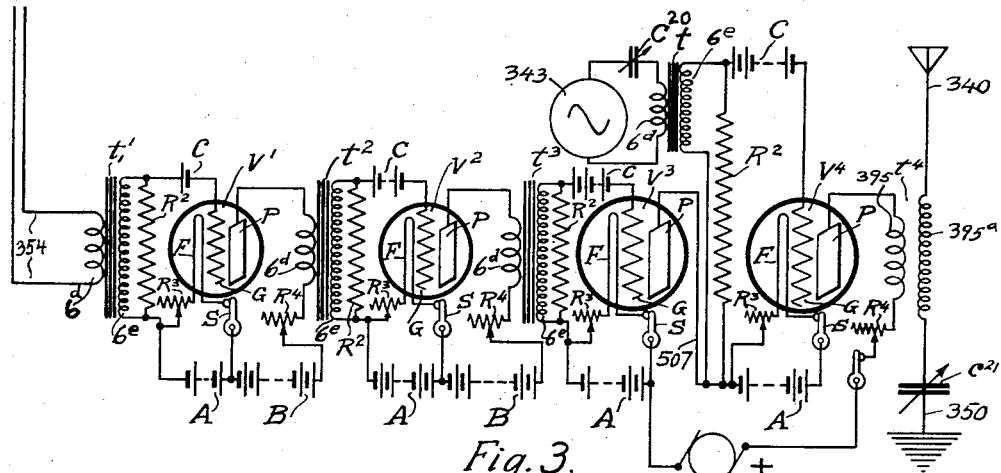
Fig. 3.
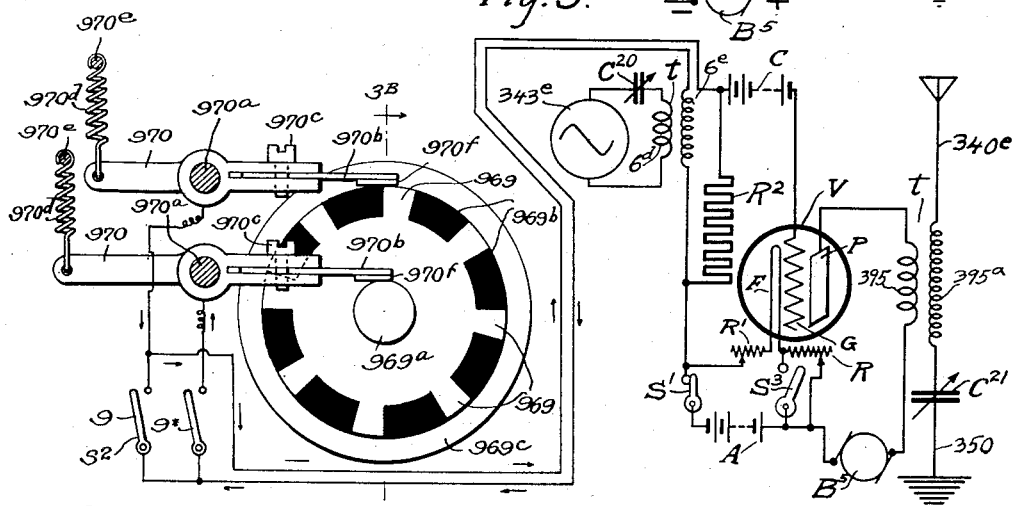
ATTEST:
Arthur T. Cahill
Mary H. Cahill
INVENTOR
Thadeus Cahill Dec. 28, 1937.   T. CAHILL   2,103,766
SYNCHRONIZED SOUND AND PICTURE CONTROL
Filed Nov. 24, 1930   21 Sheets-Sheet 2
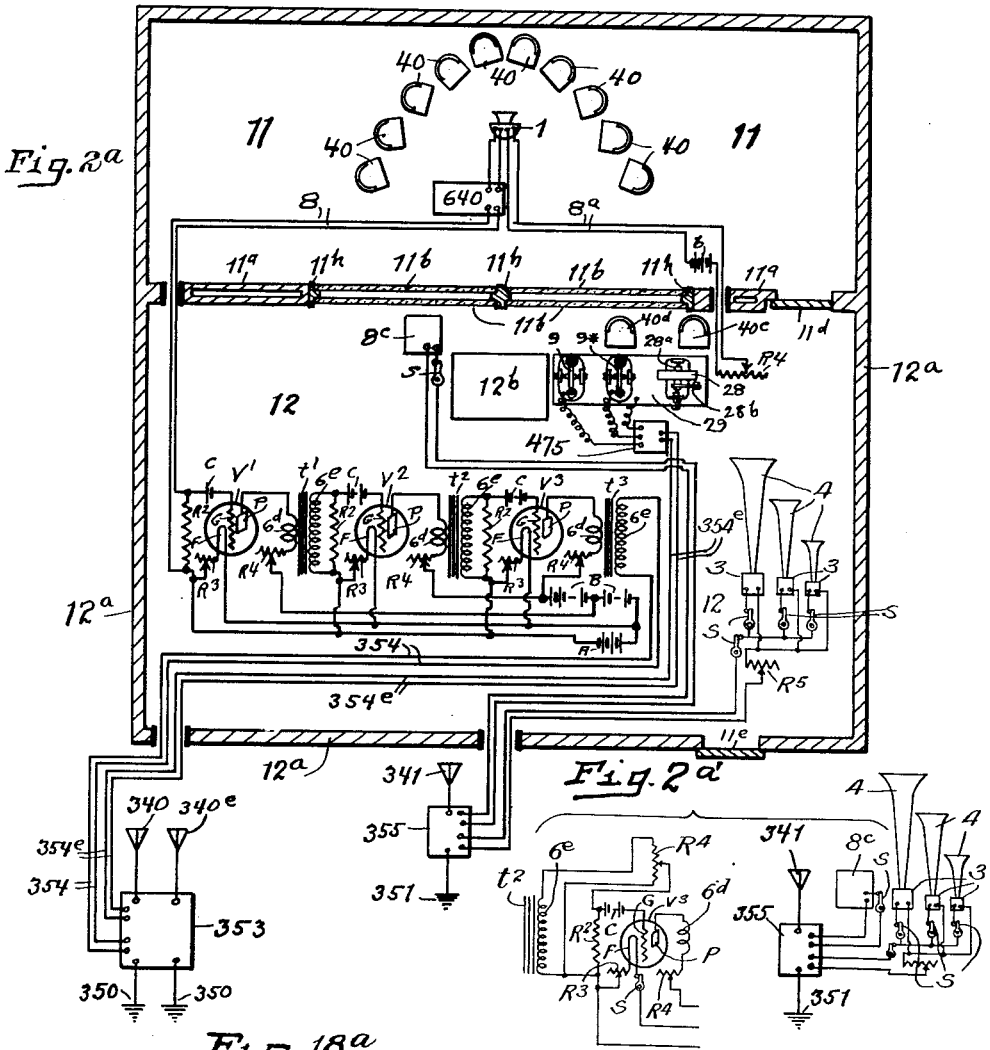
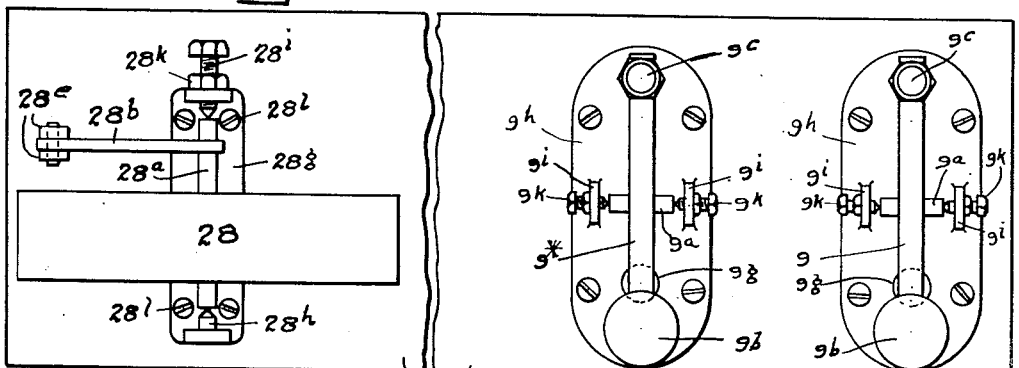

Dec. 28, 1937.                    T. CAHILL                    2,103,766
                    SYNCHRONIZED SOUND AND PICTURE CONTROL
                         Filed Nov. 24, 1930            21 Sheets-Sheet 3
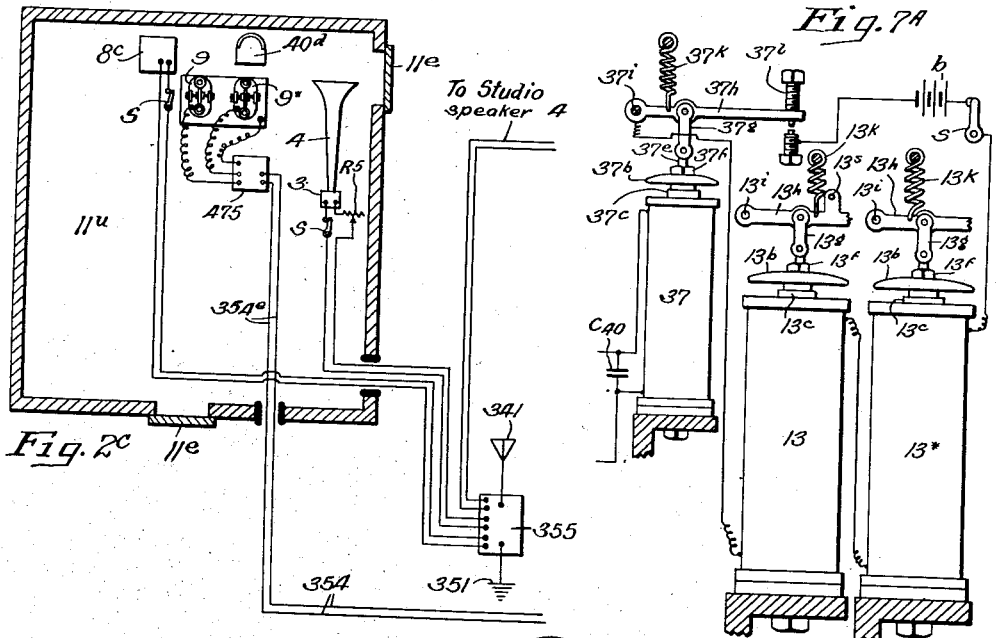
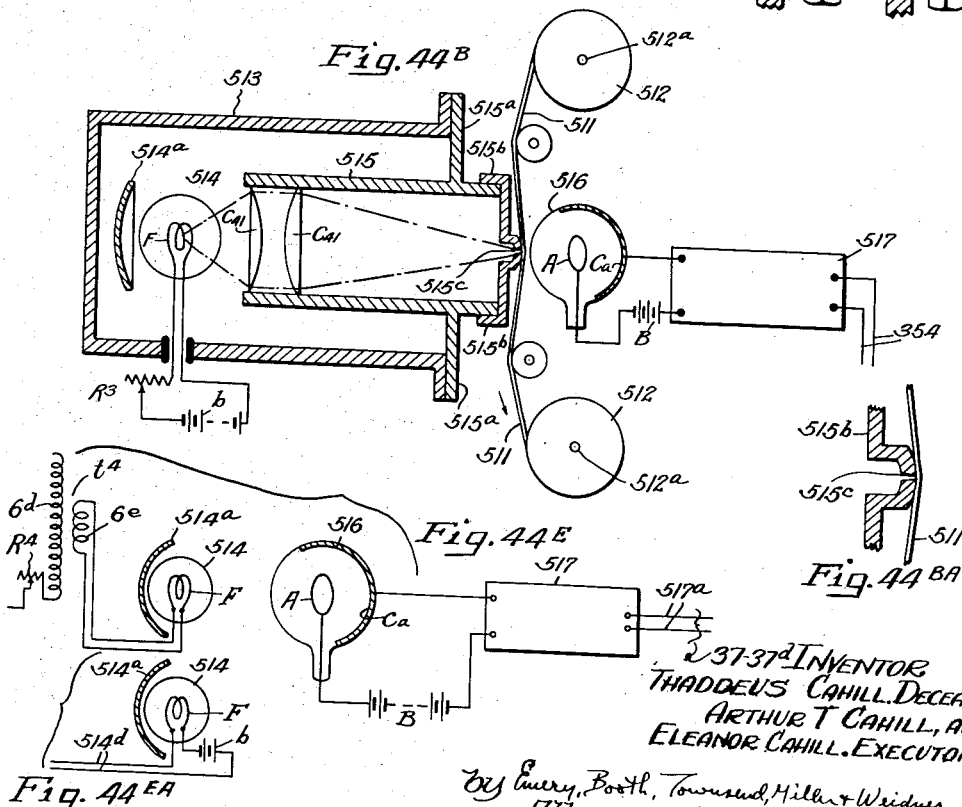

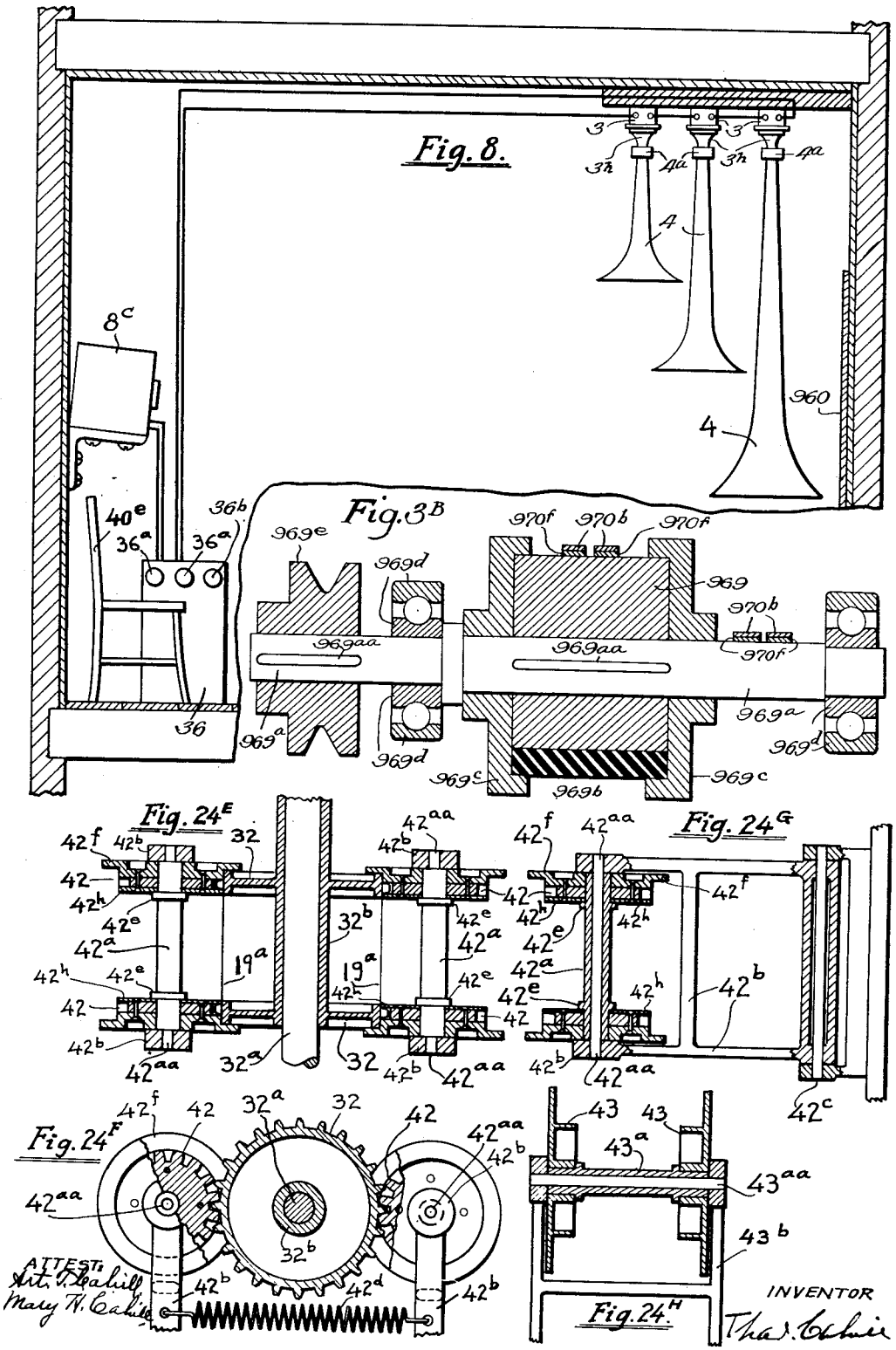

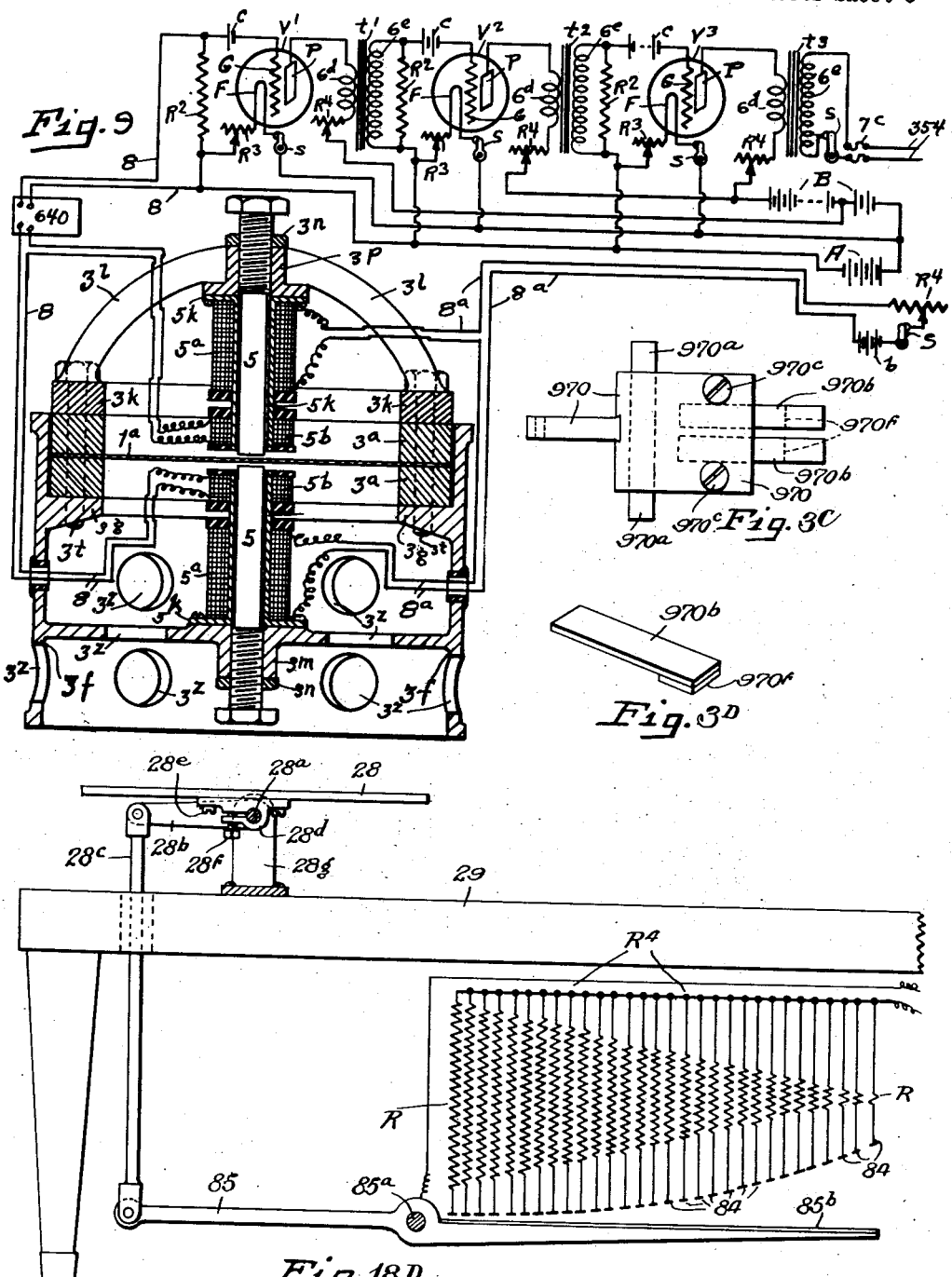

Dec. 28, 1937.    T. CAHILL    2,103,766
SYNCHRONIZED SOUND AND PICTURE CONTROL
Filed Nov. 24, 1930    21 Sheets-Sheet 6
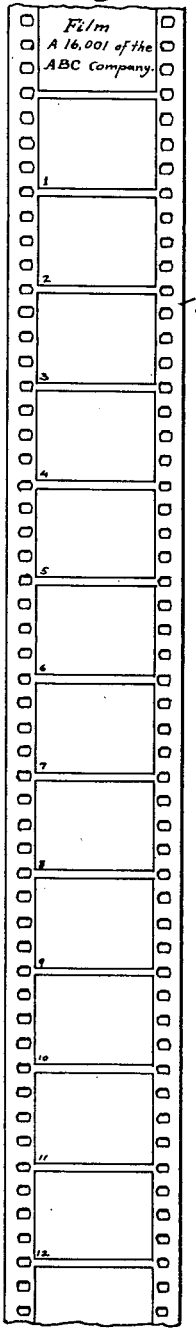
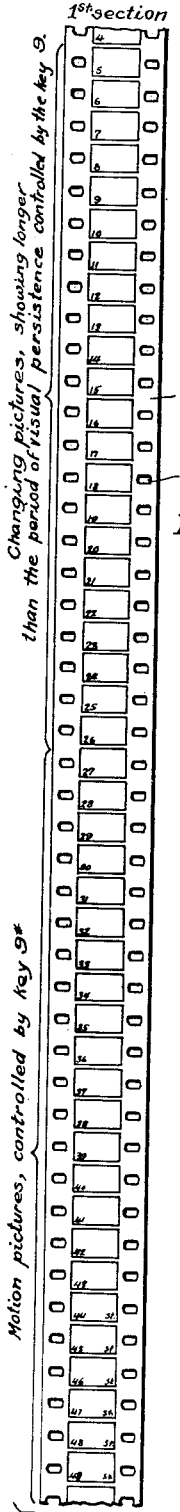
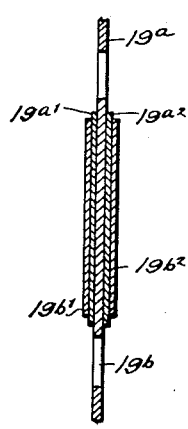
ATTEST:
Arthur T. Cahill
Mary H. Cahill
INVENTOR
Thos. Cahill Dec. 28, 1937.  T. CAHILL  2,103,766
SYNCHRONIZED SOUND AND PICTURE CONTROL
Filed Nov. 24, 1930  21 Sheets-Sheet 7
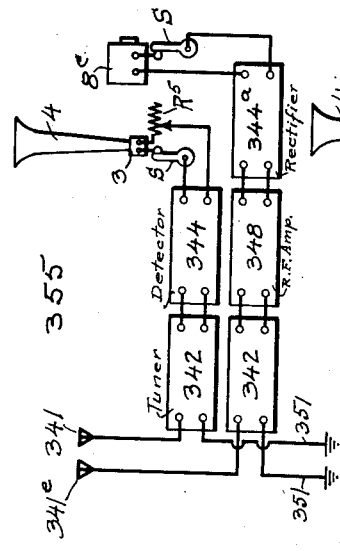
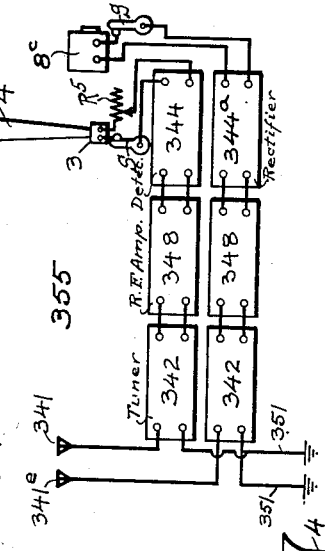
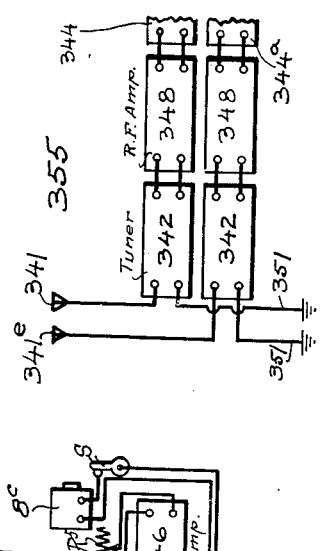
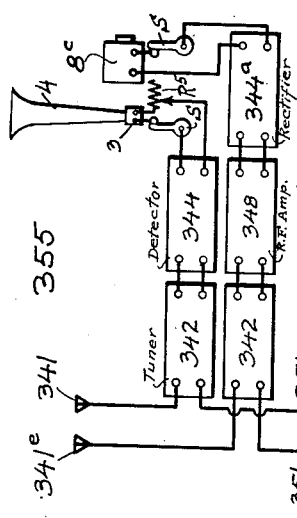
Fig. 4. Fig. 5. Fig. 6.
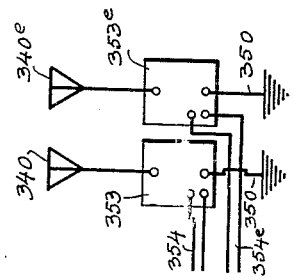
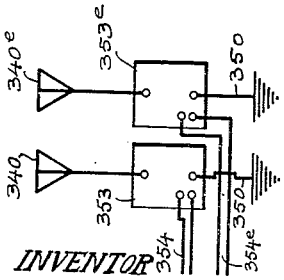

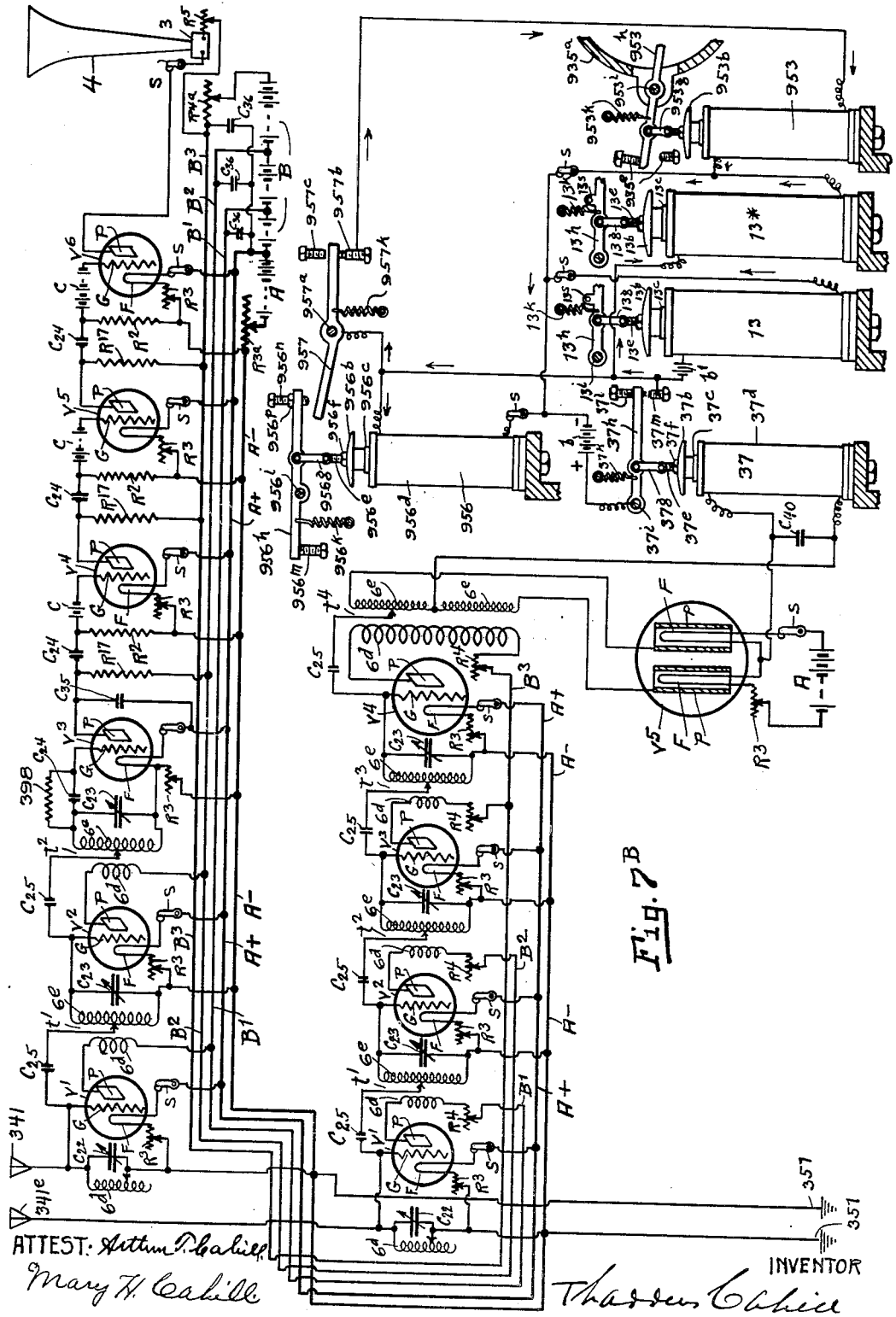

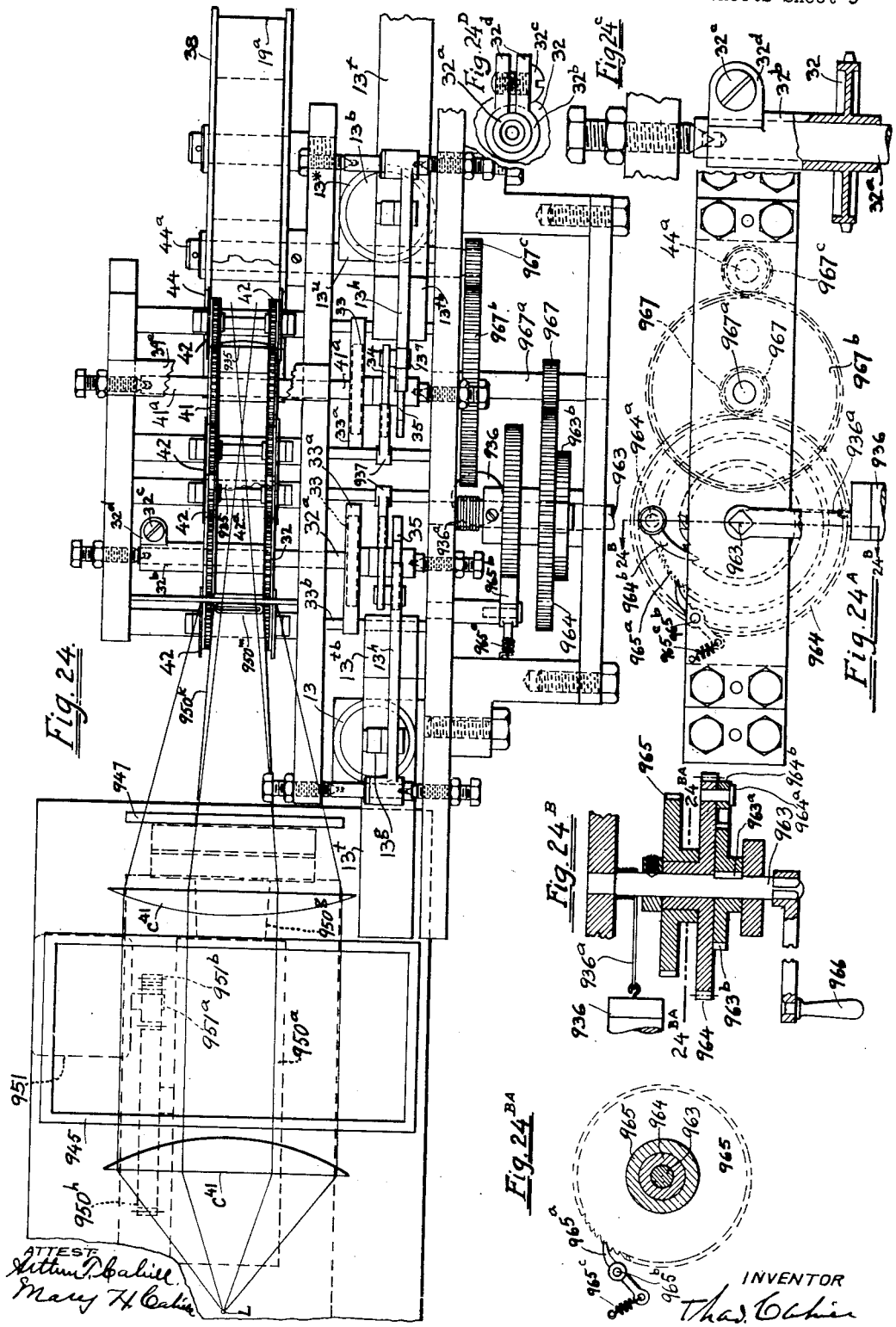

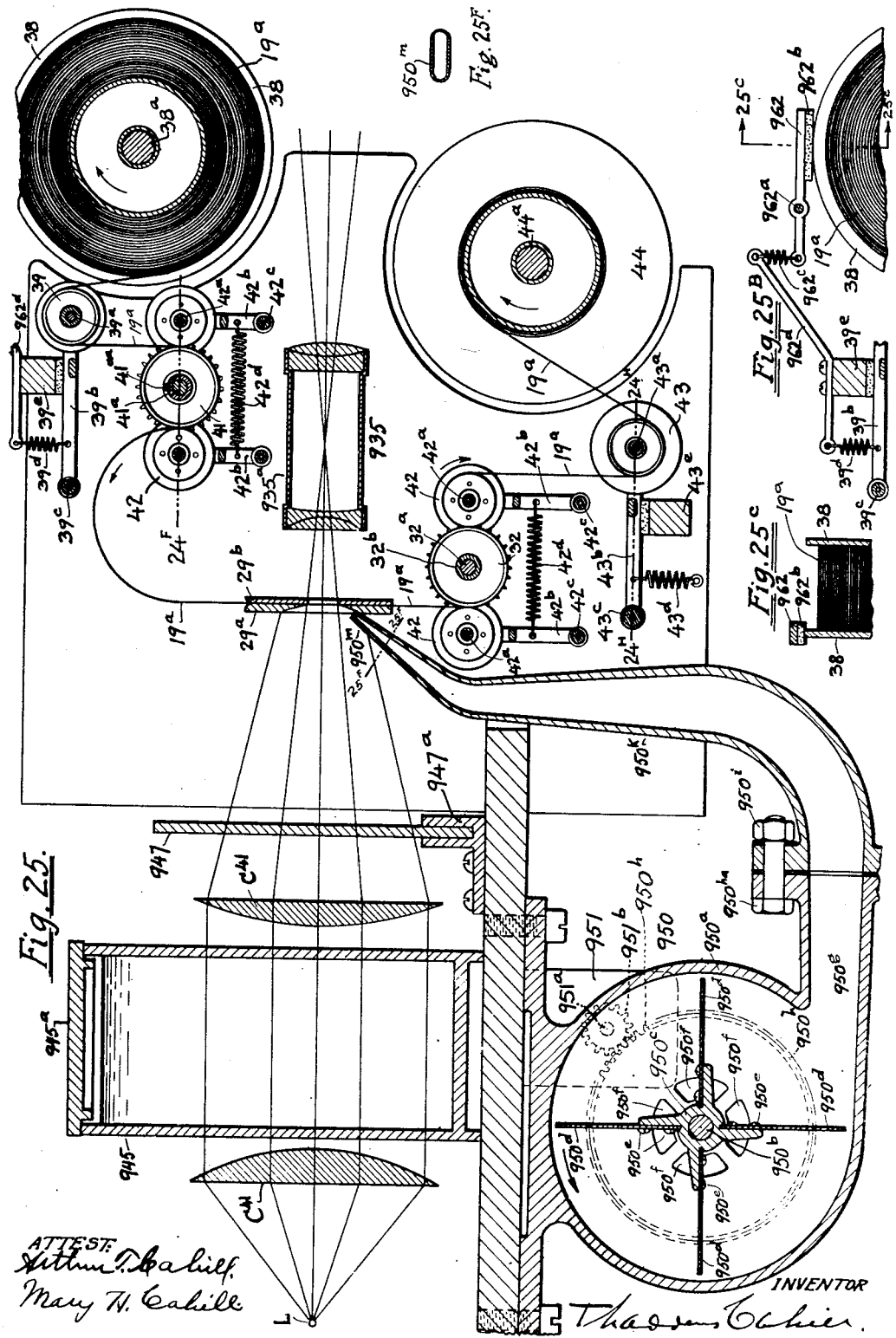

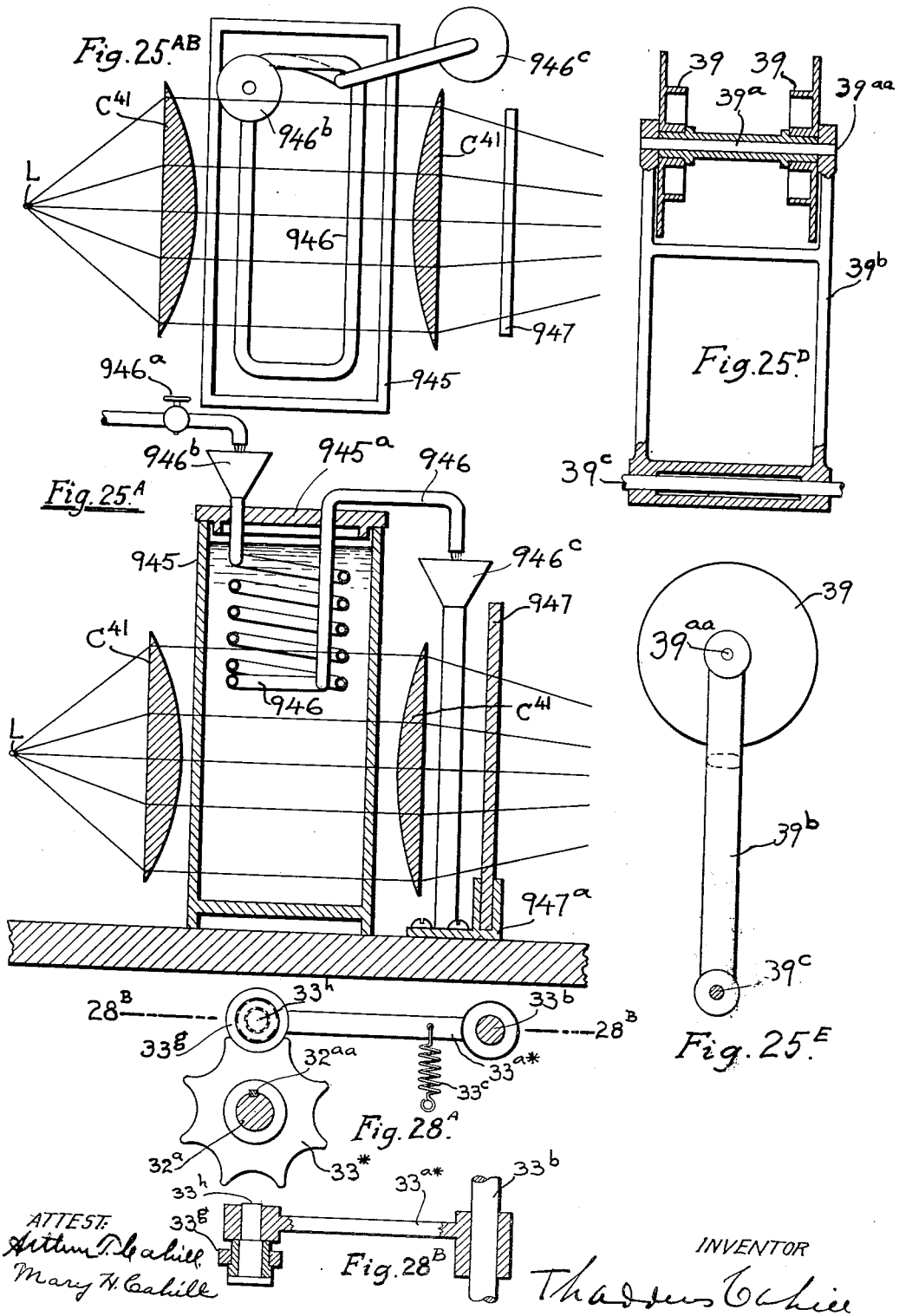

Dec. 28, 1937. T. CAHILL 2,103,766
SYNCHRONIZED SOUND AND PICTURE CONTROL
Filed Nov. 24, 1930 21 Sheets-Sheet 12

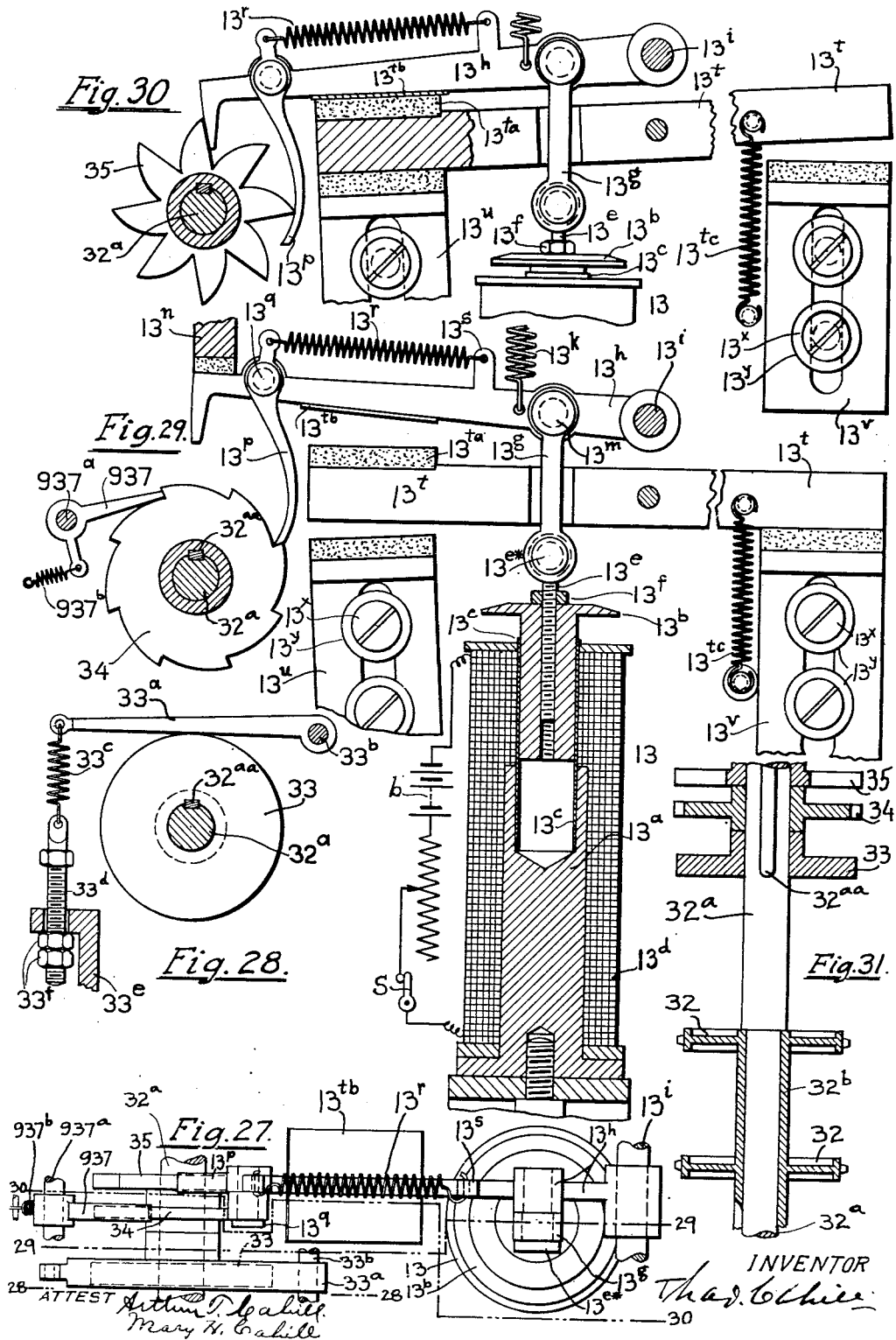

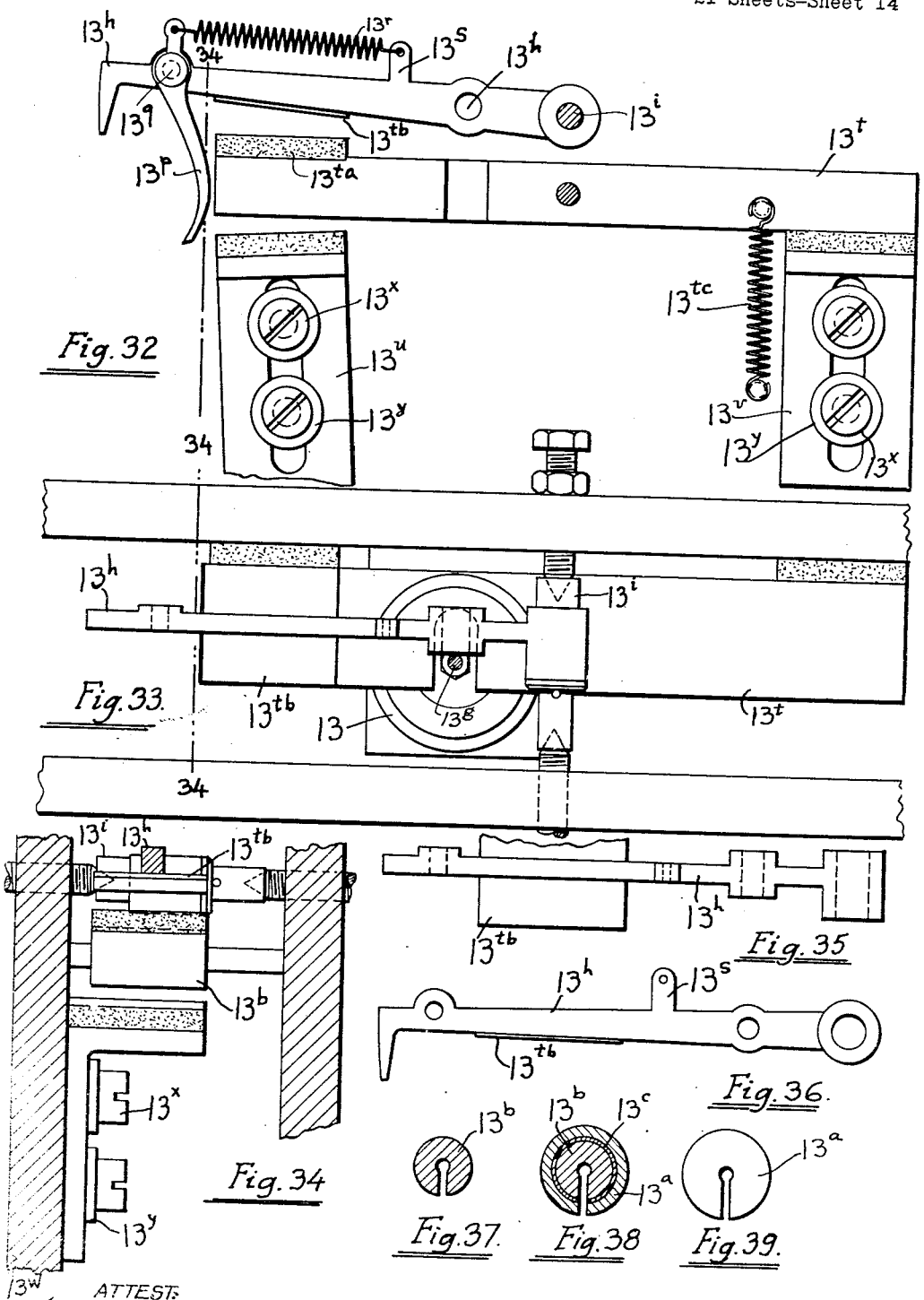

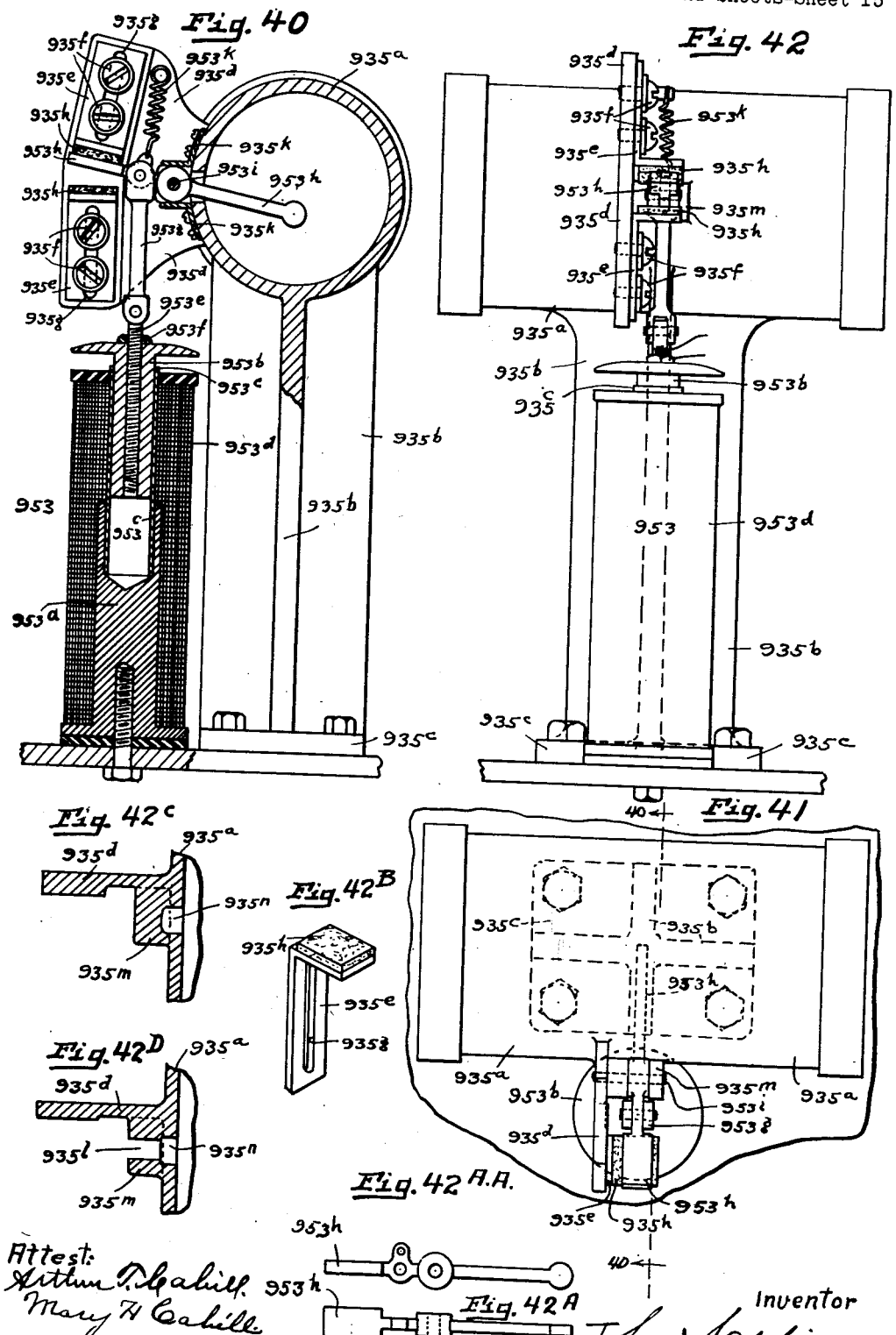

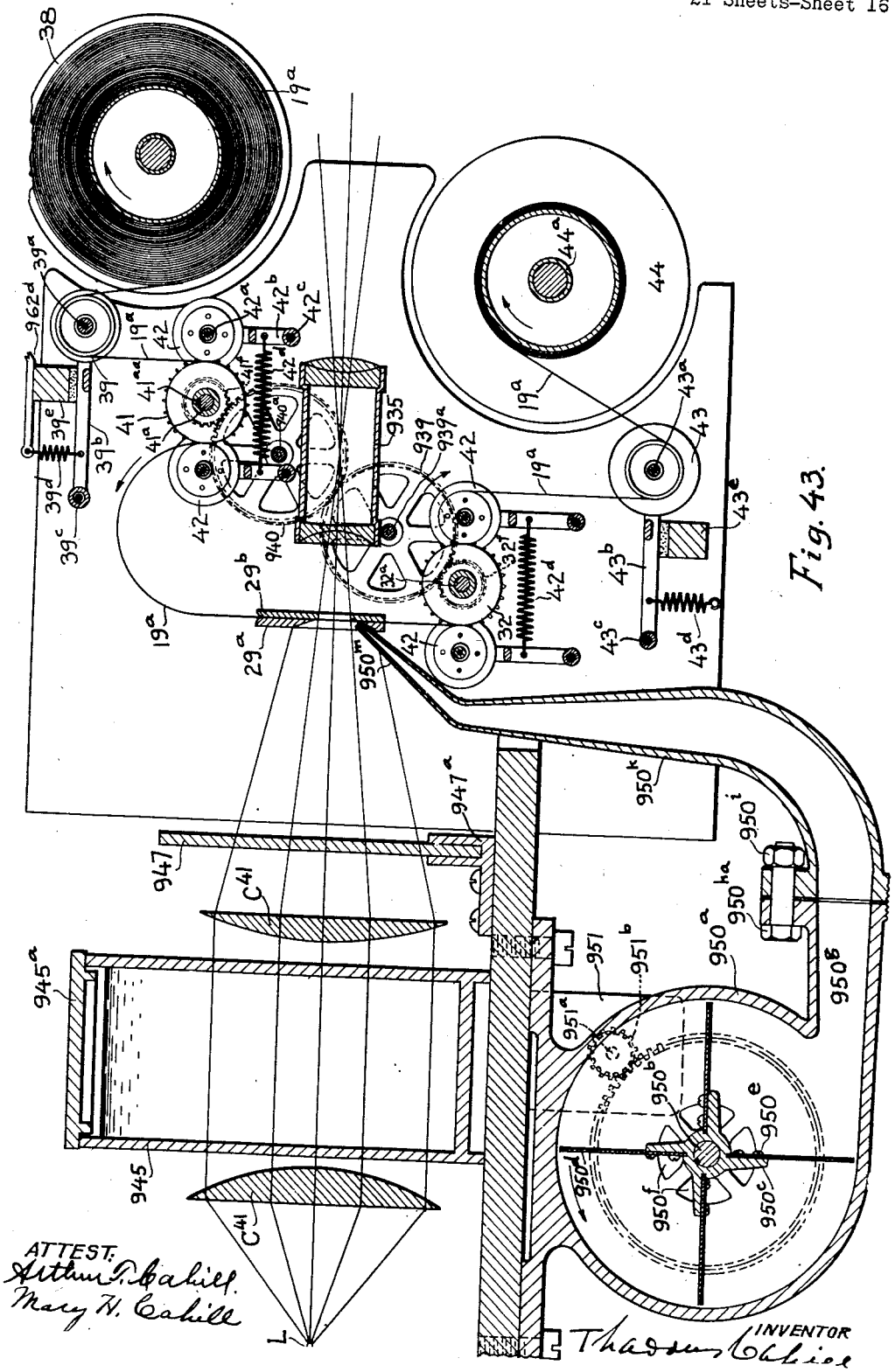

Dec. 28, 1937. T. CAHILL 2,103,766
SYNCHRONIZED SOUND AND PICTURE CONTROL
Filed Nov. 24, 1930 21 Sheets-Sheet 17

Dec. 28, 1937.　　　　　T. CAHILL　　　　　2,103,766
SYNCHRONIZED SOUND AND PICTURE CONTROL
Filed Nov. 24, 1930　　　21 Sheets-Sheet 19

Dec. 28, 1937. T. CAHILL 2,103,766
SYNCHRONIZED SOUND AND PICTURE CONTROL
Filed Nov. 24, 1930 21 Sheets-Sheet 20

*The curtain rises* ①

The interior of a dwelling, built around the trunk of a large ash tree, as a center. To the right, in the foreground is the hearth...

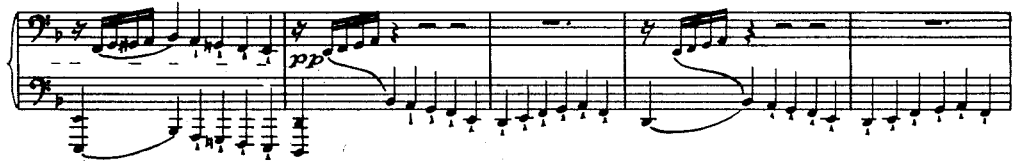

(The stage remains empty for a while; outside is a storm, which is subsiding.) *Siegmund opens the door from*

outside and enters ② He looks around the room: he seems to be worn out by overexertion;

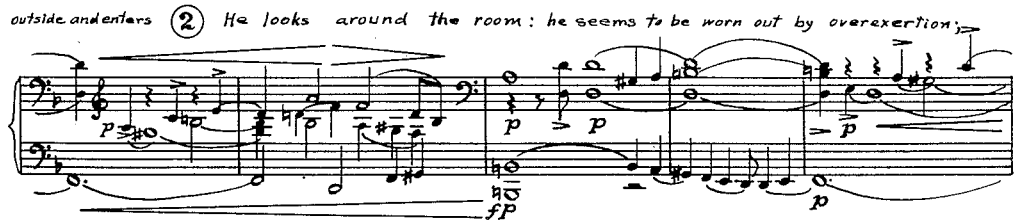

his clothing and appearance show that he is in flight. As he percieves no one, he closes

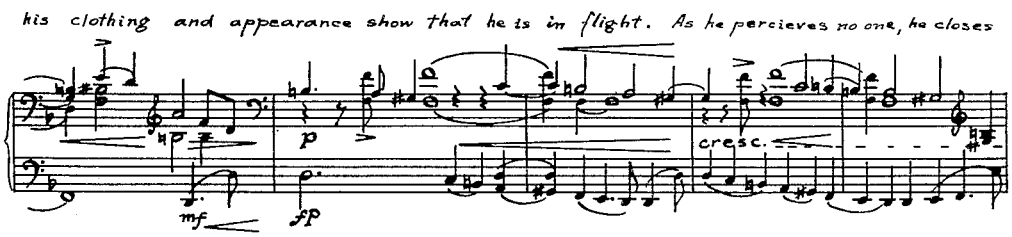

the door behind him, staggers like a man wearied to death to the hearth and throws himself down

ATTEST:
Arthur T. Cahill
Mary H. Cahill

*Fig. 44 D, part 1.*

INVENTOR
Thad. Cahill

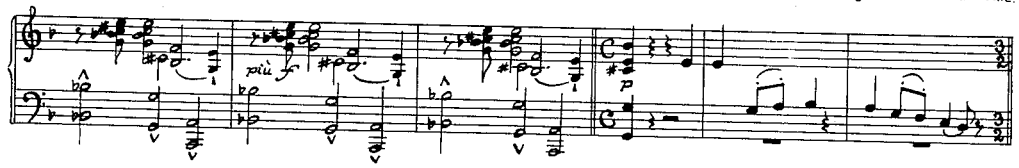
Fig. 44ᴰ, part 2.

Patented Dec. 28, 1937

2,103,766

UNITED STATES PATENT OFFICE 2,103,766

SYNCHRONIZED SOUND AND PICTURE CONTROL

Thaddeus Cahill, New York, N. Y.; Arthur T. Cahill, Eleanor Cahill, and George Frederick Cahill, executors of the estate of said Thaddeus Cahill, deceased Application November 24, 1930, Serial No. 497,794

73 Claims. (Cl. 250—6)

The principal object of my invention is to produce speech and music and also pictures which relate to the words spoken or sung, or to the subject matter to which those words refer, on many different premises simultaneously, controlled from a central station, and with the words and pictures duly synchronized. Otherwise stated, the principal object of my invention is to produce, at small cost, and with good quality, operas, operettas and other dramatic works, also lectures, readings and addresses, with pictures to illustrate the words spoken or sung or the subject to which those words relate, on many different premises at the same time, controlled from a central station, and with the words and pictures duly synchronized. Other objects of my invention will appear below.

In carrying out my invention, I transmit electrically from a central station to many subscribers, each on his own premises, words spoken or sung, and preferably also instrumental music to accompany these words; and also I furnish the subscribers with pictures relating to the words spoken or sung or relating to the subject to which such words relate; these pictures are preferably on films, though any other picture-carrier that is suitable for the purpose may be used; and, preferably, also, these pictures are, so far as practicable, in natural colors and of high grade; they are used in projecting machines on the subscribers' premises, which are controlled from the central station, so that they synchronize the pictures with the words to which they relate.

My process is described more in detail below, and essential features of it are set forth in the statement of claim at the end hereof. But here I may say, briefly and informally (and not as a statement of invention or of claim, which is made below, but as a brief and informal indication of what is developed more fully below) that by my process, in its preferred form, the lecture or address to be delivered, or the paper to be read, the play to be played, or the music to be sung, is prepared (in whole or in part) or selected, and then pictures of high grade, illustrative of matters and things belonging to the lecture, address, reading, or play aforesaid, or illustrative of matters or things which are referred to in such lecture, address, reading or play, are prepared, preferably (but not necessarily) in the form of a film, and preferably also, so far as is practicable, in natural colors. These pictures are copied by any suitable process for copying films or pictures; and the copies thus produced (or it may be copies of these copies) are distributed to the subscribers in advance of the electrical distributing of the lecture, address, reading, opera, play or other words or music to which they belong. These films are preferably marked with numbers or with words, letters, or other marks or signs, for purposes of identification, before they are distributed to the subscribers. Projecting machines of a simple character and of a kind that are adapted to be controlled electrically from the central station are provided on the subscribers' premises, for use in projecting on to a screen the pictures aforesaid. When the electrical distributing of the lecture or address, or reading or play, or of the opera or other music is about to begin, the appropriate film, suitably identified, (as, for example, by numbers, words, letters, marks, et cetera) is, conformably to directions that are suitably transmitted from the central station, placed by each subscriber who cares for it, in a suitable picture-projecting machine, on his premises, and this machine is then operated, preferably, from the central station, in suitable synchronism with the lecture, address, reading, words or music that is distributed electrically from that station.

My process or system, to the best of my knowledge, differs from all previous processes or systems of distributing dramatic effects or words of any sort from a central station in the matter of providing picture-projecting machines on the subscribers' premises, which are adapted to be controlled from the central station, and in preparing films that are so much smaller and cheaper and, in respect of fire-risk, safer than motion picture films that they are suitable for the use of residence subscribers in their houses; distributing these films bodily to the subscribers before the lecture, address, reading, play or other performance, with which they are to be used; putting said films into the subscribers' projecting machines, preferably, before the distributing of the related words or music, and then controlling these projecting machines from the central station in such a manner as to harmonize and synchronize the pictures produced on the subscribers' premises with the words and music that are distributed from such central station.

It has been proposed heretofore to operate a plurality of motion picture machines in different places in synchronism with each other, and in some cases, to transmit music from a central station to the branch stations. See for example the patents to Hatfield, No. 1,352,126, dated September 7, 1920; Stock, No. 1,786,368, dated December 28, 1930; and Perry, No. 1,733,165, dated October 29, 1929.

My invention, in its preferred form, differs widely from such systems for synchronizing motion picture machines. The pictures used in my system may, indeed, at times, be what are called motion pictures; that is, pictures which follow each other at such brief intervals of time that the successive pictures, illustrating objects in motion, show such motion to the onlooker. Motion pictures, with the apparatus for producing the films and projecting the pictures are now well known. They have very great advantages; but they have also great disadvantages, or handicaps, of which I shall mention one only, namely, that a great number of these pictures is required for an evening's entertainment, or even for an hour's entertainment. Usually, in New York city picture houses, twenty-four or more pictures are displayed per second, which makes 1440 pictures per minute or 86,400 per hour. This, for some of the great dramatic works (for example Wagner's Die Walkuere, or Die Meistersinger, produced without cuts or abbreviations) and lasting say about four hours, would be, say 345,600 pictures. This great number of pictures would be, in most cases, if not in all, impracticable for residence subscribers, by reason of the cost, bulk and fire-risk which the film, for so great a number of pictures, would involve.

I meet this difficulty by using motion pictures for brief intervals of time only and using for most of the work and for most of the time (and in many cases for all of it), my system of changing pictures, which, briefly and informally stated, differs from moving pictures in this—

(a) That instead of showing a great number of pictures in an hour, as with moving pictures, a much smaller number is shown.

(b) That instead of the pictures moving through the gate with such rapidity that a moving scene is reproduced, the pictures shown for the most of the time (if not for all of it) are still pictures, or relatively still pictures.

(c) That preferably, efficient heat-absorbing devices are provided, as described below, arranged to intercept the heat from the pictures and to cool the film while allowing the light to pass to it, whereby I make it practicable to keep a particular picture or "frame" standing in the gate (and showing on the screen) for a much longer period of time than in moving pictures—for as long, indeed, as such picture can be usefully there.

(d) In that the difference between one of my changing pictures and the picture or frame next preceding or following it on the film, is ordinarily quite substantial, while with moving pictures, the difference between one picture or frame and the picture or frame next preceding or following it on the film, is very small; is usually so small that it can only be discovered by a close comparison of the pictures; is usually so small, as before said, that the change from one picture or frame to the next is recognized by the eye only as part of a continuous movement or gradual change, and not as a different picture. With my changing pictures, on the contrary, the successive pictures or frames are ordinarily different pictures in some substantial particular, and easily recognized as such, although, in respect of the background and most of the scene, they may be exactly alike. But the very essence of motion pictures is to make the difference between one picture and the next so small that it will not be felt by the eye as an abrupt change; but if felt as a change at all, it is so felt only as a part of a changing scene, or a changing movement, gesture or expression, facial or otherwise.

(e) Motion pictures are displayed, each picture or frame for a period of time not longer than the time of visual persistence and usually for a much smaller period of time; but with my changing pictures, each picture, in general, is displayed for a time-interval, which is several times or more frequently many times the time of visual persistence—sometimes hundreds of times as long as the time of visual persistence.

(f) In that my pictures are preferably moved through the gate at irregular intervals of time, depending upon the circumstances of the case, sometimes rather rapidly, often very slowly; one picture standing in the gate, it may be for a second or two only while another picture, in the same series, and perhaps quite close to the first, may stand in the gate and be exhibited on the screen for many seconds or even for a minute or more.

By these means I reduce greatly the number of pictures required for an hour's entertainment and also reduce greatly the cost of the films required and the fire-risk attendant upon their use.

(g) My preferred process and apparatus, described below, for changing the pictures on the subscribers' premises, by a control exercised from the central station differs widely from the means for synchronizing the shafts of two motion picture machines so that they will run with exactly the same angular velocity, as set forth in the patents to Hatfield, Stock and Perry above cited, and other similar devices.

Preferably my changing pictures, as before stated, are produced, so far as practicable, in natural colors or in a close approximation to them, and often (as in stage painting) with an interesting background, and as my changing pictures are much less numerous than motion pictures, preferably, I make them of high grade, as artistic and interesting as practicable, so as to compensate in a considerable measure by the goodness of the pictures for the smallness of their numbers.

My improved process and apparatus may be used in divers ways, that are more or less different. The process itself may be varied in some particulars, and the apparatus may be greatly varied without departing from certain of the most essential features of my invention. In particular, to give one illustration only, I may broadcast and receive the words and music in the manner that is now generally practiced in the broadcasting art, or I may broadcast and receive the words and music by processes and apparatus of my own.

The drawings include only figures numbered as follows: 1, 2ᵃ, 2ᵃ', 2ᶜ, 3, 3ᴮ, 3ᶜ, 3ᴰ, 3ᴳ, 3ᴴ, 3ᴵ, 4, 5, 6, 7ᴬ, 7ᴮ, 8, 9, 18ᵃ, 18ᴰ, 24, 24ᴬ, 24ᴮ, 24ᴮᴬ, 24ᶜ, 24ᴰ, 24ᴱ, 24ᶠ, 24ᴳ, 24ᴴ, 25, 25ᴬ, 25ᴬᴮ, 25ᴮ, 25ᶜ, 25ᴰ, 25ᴱ, 25ᶠ, 26, 27, 28, 28ᴬ, 28ᴮ, 29 to 41 inclusive, 42, 42ᴬ, 42ᴬᴬ, 42ᴮ, 42ᶜ, 42ᴰ, 43, 44, 44ᴬᴬ, 44ᴮ, 44ᴮᴬ, 44ᶜ, 44ᴰ (part I), 44ᴰ (part II), 44ᴱ, 44ᴱᴬ.

Fig. 1 is a diagrammatic view, showing symbolically a central station 353 and a plurality of receiving stations or subscriber's stations 355, 355, fed from it.

There is no figure bearing the plain number 2, without a following letter.

Fig. 2ᵃ is a diagrammatic view, showing my music studio, with means as hereinafter described for broadcasting words, whether spoken or sung, instrumental music, and also picture-control, to the premises of subscribers, the broadcasting station being indicated as 353 and the subscribers' station as 355. In this instance two picture-controlling keys 9 and 9* are illustrated, either or both of which may be employed. One of these keys, the key 9, serves to change the pictures on the subscribers' premises, one picture at a time, each time said key 9 is depressed, while the other key 9* brings into action an automatic current-interrupter, to change the pictures rapidly, so long as such key 9* is held down by the operator.

Fig. 2ᵃ' illustrates a different arrangement for volume control.

Fig. 2ᶜ is a diagrammatic view, showing a form of apparatus which is, in general, similar to that shown in Fig. 2ᵃ, but which differs from the apparatus of Fig. 2ᵃ in that another room 11ᵘ, which is kept almost dark, is furnished for the picture-control operator with his seat 46ᵈ, his controlling keys 9 and 9*, his picture projecting machine 8ᶜ, his picture screen 860, etc., his loud speaker 3, 4, by means of which he hears the words and music that are being broadcast from the central station, and with which his pictures are synchronized. The room 11ᵘ may well be located in proximity to the rooms 11 and 12 of the music studio, but it may, if desired, be located more or less remote from them, so long as the picture-control operator hears the words and music broadcast from the central station, and so is in a situation to synchronize with said words and music, the pictures which he controls. Further, in order to obtain two waves to work on, one for broadcasting the words and music and the other for broadcasting picture control, two stations may at times work together, the words and music being broadcast from one station on one wave, and the picture control from another station on another wave, as shown in Fig. 44ᴬᴬ. And the picture-control operator, in such case, may well be located either at one station or the other, or between the two stations, so long as his controlling keys (9, 9*, et cetera) are suitably connected electrically with the broadcasting apparatus which they control. This may well be done, although the control room 11ᵘ and the broadcasting station are miles apart, by connecting the control-operator's keys 9 and 9* with the switch $s^2$ at the broadcasting station through the electro-magnet 10, and an electrical circuit belonging to it, as shown, for example, in Fig. 44ᴬᴬ and others.

Fig. 3 is a diagrammatic view, illustrating the amplifying and modulating circuits of the broadcasting station—or at least so many of the amplifying circuits as are not shown in Fig. 2ᵃ;

Fig. 3ᴮ is a detail, a sectional view, partly in elevation, on the line 3ᴮ, 3ᴮ in Fig. 3;

Fig. 3ᶜ is a detail, a top-plan view of one of the brush-holders, 970, with its brushes 970ᵇ.

Fig. 3ᴰ is a detail, in perspective, showing one of the brushes or contact springs, 970ᵇ, removed from its brush-holder 970.

Fig. 3ᴳ is a schematic view, illustrating my picture-film, with certain marks thereon which are hereinafter explained.

Fig. 3ᴴ is a schematic view, illustrating a portion (two consecutive sections, in the drawings) of my picture film, having parts of the same serving for my changing-pictures, which are fed rather slowly, so that each shows on the screen for a period of time greater (usually much greater) than the time of visual persistence, and other parts of the same film which serve for motion pictures, that are fed through the projection machine comparatively rapidly, so that each frame or picture shows on the screen for a period of time less than the time of visual persistence, thereby producing motion-picture effects. The meaning of this figure is made clearer by the legends affixed to it. The two sections of the film shown in the figure, marked 1st section and 2nd section, follow each other consecutively. They are placed in parallel on the paper, because the sheet is not long enough to place them in line, as they should be.

Fig. 3ᴵ is a diagrammatic section, through my changing-picture film 18ᵃ, made to show symbolically the pictures in natural colors. Fig. 3ᴵ shows the positive stock coated on both sides, so that one side of the film is availed of for one color (say orange-red) and the other side of the same film is availed of for a reverse but registering image, in another color, as blue-green, as in the technicolor or Mejia process, described in Letters Patent to him, No. 1,174,144, dated March 7, 1916.

Figs. 4, 5 and 6 are schematic views, illustrating the central-station broadcasting devices (marked 353 and 353ᵉ) the first serving for the broadcasting of words and music, and the second serving for the broadcasting of picture-control, with radio-receiving apparatus on the premises of the subscribers, fed by said broadcasting devices. These figures are described more at length below.

There is no figure bearing the plain number 7 without a following letter.

Here I may say that either a single receiving antenna, or a plurality of receiving antennas may be employed, at a subscriber's station, in practicing my invention, and that sometimes one of these arrangements is shown in the drawings, and sometimes the other. Thus, in Figs. 1, 2ᵃ, et cetera, a single receiving antenna is shown for each subscriber's station, but in Figs. 4, 5, 6, 7ᴮ, et cetera, a plurality of receiving antennas are shown. The reader will understand that each mode of working is practicable, and that either mode may be used.

Fig. 7ᴮ is a schematic view, illustrating one arrangement of circuits for a radio receiving apparatus, for receiving speech and music, and also for receiving picture-controlling impulses which are made effective, as by electro-magnets such as 37, 13 and 13*, to operate the picture-projecting apparatus on the subscribers' premises, hereinafter described and shown more in detail in Figs. 24 to 43, said Fig. 7ᴮ illustrating resistance couplings for the vacuum tubes between the detector tube $v^3$ and the speaker 3, 4 although in other instances transformer couplings may be used for the purpose, and said Fig. 7ᴮ including a shutter-controlling apparatus which, with its electro-magnet 953 seen at the lower right hand corner of Fig. 7ᴮ serves to cut off the latter from the screen while the picture is being changed.

Fig. 7ᴬ illustrates a modification of a portion of the system of Fig. 7ᴮ.

Fig. 8 is a sectional view, partly in elevation and largely diagrammatic, illustrating the interior of a subscriber's room, with apparatus as 36, 3 and 4 shown symbolically in such room for receiving speech and music by radio, and also apparatus 8ᶜ for displaying pictures, controlled by radio, in agreement with the words or music that are being broadcast from the central station, and with radio-control knobs, 36ᵃ and 37ᵃ, in a convenient position, to be operated by the subscriber, while seated in his chair 40ᵉ, listening to the words and music, and looking at the pictures.

Fig. 9 is a sectional view, partly in elevation, showing, for use in practicing my invention, an inductive telephonic transmitter or electrical pickup, acting, by electro-magnetic induction, to convert sound waves into electrical vibrations of similar wave form, and showing such pickup connected with a vacuum-tube amplifier, whose input circuit is fed from the pickup aforesaid, and whose output circuit 354, feeds the broadcasting or other vibration-distributing apparatus.

There are no figures numbered 10 to 17 inclusive or 18 (without a letter following). Figs. 18ᵃ and 18ᴰ follow numerically after Fig. 9.

Fig. 18ᵃ is a top plan view of the table 29, in the control-room 12, at which the monitor or control operator or supervising musician (all of which are different names for the same person) of the words and music broadcast, sits, in his chair 40ᶜ (Figs. 2ᵃ and 44ᴬᴬ) to operate his control-lever 28, aforesaid; and at which, also, the picture-control operator sits, in his chair 40ᵈ, to operate his key or switch 9, shown in the drawings as like an old-fashioned telegraph key, but which may be of any suitable sort or kind whatever. These keys or switches 9, 9* control, either directly or thru a motor-operated switch or circuit-breaker, the circuit, by acting on which, as hereinafter described, picture-controlling impulses are broadcast from the central station to the houses of subscribers.

Fig. 18ᴰ is a view, partly schematic, illustrating one form of expression rheostat, including a controlling lever or handle 28 for the same.

There are no figures numbered 19 to 23 inclusive.

Figs. 24 to 44 illustrate one of my electrically-controlled projection apparatuses, for projecting, on the premises of the subscriber, (and, also, preferably, at the central station, or at least in the studio where the picture-control operator is located) pictures, relating to the lecture, talk, reading or address, or to the play, opera, operetta or other dramatic work which is being broadcast, suitably synchronized with the words and music that are broadcast from a central station. Of these—

Fig. 24 is a top plan view, partly diagrammatic, illustrating my electrically-controlled projecting machine, for use on the premises of the subscribers. Also, preferably, one of these machines (shown symbolically and marked 8ᶜ in the schematic views, as Figs. 2ᵃ, 2ᶜ, 4, 5, 6, 8, et cetera) is provided at the music studio, as stated above and as described more at length below.

Fig. 24ᴬ is a detail view, a side elevation, illustrating the driving mechanism for the take-up roll 44.

Fig. 24ᴮ is also a detail view, partly in section, partly in elevation, with the section through the center of the driving-shaft 963, in Figs. 24 and 24ᴬ (but with said shaft 963 shown in elevation), showing the ratchet-wheel 963ᵇ, keyed to said shaft and the gear 964, loose on said shaft, but driven by the ratchet-wheel 963ᵇ, through the pawl 964ᵇ.

Fig. 24ᴮᴬ is a detail view, partly in section, partly in elevation, on the line 24ᴮᴬ, 24ᴮᴬ, in Fig. 24ᴮ.

Fig. 24ᶜ is a detail view, showing in plan, on a larger scale, than the scale of Fig. 24, a portion of the mechanism shown in said Fig. 24; namely, one of the sprocket-wheels 32, with its tightenable sleeve 32ᵇ.

Fig. 24ᴰ is a detail, an end elevation, viewed from the left of the sprocket-wheel 32ᵃ and sleeve 32ᵇ, and showing also a portion of one of the sprocket-wheels 32, the major portion of which is broken away.

Fig. 24ᴱ is a detail, a top-plan view, largely in section, showing one arrangement of the sprocket-wheels 32, 32, and the wheels, 42, 42, that bear against them to hold the film 19ᵃ in engagement with said sprocket-wheels.

Fig. 24ᶠ is a detail view, partly in cross-section, and partly in elevation, in a plane at a right angle to the plane of the preceding figure, through one of the sprocket-wheels 32 and the wheels or rolls 42, on each side of it, showing one set of details of construction for these parts.

Fig. 24ᴳ is a detail view, partly in elevation and partly in section, in a plane at a right angle to the plane of the two preceding figures, showing one of the frames 42ᵇ (pivoted at 42ᶜ) for mounting a pair of the wheels or rolls 42, which engage with the sprocket-wheels 32, 32.

Fig. 24ᴴ is a detail view, partly in section, partly in plan, showing a pair of the wheels or rollers 43, 43 (over which the film 19ᵃ passes, on its way to the take-up roll 44) with the frame 43ᵇ, in which the shaft for said wheels 43, 43, is mounted; but with a portion of said frame 43ᵇ near to its shaft or center 43ᶜ, broken away, for lack of space on the sheet.

Fig. 25 is a sectional view, partly in elevation and partly diagrammatic, on the line 25, 25, in Fig. 24, and looking towards the top of the sheet, as indicated by the arrows in said Fig. 24.

Fig. 25ᴬ is a detail view, a section, partly in elevation, showing a worm 946, in the water-cell 945. Water is passed through this worm to cool the water in said water-cell.

Fig. 25ᴬᴮ is a plan view, partly in section, showing said water cell 945 and worm 946.

Fig. 25ᴮ is a detail view, in sectional elevation, illustrating a portion of the mechanism belonging to the apparatus of Fig. 25, and lying at the upper right-hand corner thereof, which is not seen in Fig. 25, on account of the limitations in size of the official sheet; namely, the upper part of the pay-off roll 38, and the frictional brake 962, 962ᵇ, for said pay-off roll.

Fig. 25ᶜ is a detail view, in section, on the line 25ᶜ, 25ᶜ, in Fig. 25ᴮ.

Fig. 25ᴰ is a detail, a plan view, partly in section, showing the rolls 39, 39, mounted in the frame 39ᵇ; one of these rolls is seen in elevation at the upper right hand corner of Fig. 25, but they are shown on a larger scale in Fig. 25ᴰ.

Fig. 25ᴱ is a detail view, a side elevation of the frame 39ᵇ and roller 39, seen in plan in Fig. 25ᴰ and in side elevation (and partly in section) but on a smaller scale in Fig. 25.

Fig. 25ᶠ is a cross sectional view of the cooling nozzle, on the line 25ᶠ—25ᶠ of Fig. 25.

Fig. 27 is a detail view, in plan, showing on a somewhat larger scale, a portion of the mechanism seen in Fig. 24, namely, the electro-magnet 13, and the connecting parts for giving motion to the sprocket wheels 32, 32, by which the film 19ᵃ is fed through the gate 29ᵃ.

Figure 26:
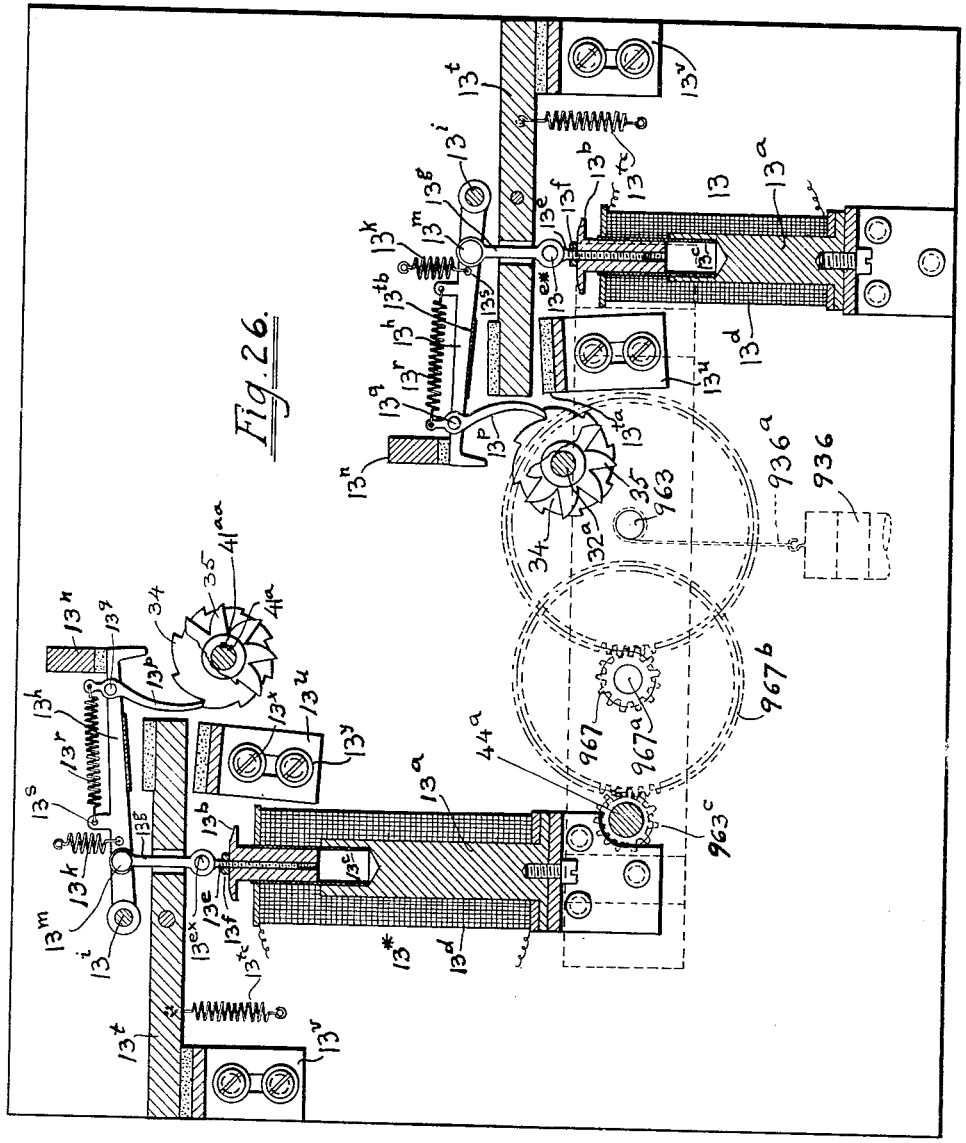
Fig. 26 is a detail view, partly in section, partly in elevation, and largely diagrammatic on the line 26, 26, in Fig. 24, and looking towards the bottom of the sheet as indicated by the arrow in said Fig. 24.

Fig. 28 is a detail sectional view, in elevation, on the line 28, 28, in Fig. 27, showing the check wheel 33 keyed to the sprocket-wheel shaft 32ª, with the friction lever 33ª, which serves, with the check wheel 33 aforesaid, to prevent the sprocket shaft 32ª and sprocket wheels 32, from moving needlessly, that is, from moving more than is necessary to drag the film 19ª through the gate 29ª, by the amount of one picture-space.

Fig. 28ᴬ is a detail view partly in section, partly in elevation, showing a modification of the apparatus illustrated in Fig. 28.

Fig. 28ᴮ is a detail view in cross section, and partly in elevation, on the line 28ᴮ, 28ᴮ, in the preceding figure, showing the locking wheel 33ᴳ, mounted on the lever 33ª*.

Fig. 29 is also a detail view in cross section and partly in elevation, on the line 29, 29, in Fig. 27, showing the ratchet wheel 34, keyed to the sprocket shaft 32ª, on which the magnet 13 acts, through its armature lever 13ʰ, and the pawl 13ᵖ.

Fig. 30 is also a detail, a sectional view in elevation on the line 30, 30, in Fig. 27, showing particularly the toothed wheel 35, which is keyed fast to the sprocket wheel shaft 32ª and is provided with teeth which serve to engage the end of the armature lever 13ʰ, and thus to stop the sprocket wheel 32, and the film 19ª, at the point required.

Fig. 31 is a top plan view, partly in section and somewhat similar to Fig. 27, but showing a greater length of the shaft 32ª, with the sprocket wheels 32, 32, as well as the checking wheel 33, the ratchet wheel 34, and the toothed locking wheel 35.

Fig. 32 is a detail view in elevation, showing the armature lever 13ʰ and the felted stopping-lever 13ᵗ, by which the movement of the film-feeding apparatus is checked, as the armature 13ᵇ, and the armature lever 13ʰ are approaching the limit of their film-feeding movement.

Fig. 33 is a top plan view of the apparatus shown in the preceding figure, with the magnet 13 in position, and the connecting rod 13ᵍ in section.

Fig. 34 is a detail sectional view, in elevation, on the line 34, 34, in Fig. 32.

Fig. 35 is a detail, a top plan view of the armature lever 13ʰ.

Fig. 36, which is also a detail view, is a side elevation of said armature lever 13ʰ.

Fig. 37 is a detail, a cross section through the armature 13ᵇ.

Fig. 38 is a detail, a cross section through the upper hollowed-out part of the core 13ª, with the armature 13ᵇ inside said core, and the tube 13ᶜ of non-magnetic material, which separates them.

Fig. 39 is a detail view, a cross section, through the lower or solid portion of the core 13ª.

Fig. 40 is a sectional view, partly in elevation, on the line 40, 40, in Fig. 41, through the optical center of the objective lens, or projection lens, 935; that is, through the center of the barrel that holds the individual glasses or lenses, which together make up the projection lens or object glass, at that point, lengthwise of said barrel, at which the rays of light cross each other; showing the shutter-lever, 935ʰ, and the electro-magnet 953, for operating it. This figure should be taken in connection with Fig. 7ᴮ, which shows the circuits that operate said electro-magnet 953.

Fig. 41 is a top-plan view of the projection-lens's barrel 935ª, the electro-magnet 953, et cetera. And in Fig. 41, the cover-pieces 935ᵏ, which serve to exclude dust and dirt from the interior of the barrel 935ª, are removed, so as to expose to view the parts below them.

Fig. 42 is a side elevation of the said barrel 935ª, and the shutter-operating magnet 953.

Fig. 42ᴬ is a detail, a plan view, of the armature-lever 953ʰ, which serves also as a shutter-lever.

Fig. 42ᴬᴬ is a detail, a side elevation of said shutter-lever 953ʰ.

Fig. 42ᴮ is a detail view, in perspective, showing one of the felted adjustable stops 935ᵉ.

Fig. 42ᶜ is a detail view, in section, showing a portion of the wall of the barrel or case 935ª, of the projection lens, with the lug 935ᵐ, and the recess 935ⁿ, described below, and showing also a portion of the wing or projection 935ᵈ, which serves to carry the adjustable stops 935ᵉ, 935ᵉ.

Fig. 42ᴰ is a detail view, in general similar to the preceding figure, but Fig. 42ᴰ differs from Fig. 42ᶜ in that it shows the lug 935ᵐ, with the slot 935ˡ, milled in it to receive the shutter-lever 935ʰ, and with the surface of the wing 935ᵈ (to which the upper adjustable stop 935ᵉ is secured) milled or otherwise surfaced to receive said stop 935ᵈ.

Fig. 43 is a view, partly in section, partly in elevation, and largely diagrammatic, and which is intended to be taken in connection with Fig. 25 and other preceding views, illustrating a modified form of my apparatus in which, instead of the two driving mechanisms for the lower sprocket 32, and the upper sprocket 41, actuated respectively by the electromagnets 13 and 13*  (best seen in Fig. 26) one of these driving mechanisms (either one, say, for example that actuated by the electro-magnet 13*) is omitted, and the two sprocket-shafts 32ª, and 41ª, are geared together in such a manner that movement of the one is communicated to the other.

Figure 44:
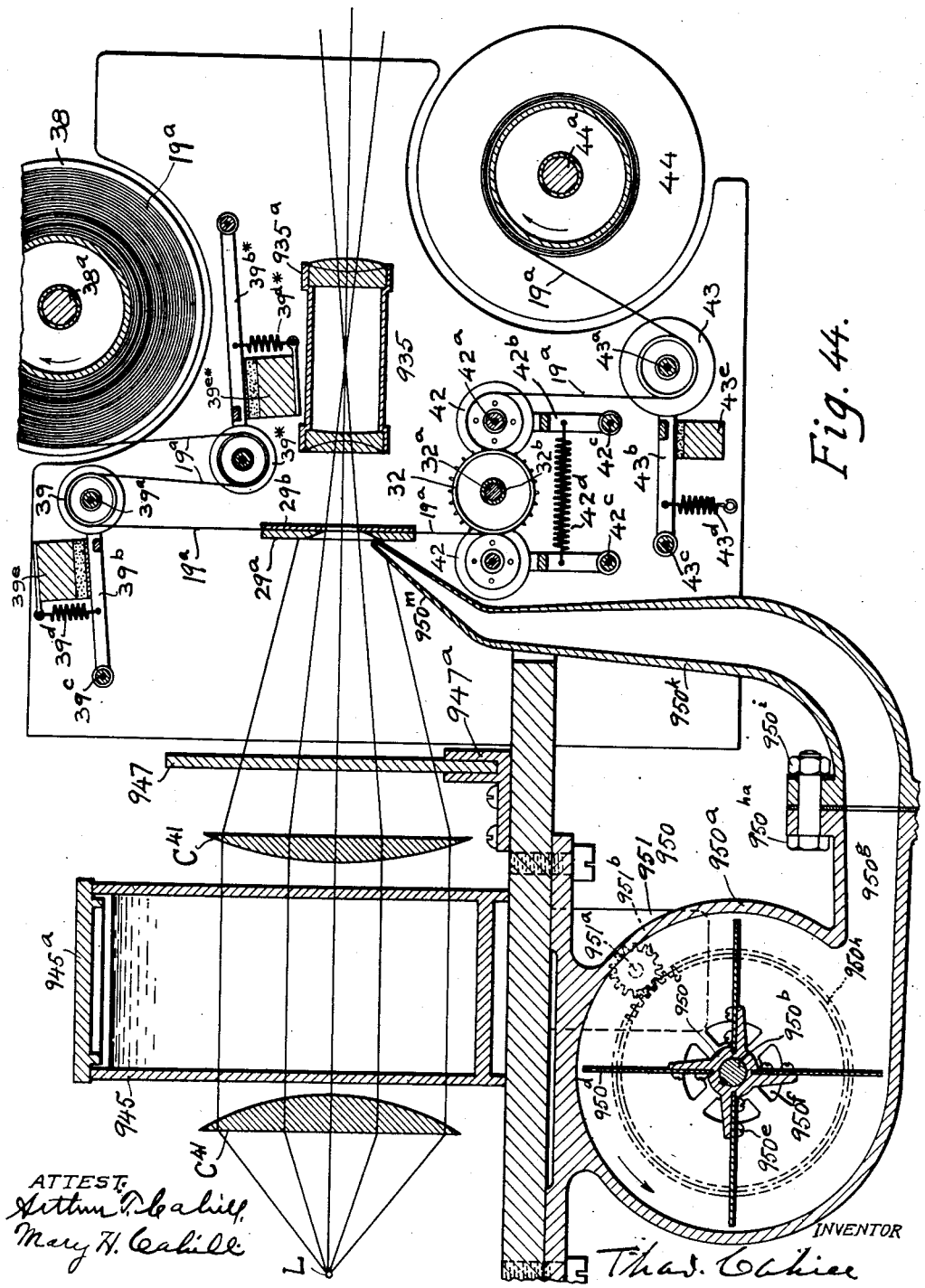

Fig. 44 is a view, partly in section, partly in elevation, and largely diagrammatic (and which is to be taken in connection with Fig. 25 and other preceding figures, and the descriptions of them before given) that illustrates a modified construction, in which the sprocket-wheel apparatus for feeding the film to the loop, which is seen above the gate 29ª in Fig. 25, is omitted and another mechanism, hereinafter described, is substituted for it.

Fig. 44ᴬᴬ shows schematically my speech, music, and picture-control broadcasting apparatus with two broadcasting devices, operating on different wave lengths and serving one to broadcast words and music and the other to broadcast picture-controlling electrical impulses. These two broadcasting devices (which may either be located near together or many miles apart) are susceptible of acting each entirely independently of the other, to broadcast speech or music (or speech and music) on its own wave, but they are capable also of acting together in effect, or for practical purposes, as a single station, and do sometimes so act, and are for this purpose connected by one or more circuits (as 354ᵉ and 354ʰ), whereby one such broadcasting device (which otherwise may be a complete broadcasting station) is controlled from the other or from a common controlling point and made to co-act with the other in the broadcasting of speech, music and picture-control.

Fig. 44ᴮ is a schematic view, showing a modification of my process and apparatus, in which, instead of producing speech and music by speakers, singers, and instrumentalists on the spot, a sound record, in which speech or music (or speech and music) have been recorded is provided for feeding the input circuit 354 of my broadcasting apparatus with electrical vibrations of audio frequency, corresponding to speech or to music, or to both of these.

Fig. 44$^{BA}$ is a detail view, partly in section and partly in elevation, showing on a larger scale and more clearly, the central portion of the cap 515$^b$ with the sound record 511 in contact with it.

Fig. 44$^C$, shows on an enlarged scale, a portion of a picture film having my changing pictures, to illustrate the first part of the well-known opera Die Walkuere.

Fig. 44$^D$, which is in two parts, shows a portion of an operatic score (the first part of the score of Wagner's Die Walkuere) arranged for the pianoforte with words and music, and with the stage directions abbreviated, in some cases, for lack of space, and with my marks on the score, to serve as directions to the control operator, when to change the pictures that illustrate such opera, as described more at length below.

Fig. 44$^E$ is a schematic view, somewhat similar to a portion of Fig. 7$^B$ before described, but it differs from that figure in this, that with the apparatus of Fig. 7$^B$ the amplifying tube $v^4$ feeds the rectifier $v^5$ which, in turn, feeds the relay electro-magnet 37; and this operates the film-feeding electro-magnet 13; but with the apparatus of Fig. 44$^E$, said amplifying tube $v^4$ feeds the lamp 514 which, when lighted, brings the photo-electric cell 516 into activity; and this, through the amplifier 517 and the circuit 517$^a$ (which is the output circuit of said amplifier) feeds the relay magnet 37 aforesaid which, in turn, controls the film-feeding electro-magnet 13, etc.

Fig. 44$^{EA}$ is a detail view, showing schematically a modification of Fig. 44$^E$ in this, that with the apparatus of Fig. 44$^E$ the lighting of the lamp 514, depends wholly upon the current received by it from the amplifying tube $v^4$, but with the apparatus of Fig. 44$^{EA}$ a small battery $b$ is provided, which is arranged, say, in series with the output circuit 514$^d$ of the amplifying tube $v^4$ aforesaid; and this battery has sufficient voltage to heat the lamp 514 considerably, say to a red heat (but it may be more or less than this) at which, however, the light given off from said lamp is not sufficient to produce enough emission of electrons in the photo-electric cell 516 to operate (through the amplifier 517) the relay magnet 37. But when the electric currents from the amplifying tube $v^4$ are added to the current of the battery $b$, then the lamp 514 is lighted sufficiently brightly so that it operates effectively the photo-electric cell 516; that is, it causes a sufficient emission of the electrons in said cell to operate through the amplifier 517 aforesaid the relay magnet 37.

The list of reference letters and reference numerals given below, with the reference letters arranged in alphabetical order and the reference numerals in numerical order, will facilitate the reading of the drawings, and an understanding of the specification. This list is as follows:

*List of reference letters and reference numerals*

A is a source of direct current for heating one or more filaments F, for example, a primary battery, or a storage battery, or a direct-current dynamo or some other source of direct current; as, for example, a rectifying device with accessories, constituting a so-called battery eliminator.

A+ is a wire or lead from the positive pole of the A-battery.

A— is a wire or lead from the negative pole of the A-battery.

B is a direct-current source for feeding the plate circuit of one or more vacuum tubes, for example, a primary battery, a storage battery, a direct-current dynamo, or a rectifying device with accessories, constituting a battery eliminator, or any other suitable source of direct current.

B', B$^2$ and B$^3$ respectively, are wires, leads or taps from different portions or sections of the B-battery, for feeding the plates of different vacuum tubes, respectively, of which B' is positive with relation to the filament F, B$^2$ is more positive and B$^3$ is yet more positive.

B$^5$ is a high-voltage direct-current source, for example, a direct-current dynamo or a rectifying device with accessories, of high voltage, for furnishing space current to the plate circuit of one or more power tubes.

$b$ is a battery or other direct-current source for the primary circuit of a telephonic transmitter or of a group of such transmitters; or it may be a local battery or other direct-current source for operating an electro-magnet, or for some other purpose.

C is the grid-biasing battery or C-battery, or other direct current source for keeping the grid of a vacuum tube (or the grids of a plurality of vacuum tubes) at a negative potential with relation to the filament F.

C', C$^2$, et cetera, are leads or taps from different portions of the negatizing battery of Lowenstein, commonly called the C-battery, which have different negative voltages.

C$_1$ is a condenser connected in series with the line, in a wave filter.

C$_2$ is a condenser connected in shunt with the line, in a wave filter.

C$^{20}$ is an adjustable tuning condenser, connected in series with an oscillator, as 343, 343$^a$, 343$^b$, 343$^c$, 343$^e$, et cetera.

C$^{21}$ is a tuning condenser connected in series with a broadcasting aerial as 340, 340$^a$, 340$^b$, 340$^c$, 340$^e$, et cetera, and with the secondary winding 395$^a$ of the output transformer, marked $t^4$ in Fig. 3.

C$^{22}$ is a tuning condenser, connected with a receiving antenna, as, 341, 341$^a$, 341$^b$, 341$^c$, et cetera, and the ground 351.

C$^{23}$ is a tuning condenser, connected between the grid and the filament.

C$^{24}$ is a blocking condenser, which is connected with the grid of the detector tube, in connection with the grid-leak resistance 398; also C$^{24}$ is a condenser used with the resistaince R$^{17}$, as a coupling between the plate circuit of one vacuum tube and the grid of the next succeeding vacuum tube; seen in Fig. 7$^B$ and in other figures.

C$^{25}$ is a small condenser, one plate of which is connected with the secondary winding of a coupling transformer (as $t'$, $t^2$, et cetera), while the other plate is connected with the grid of the tube whose plate circuit feeds the primary winding of the transformer aforesaid. Stated otherwise, C$^{25}$ is the neutralizing condenser of Professor Hazeltine's, well known neutrodyne apparatus.

C$^{35}$, C$^{35}$, are by-pass condensers, connected between the plate and the filament and serving to pass the radio-frequency currents while passing a very small quantity only of audio-frequency current. Seen in Figs. 7, 7$^A$, 7$^B$.

C$^{36}$, C$^{36}$, are by-pass condensers, connected between the B-battery leads (as B', B$^2$, B$^3$) and the A-battery, seen in Figs. 7, 7$^A$, 7$^B$, and many other figures.

D is a dynamic loudspeaker.

F is the filament of hot cathode of a vacuum tube.

G is the grid or controlling electrode of a vacuum tube, for controlling the flow of electrons from the hot cathode to the relatively cold anode or plate.

L is the projection lamp, also L is a reactance.

$L_1$ is an inductance, preferably, a reaction coil, connected in series with the line, in a wave-filter.

$L_2$ is an inductance, preferably, a reaction coil, connected in shunt with the line, in a wave-filter.

P is the anode or plate of a vacuum tube.

R is an ohmic resistance.

R' is a rheostat in circuit with a telephonic transmitter; but also shown for other purposes.

$R^2$ is a high resistance, bridged across between the grid and the filament, or it may be between the grid and the plate of a vacuum tube. It serves to quiet the operation of the tube.

$R^3$ is a rheostat in series with the filament F, which affords facility for regulating the heat of said filament, and its emission of electrons.

$R^{3a}$ is a resistance inserted in the circuit of the A-battery, so as to govern the flow of current to a plurality of filaments, belonging to a plurality of vacuum tubes—it serves, in effect, to govern the temperatures of a set or group of filaments, where the resistance $R^3$ serves to govern a single filament or a single tube.

$R^4$ is a rheostat, for governing the plate circuit of a vacuum tube, also $R^4$ is an expression rheostat for governing in some way the loudness of the sound from a vacuum tube amplifier. Such resistance may be inserted, for example, in the plate circuit of a vacuum tube, as in Fig. 2, and the resistance which regulates the plate circuit of a vacuum tube is commonly marked $R^4$, all through the drawings. But said resistance $R^4$, serving to regulate the expression, may well be inserted in some other circuit than the plate circuit, as, for example, in the feed circuit of my inductive pick-up, as shown in Figs. 2, $2^a$, 9, or in the output circuit of a vacuum tube, in which the resistance $R^4$ is, in effect, a potentiometer.

$R^{4a}$ is a rheostat for governing the plate circuits of a plurality of vacuum tubes.

$R^5$ is a rheostat for regulating the flow of current through a telephonic receiver or through a group of telephonic receivers.

$R^6$, $R^6$, are fixed resistances, but varying in amount one from another, which may be inserted in circuit with a plurality of telephonic receivers.

s is a switch or key for closing and opening a circuit or a branch of a circuit, as required. But some of the switches, for there are many of them, are otherwise marked, for distinction's sake, as s', $s^2$, $s^3$, et cetera.

t (or in some cases, T) is a transformer, considered as a whole.

t', $t^2$, $t^3$, $t^4$, et cetera, are transformers, and usually (but perhaps not always) the first transformer of a series is marked t'; the second, $t^2$; the third, $t^3$; et cetera.

v is a vacuum tube; also v', $v^2$, $v^3$, et cetera, are vacuum tubes, and in this case (as with the transformers) the first of a series of tubes is usually marked v'; the second of the same series, $v^2$; the third, $v^3$; et cetera.

1, 1, are telephonic transmitters. These may be of various sorts, as, for example—

(a) The well known carbon transmitter;

(b) Transmitters acting by electro-magnetic induction, as shown, for example, in Fig. 9;

(c) Transmitters acting by electro-static induction, as, for example, the well known transmitter of Wente, which is manufactured by the Western Electric Company.

$1^a$ is the diaphragm, either of a telephonic transmitter or of a telephonic receiver;

3, 3, are telephonic receivers or loud-speakers of any suitable type;

$3^a$, $3^a$, are strong retaining or supporting rings, preferably of steel, for holding the diaphragm, of a telephonic transmitter or receiver.

$3^{aa}$, $3^{aa}$, are bolts, screws, or rivets for holding the diaphragm $1^a$ tightly clamped between the retaining rings $3^a$, $3^a$.

$3^b$ is the field magnet of a telephonic receiver—a permanent magnet, which may be of cobalt-tungsten steel, or any other suitable material.

$3^c$ is a soft iron pole piece, attached to the end of the magnet $3^b$.

$3^d$, $3^d$, are working coils wound upon the pole pieces $3^c$, $3^c$, in proximity to the diaphragm $1^a$;

$3^f$ is a cylindrical case for the field magnet, diaphragm, et cetera, of a telephonic receiver, or of an inductive transmitter.

$3^g$ is an annular shelf or plate, formed on the inside of the cylindrical case $3^f$, to support the diaphragm rings $3^a$, and the diaphragm $1^a$.

$3^h$ is a cap or cover for a telephonic receiver, or for an inductive transmitter.

$3^k$ is a ring-shaped casting, which serves by its arms, $3^l$, $3^l$, to support the upper magnet core 5 in Fig. 9, and which is itself screwed down on top of the diaphragm retaining-rings $3^a$, $3^a$, and so is screwed to the ring-shaped shelf $3^g$ by the screws $3^t$, $3^t$; best seen in Fig. 9.

$3^l$, $3^l$, are arms rising from the ring-shaped casting $3^k$, to support the magnet core 5.

$3^m$ is a boss or annulus connected to the bottom of the case $3^f$, and into which the threaded part of the lower magnet core 5, in Fig. 9, is screwed.

$3^n$, $3^n$, are lock-nuts for locking the magnetic cores 5, 5, in Fig. 9, in place.

$3^p$ is a boss or annulus connected to the arms $3^l$, $3^l$, and serving to support the upper magnet 5 in Fig. 9. Also, $3^p$ is a collar or boss which is attached by the arms $3^q$, $3^q$, to the top $3^h$ of the telephonic receiver.

$3^q$, $3^q$, are ribs by which the collar $3^p$ is attached to and supported from the inner walls of the cap $3^h$.

$3^t$, $3^t$, are bolts seen in Fig. 9, which serve to fasten the ring $3^k$ and the diaphragm rings $3^a$, $3^a$, to the annular shelf $3^g$ of the case $3^f$.

4 is a horn which, preferably, is closed at its small end by the diaphragm $1^a$ of a telephonic receiver 3.

$4^a$ is a screw-threaded ferrule which is firmly attached to the smaller end of the horn 4 (the end remote from the bell) and by which said horn is screwed into the cap of the telephonic receiver.

5 is a soft iron rod, forming the core of a magnet, for use in a telephonic transmitter (see Fig. 9) or in a telephonic receiver, or loud-speaker.

$5^a$ is a field coil or exciting winding, for magnetizing the magnet 5.

$5^b$ is a working coil or alternating-current coil on the rod 5, near the diaphragm $1^a$, and serving to vibrate said diaphragm in a telephonic receiver, or to produce electrical currents as the result of vibrations of the diaphragm, in a telephonic transmitter, as shown in Fig. 9.

$5^k$, $5^k$, are spools or tubes of German silver, brass, or other non-magnetic material, surrounding the field cores 5, 5, (see Fig. 9) on which the exciting winding $5^a$ and the alternating-current winding $5^b$ for the cores 5, are wound.

6 is a vibration-combining and vibration-amplifying device, preferably, of the vacuum tube kind; seen in figures.

$6^d$ is the primary winding or one of the primary windings of a transformer.

$6^{d'}$, $6^{d2}$, et cetera, are coils or impedances, connected in series, each with an adjustable condenser as $C^{22}$, to form a rejector circuit; a plurality of these rejector circuits are, in some cases, connected together in series with each other, between a receiving antenna and the ground; and the several rejector circuits are tuned to different frequencies, respectively; seen in Fig. 7A.

$6^e$ is the secondary winding of a transformer.

$6^{e'}$, $6^{e2}$, et cetera, are also secondary windings of transformers.

$6^h$, $6^h$, are lines or mains fed with electrical vibrations from the telephonic transmitters or pick-ups 1, 1, or fed in any other suitable manner with electrical vibrations corresponding to speech or music or sometimes to both speech and music, preferably, through vibration-amplifying devices, the mains $6^h$, $6^h$, serve, in turn, through branch mains, to feed musical electrical currents or speech currents, or both, to the receivers, 3, 3, on the subscriber's premises; and also, preferably, said lines and mains feed picture-controlling impulses to the apparatus on the subscriber's premises.

$7^a$, $7^a$, are trunk lines or mains fed from the principal mains $6^h$, $6^h$, and used in distributing electrical vibrations corresponding to music, song, or speech from a central station to the subscriber's premises, or to sub-stations, from which vibrations corresponding to music or speech are distributed to the subscriber's premises.

$7^b$, $7^b$, are sub-mains or branch lines which are fed from the district mains $7^a$, $7^a$.

$7^c$, $7^c$, are fuses which act to protect the circuits or branches in which they are inserted by melting fusible metal, and so speedily rupturing a circuit, when it is subjected to an over-load.

$7^d$, $7^d$, are switches for connecting the district mains, $7^a$, $7^a$, with the principal mains $6^h$, $6^h$, or disconnecting therefrom, as required.

$7^e$, $7^e$, are switches for connecting the branch lines $7^b$, $7^b$, with the district mains $7^a$, $7^a$, or disconnecting therefrom, when required.

8 is the working circuit of a telephonic transmitter or pick-up of the inductive type (see Figs. $2^a$ and 9). This working circuit includes the coils $5^b$ (Fig. 9) wound on the poles of the field magnets 5, 5, and acted on inductively by the vibrations of the diaphragm $1^a$, and the terminals of said circuit 8 are connected, one to the filament F, and the other to the grid G of the vacuum tube $v'$. (Fig. 9.)

$8^a$ is the exciting circuit of the telephonic transmitter or inductive pick-up, seen in Fig. $2^a$, et cetera, but best seen in Fig. 9. This exciting circuit is fed by the battery $b$, and controlled by the expression rheostat $R^4$, which is seen in Figs. $2^a$ and 9 and other figures, and seen in one form more in detail in Fig. $18^D$.

$8^c$ is a picture-projecting machine for use on the subscribers' premises, and also at the central station.

9 is the picture-control operator's key, see Figs. $2^a$, $18^a$, etc.

$9^a$ is the center shaft for said key.

$9^b$ is the knob on said key, by which the operator grasps it.

$9^c$ is the adjusting screw in said key, by which the amount of its play is regulated.

$9^d$ is the lock-nut for said adjusting screw $9^c$.

$9^e$ is the electrical contact-point, of silver or other suitable nonoxidizing metal, mounted in said key.

$9^f$ is the corresponding fixed contact-point, which is mounted in the metal sleeve $9^m$ and insulated from the key-frame or casting $9^h$.

$9^g$ is the returning spring for the key 9.

$9^h$ is the frame or casting in which the key 9 is mounted.

$9^i$, $9^i$, are lugs or side-pieces rising from the frame $9^h$, in which the screws $9^k$, $9^k$, are mounted, by which the center rod $9^a$ of the key 9 is supported.

$9^k$, $9^k$, are mounting screws for the center rod $9^a$ of the key 9.

$9^l$, $9^l$, are lock-nuts for the screws $9^k$, $9^k$.

$9^m$ is a metal sleeve or piece in which the silver contact-point $9^f$ aforesaid is mounted.

$9^n$ is a sleeve of bakelite or other suitable insulating material in which the sleeve $9^m$ is mounted, and which itself is mounted in the casting or frame $9^h$.

$9^p$ is a screw; and $9^q$ is a washer, by which the metal sleeve $9^m$ and the insulating sleeve $9^n$ are firmly connected together.

10 is an electro-magnet, whose circuit is controlled by the picture-control operator's key 9 and which, in turn, controls the switch (as $s'$, $s^2$ or $s^3$ in Fig. 3 or in Fig. $44^{AA}$, et cetera) by which the oscillator $343^e$, the vacuum tube $v$, and the picture-controlling aerial $340^e$, are brought into activity.

$10^a$ is the fixed core, of the electro-magnet 10.

$10^b$ is the armature of said electro-magnet 10.

$10^c$ is the brass tube of said electro-magnet 10, which serves to separate the armature $10^b$ from the fixed core $10^a$ aforesaid.

$10^d$ is the exciting winding of said electro-magnet 10.

$10^e$ is a screw-threaded adjustable connecting piece, which is set in the armature $10^b$.

$10^f$ is the lock-nut for the piece $10^e$.

$10^g$ is a link of bakelite or other suitable insulating material.

$10^h$ is the armature-lever for the magnet 10.

$10^i$ is the shaft or center for said armature-lever $10^h$.

$10^k$ is the returning spring for the armature-lever $10^h$.

$10^l$ is a silver contact-point in the armature-lever $10^h$, which may be considered as the equivalent of the switch $s'$, $s^2$, or $s^3$, in Fig. 3, and which is therefore, also marked $s^2$.

$10^m$ is the contact-screw, with which the contact-point $10^l$ (or $s^2$) co-acts.

$10^n$ is an adjusting screw by which, with the screw $10^m$, the position and play of the armature-lever $10^h$ and armature $10^b$ are regulated.

11 is a room in which the musicians who sing and those who play instruments are located with their instruments, and in which the telephonic transmitter or electrical pick-up 1 is also located.

$11^a$ is a partition or wall separating the musician's room 11 from the control room 12, in which latter the musical director and the control-operator are located.

$11^b$ are partitions of glass between the musicians' room 11 and the control room 12. These partitions are, preferably, made with double walls of clear glass to insulate acoustically the musicians' room 11 from the control room 12, while making it easy to see from the one room into the other.

11$^d$ is a door to give access between the musicians' room 11, and the control room 12.

11$^e$ is a door for giving access to the control room 12, from the space outside of it.

11$^h$, 11$^h$, are frames of wood or other suitable material for mounting the glass plates of the partitions 11$^b$, 11$^b$.

11$^u$ is a room for the picture-control operator, seen in Fig. 2$^c$.

12 is a room for the musical director, or the supervising musician, or the control operator, or for all of these, in which loud-speakers are placed, which are acoustically similar to the loud-speakers furnished to the subscribers and which are fed in the same way with the electrical music, so that the electrical voice of the music is heard in the room 12, and directions can be given from that room by a conductor who hears the electrical voice of the music, to the musicians in their room 11, (or 11 and 11*); and from which, also, a control is exercised over the music sent out from the station. Also the room 12 may be used by the picture-control operator.

12$^a$, 12$^a$, are walls of the room 12.

12$^b$ is the conductor's box or podium, on which the conductor stands while directing the musicians in their room 11, or in their rooms 11 and 11*.

13 is an electro-magnet which acts to give movement to the ratchet-wheel 34, sprocket-shaft 32$^a$, sprocket-wheels 32, 32, and film 19$^a$, so as to drag the film through the gate 29$^a$, and change the picture from time to time, as required.

13* is an electro-magnet which is, in general similar to the magnet 13, but which serves to give movement to the shaft 41$^a$, and to the upper sprocket-wheels 41, 41, by which the film is fed from the pay-off roll 38 to the film loop that stands above the gate 29$^a$, as seen in Fig. 25.

The several parts of the magnet 13* are marked exactly the same as the several parts of the magnet 13.

13$^a$ is the fixed core of the electro-magnet 13 or 13*.

13$^b$ is the armature of the magnet 13 or 13*.

13$^c$ is the bronze or brass tube of the magnet 13, which serves to separate the armature 13$^b$ from the fixed core 13$^a$ and on which, also, a part of the exciting winding 13$^d$ is wound.

13$^d$ is the exciting winding of the magnet 13.

13$^e$ is a screw-threaded adjustable connecting piece, which is set in the armature 13$^b$.

13** is a pin for connecting the piece 13$^e$ with the link 13$^g$.

13$^f$ is a lock-nut for the screw-threaded connecting piece 13$^e$.

13$^g$ is a link for connecting the armature 13$^b$ with its armature-lever 13$^h$.

13$^h$ is the armature-lever for the magnet 13.

13$^i$ is the center rod for the armature-lever 13$^h$.

13$^k$ is the returning spring for the armature 13$^b$ and the armature-lever 13$^h$.

13$^m$ is a shoulder screw, by which the link 13$^g$ is connected with the armature-lever 13$^h$.

13$^n$ is a felted stop, against which the armature-lever 13$^h$ is normally pressed by its returning spring 13$^k$.

13$^p$ is a pawl which is pivoted at 13$^q$ to the armature-lever 13$^h$, and serves to drive the ratchet-wheel 34, the sprocket wheel shaft 32$^a$, the sprocket-wheels 32, 32, and the film 19$^a$, so as to feed the film 19$^a$ through the gate 29$^a$.

13$^q$ is a shoulder pin, on which the pawl 13$^p$ is mounted.

13$^r$ is a returning spring for the pawl 13$^p$.

13$^s$ is a lug on the armature-lever 13$^h$, to which one end of the returning spring 13$^r$ is fastened.

13$^t$ is a checking lever acting, by its inertia, to cushion the arresting of the armature-lever 13$^h$ and armature 13$^b$ at, or near, the end of their film-feeding movements.

13$^{ta}$ is a piece of felt or other similar elastic material, attached to the checking lever 13$^t$, on which the armature-lever 13$^h$ acts, through the plate 13$^{tb}$.

13$^{tb}$ is a piece of metal which is soldered or otherwise attached to the armature-lever 13$^h$ to give to it a larger surface, to act on the felt 13$^{ta}$, attached to the checking lever 13$^t$.

13$^{tc}$ is a returning spring for the lever 13$^t$.

13$^u$ and 13$^v$ are adjustable stops, attached to the bar or plate 13$^w$, and serving to limit the movement of the checking lever 13$^t$.

13$^x$, 13$^x$, are screws and 13$^y$, 13$^y$, are washers which serve to afford facility for adjusting the stops 13$^u$ and 13$^v$.

19$^a$ is the picture-carrying film, for use in the subscribers' electrically-controlled projecting machine 8$^c$.

29$^a$ is the gate, or rather the normally-fixed part of the gate, through which the film 19$^a$ passes, as the pictures are changed.

29$^b$ is the hinged part of the gate which is centered at 29$^c$, but held by a spring (not shown) against the fixed part 29$^a$, so as to press the film 19$^a$ between itself and the fixed part 29$^a$.

29$^c$ is a pin by which the pivoted part 29$^b$ of the gate is hinged to the normally fixed part 29$^a$.

32, 32, are the sprocket-wheels that feed the film 19$^a$ through the gate 29$^a$.

32$^a$ is the shaft to which the sprocket-wheels 32, 32, and also the checking-wheel 33, the ratchet-wheel 34, and the locking-wheel 35, are keyed or otherwise secured.

32$^{aa}$ is a key in the shaft 32$^a$.

32$^b$ is a sleeve, formed integral with the sprocket-wheels 32, 32, serving to connect said wheels, and serving also for mounting said wheels 32, 32, on the shaft 32$^a$. This sleeve 32$^b$, is split or cut parallel to the axis for a portion of its length and is provided with a screw 32$^c$ for binding it on to the shaft 32$^a$ in any position desired. This is useful in framing the picture, that is, in centering it properly in the gate 29$^a$.

32$^c$ is a screw for binding the cleft sleeve 32$^b$, attached to the sprocket-wheels 32, 32, tightly to the shaft 32$^a$.

32$^d$, 32$^d$, are ears, wings, or extensions attached to the sleeve 32$^b$, and, like it, slotted parallel to the axis of the shaft 32$^a$; in these ears the screw 32$^c$ is set, which serves to tighten the sleeve 32$^b$ on its shaft 32$^a$.

32$^f$ is a pinion, keyed to the shaft 32$^a$ and seen in Fig. 43.

33 is the sprocket-feed checking wheel, which is keyed to the sprocket shaft 32$^a$.

33$^a$ is a lever centered at 33$^b$ and held against the wheel 33 by a spring 33$^c$.

34 is the ratchet-wheel, keyed to the sprocket-shaft 32$^a$ and by which said sprocket-shaft with the sprocket-wheels 32, 32, and the film 19$^a$, are driven by the electro-magnet 13, through its armature 13$^b$, armature-lever 13$^h$, and pawl 13$^p$.

35 is the locking-wheel, which is also keyed to the sprocket-shaft 32$^a$.

36 is the wireless-receiving apparatus or the case for the same, which is seen, thus marked, in Fig. 8, et cetera, and the parts of which are seen in Figs. 4, 5, 6, 7$^B$ and other figures.

36$^a$, 36$^a$, are usual tuning controls or control knobs or handles for the wireless-receiving apparatus 36, on the subscriber's premises.

36$^b$ is a volume-control handle or knob, belonging to the wireless-receiving apparatus 36, seen in Fig. 8.

37 is an electro-magnet, fed by the rectifying tube, which is marked $v^5$ in Figs. 7$^A$ and 7$^B$.

37$^a$ is the fixed core of said electro-magnet 37.

37$^b$ is the armature of said magnet 37.

37$^c$ is the brass tube belonging to the magnet 37, by which its armature 37$^b$ is separated from the fixed core 37$^a$.

37$^d$ is the exciting winding of said magnet 37.

37$^e$ is an adjustable screw-threaded rod or connecting-piece which is set in the armature 37$^b$.

37$^f$ is a lock-nut for adjusting the connecting-piece 37$^e$ and thereby adjusting the position of the armature 37$^b$ inside the tube 37$^c$, and its proximity to its core 37$^a$.

37$^g$ is a link for connecting the armature 37$^b$ with its armature-lever 37$^h$.

37$^h$ is the armature-lever, to which the armature 37$^b$ is connected. This armature-lever acts as a switch, as the drawings show.

37$^i$ is the center-shaft or pivot of the armature-lever 37$^h$.

37$^k$ is the returning spring for the armature-lever 37$^h$, and armature 37$^b$.

37$^l$ is a stop screw, against which the armature-lever 37$^h$ is normaly held, by its returning spring 37$^k$.

37$^m$ is a contact-screw with which the armature-lever 37$^h$ (which is connected with the battery b, and serves as a switch) makes contact when the magnet 37 is energized by currents from the rectifying tube ($v^5$ or $v^6$ or $v^{6a}$) so as to close the circuit of the film-feeding electro-magnet 13, or 13 and 13*, and also to close the circuit of the shutter-operating electro-magnet 953 and of the shutter-cut-off electro-magnet 956, in Fig. 7$^B$, et cetera.

38 is the pay-out roll, from which the picture-film 19$^a$ is drawn, as it is passed through the gate 29$^a$.

38$^a$ is the shaft, on which the pay-out roll 38 is mounted.

39, 39, are wheels over which the film 19$^a$ first passes from the pay-out roll 38; seen at the upper right-hand corner of Fig. 25; also in Fig. 25$^D$.

39$^a$ is the shaft for the wheels 39, 39.

39$^b$ is a frame, in which the shaft 39$^a$ is mounted.

39$^c$ is the center shaft for the frame 39$^b$.

39$^d$ is a returning spring for the frame 39$^b$ and wheels 39, 39.

39$^e$ is a felted stop, against which the spring 39$^d$ normally holds the frame 13$^b$.

40$^c$ is a chair in the control-room 12, in which the control-operator for the words and music broadcast, sits, while operating his control device 28, et cetera.

40$^d$ is another chair in the control-room, in which the picture-control operator sits, listening to the music and operating his key 9 and watching his picture screen 960.

40$^e$ is a chair in the subscriber's residence (Fig. 8) in which he sits, in a convenient position to operate the tuning-controls 36$^a$, 36$^a$, and the volume-control knob 36$^b$ of his radio-receiving apparatus, while watching his picture screen 960.

41, 41, are the upper sprocket-wheels, Fig. 25, by which the film 19$^a$ is fed into the loop from which it is afterwards drawn, to feed it through the gate 29$^a$.

41$^a$ is the shaft to which the sprocket-wheels 41, 41, are keyed, and on which they are mounted.

41$^{aa}$ is the key in the shaft 41$^a$, by which the sprocket-wheels 41, 41, are connected fast to said shaft.

41$^f$ is a pinion, keyed fast to the shaft 41$^a$ and seen in Fig. 43.

42, 42, are rolls or wheels by which the film 19$^a$ is pressed against the sprocket-wheels 32 or 41.

42$^a$ is a tubular shaft on which the wheels 42, 42, are mounted.

42$^{aa}$ is a small steel shaft or center-pin which passes through the tubular shaft 42$^a$ and the frame 42$^b$, in which said shaft 42$^a$ and the center-pin 42$^{aa}$ are mounted.

42$^b$ is a frame in which the shaft 42$^a$ is mounted, by means of the center-pin 42$^{aa}$.

42$^c$ is a shaft on which the frame 42$^b$ is mounted; it is the center-shaft for said frame.

42$^d$ is a contractile spring for holding the rollers 42, 42, against the corresponding sprocket-wheels 32 or 41; best seen in Fig. 25.

42$^e$, 42$^e$ are spacing collars on the shaft 42$^a$, which serve to hold the wheels or rolls 42, 42 the correct distance apart.

42$^f$ is a flange-piece attached to the roll proper (or central member) 42.

42$^h$ is a thin disk, mounted inside the roll proper 42, and which is turned or ground to the same diameter as said part 42.

43, 43, are wheels under which the film 19$^a$ passes, on its way to the pick-up roll 44.

43$^a$ is a tubular shaft, on which the wheels 43, 43, are mounted.

43$^{aa}$ is a small steel shaft or center-pin which passes through the tubular shaft 43$^a$ and the frame 43$^b$; in which frame said shaft 43$^a$ and the center-pin 43$^{aa}$, are mounted.

43$^b$ is the frame in which the shaft 43$^a$ is mounted.

43$^c$ is the shaft on which said frame 43$^b$ is mounted.

43$^d$ is the returning spring for the frame 43$^b$.

43$^e$ is a felted stop, against which the spring 43$^d$ holds the frame 43$^h$, when in its normal position.

44 is the take-up roll, on to which the picture-film 19$^a$ is wound, after it has passed through the gate 29$^a$.

44$^a$ is the shaft of the take-up roll, through which said roll is driven.

340 is a broadcasting aerial or antenna for broadcasting speech or music.

340* is also a broadcasting aerial.

340$^e$ is a broadcasting aerial, for sending out waves that serve for picture-control.

341 and 341$^e$ are receiving antennas.

342 is a tuner or tuning device, for tuning a radio-receiving circuit.

343, 343* and 343$^e$ are oscillators, having different frequencies of oscillation, for producing electrical waves of different lengths respectively.

344 is an electrical wave detector, preferably, a detector of the vacuum-tube variety.

346 is an audio-frequency amplifying device, preferably, also of the vacuum-tube variety.

348 is a radio-frequency-amplifying device.

350 is the ground connection for one of the broadcasting aerials as 340, 340* or 340$^e$.

351 is the ground connection for one of the receiving antennas, as 341, 341$^e$, etc.

353 and 353ᵃ are broadcasting devices for throwing off electrical waves into the air or into space.

354 is a circuit which is the output circuit of one of the amplifiers, fed by the electrical pickup 1 in the music studio; also, 354 is the input circuit of the amplifying device which feeds the modulator of the broadcasting apparatus.

354ᵉ is a circuit which controls the activity of the picture-control broadcasting aerial marked 340ᵉ in Figs. 3, and 44ᴮ.

354ʰ is a telephone circuit, connecting two broadcasting stations 353 and 353ᵃ, which at times act independently, each broadcasting for itself, and at other times act together as one station, to broadcast speech and picture-control, either with or without music.

355 is an electrical wave-receiving device, corresponding to and serving to receive from, the broadcasting device 353.

395 is the primary winding; and

395ᵃ is the secondary winding of the output transformer, by which a power tube (as $v^4$ in Figs. 3 and 44ᴬᴬ) acts on the corresponding aerial 340 or 340ᵉ or 340ᵃ.

475 is an automatic current-interrupting apparatus, shown symbolically in Fig. 2ᵃ, and more in detail in Figs. 3ᴮ to 3ᴰ, which serves to interrupt periodically the picture-controlling waves, sent out from a central station.

507 is a wire which connects the plate P of the tube $v^3$ with the filament F of the tube $v^4$; seen in Figs. 3, 44ᴬᴬ and other figures.

510 is a telephonic apparatus, seen in Fig. 44ᴬᴬ.

511 is a sound-film, that is, a strip or ribbon of transparent celluloid or other suitable material, on which a record of the sounds corresponding to speech or to music or to both of these has been made photographically, by any suitable process; seen in Fig. 44ᴮ.

512, 512 are rolls or cylinders on which the sound-film 511 is wound.

512ᵃ, 512ᵃ are the shafts or centers of the rolls 512, 512.

513 is an opaque box or case; seen in Fig. 44ᴮ.

514 is a lamp, preferably, a small incandescent lamp, for illuminating a very narrow space on the sound-film 511; seen in Fig. 44ᴮ; also, 514 is a lamp for bringing the photo-electric cell 516 into activity; seen in Fig. 44ᴱ.

514ᵃ is a reflector, placed behind the lamp 514.

514ᵈ is the output circuit of the tube $v^4$ in the second row of Fig. 44ᴱ, which is connected in series with the filament F of the electric lamp 514.

515 is a cylindrical case which serves for mounting the condenser-lenses C⁴¹, C⁴¹; also, the end-piece 515ᵇ is attached to the end of said case 515.

515ᵃ is a circular flange, formed on the case 515, and serving to attach the same to the larger case 513.

515ᵇ is the front-piece of the cylindrical case 515.

515ᶜ is a narrow slot, formed in the front-piece 515ᵇ, through which light passes from the lamp 514 and through the sound-film 511, and the sound-record thereon, to the photo-electric cell 516.

516 is a photo-electric cell, having an anode A and a cathode Cₐ.

517 is an amplifier, preferably an audio-frequency-vacuum-tube amplifier, for amplifying the currents which are fed to said amplifier from the photo-electric cell 516.

517ᵃ are wires which connect the amplifier 517, fed from the photo-electric cell 516 with the relay magnet 37; seen in Fig. 44ᴱ.

640 is a high-pass electrical wave filter, seen in Fig. 9, etc. It serves to exclude from the amplifier vibrations of low frequency coming from the electrical pick-up 1, for example, vibrations of a lower frequency than, say, three or four hundred cycles per second.

935 is the object glass or objective lens or projection lens, as it is variously termed, considered as a whole.

935ᵃ is the barrel or cylinder which contains the several glasses or lenses which together make up the projection lens.

935ᵇ is a standard for supporting said barrel 935ᵃ which is cast integral or otherwise firmly attached to it.

935ᶜ is the foot of said standard.

935ᵈ is a wing or piece lying transverse to the barrel 935ᵃ and to the standard 935ᵇ, which serves to support the adjustable stops 935ᵉ, 935ᵉ, and the returning spring 953ᵏ.

935ᵉ, 935ᵉ, are adjustable stops for limiting the movement of the shutter-lever 953ʰ.

935ᶠ, 935ᶠ, are screws by which the adjustable stops 935ᵉ, 935ᵉ, are attached to the wing 935ᵈ.

935ᵍ is a slot, formed lengthwise in the adjustable stop 935ᵉ, to permit of the movement of said stop, for purposes of adjustment in any position required.

935ʰ, 935ʰ, are pieces of felt, securely attached to the stops 935ᵉ, 935ᵉ, and serving to cushion the movements of the shutter-lever 953ʰ, and to render its operation silent or nearly silent.

935ᵏ, 935ᵏ, are covers for the slot 935ˡ in the lug or projection 935ᵐ, seen in cross-section in Fig. 40.

935ˡ is a slot in the lug 935ᵐ; see Figs. 42ᴰ and 42ᶜ.

935ᵐ is a lug on the barrel 935ᵃ, which is slotted and serves to support the center-pin 953ˡ, of the shutter-lever 953ʰ; best seen in Figs. 42ᶜ, 42ᴰ, and 42.

935ⁿ is a recess or hole, formed in the wall of the barrel 935ᵃ, and serving as a continuation inward of the slot 935ˡ, through which the shutter-lever 953ʰ passes into the barrel 935ᵃ; see Figs. 42ᶜ, 42ᴰ and 40.

936 is a heavy weight, for driving the take-up roll 44.

936ᵃ is a cord or chain, by which the weight 936 is hung from the shaft 963.

937 is a locking pawl, which engages with the ratchet-wheel 34 to prevent the same from moving backwards.

937ᵃ is the center-shaft for said locking pawl.

937ᵇ is a spring for holding the pawl 937 in engagement with the ratchet-wheel 34.

939 and 940 are gears for connecting the pinion 32ᶠ on the sprocket-shaft 32ᵃ, with the pinion 41ᶠ on the other sprocket-shaft 41ᵃ, in Fig. 43.

939ᵃ is the supporting center or shaft for the gear 939.

940ᵃ is the supporting center or shaft for the gear 940.

945 is a water cell, interposed between the projection lamp L and the film 19ᵃ, so that it absorbs heat rays which otherwise would heat said film.

945ᵃ is a cover-plate for said water cell.

946 is a worm located in (or serving in connection with) the water cell 945, and through which water is passed, in order to cool the water in said water cell 945.

946$^b$ is a funnel through which water is fed to the worm 946.

946$^c$ is a funnel and drain pipe, to receive the water from said worm.

946$^a$ is a cock or valve for regulating the passage of cooling water through the worm 946.

947 is a plate of heat-absorbing glass, located between the projection lamp L and the film 19$^a$.

947$^a$ is a support or mounting for said plate 947.

950 is a centrifugal blower, (considered as a whole) for blowing cool air against the film 19$^a$, where it stands in the gate 29$^a$.

950$^a$ is the outer case or shell of the film-cooling blower 950.

950$^b$ is the shaft of said blower.

950$^c$ is a casting mounted on and keyed to the shaft 950, and to which the arms or vanes or fans, 950$^d$, of the blower are attached.

950$^d$, 950$^d$, are arms, blades, vanes or fans of the blower 950.

950$^e$, 950e, are screws by which the vanes or blades 950$^d$ are attached to the casting 950$^c$.

950$^f$, 950$^f$, are ports in the casing 950$^a$, through which air enters the blower 950, near to its center—near to the shaft 950$^b$.

950$^g$ is the outlet pipe of the blower 950.

950$^h$ is a gear, seen in dotted lines in Figs. 24 and 25, keyed to the shaft 950$^b$ of the blower 950, and driven by a pinion 951$^b$ on the armature-shaft of the electric motor 951.

950$^{ha}$, 950$^{ha}$, are bolts for fastening the pipe 950$^k$ to the outlet pipe 950$^g$ of the blower 950.

950$^i$, 950$^i$, are nuts for the bolts 950$^{ha}$, 950$^{ha}$.

950$^k$ is a pipe, fed by the blower 950 and serving to conduct air from it to the film 19$^a$, at the gate 29$^a$ to cool said film.

950$^m$ is the nozzle of the pipe 950$^k$ through which cooling air is blown against the film 19$^a$, while standing in the gate 29$^a$.

951 is a small electric motor for driving the blower 950, that serves to cool the film 19$^a$; seen in dotted lines in Fig. 24; also, in Fig. 25.

951$^a$ is the armature-shaft for said electric motor.

951$^b$ is a pinion, keyed to said armature-shaft 951$^a$ and serving to drive the gear 950$^h$ on the shaft 950$^b$ of the blower 950; seen in dotted lines in Figs. 24 and 25.

953 is the shutter-operating electro-magnet, for giving movement to the shutter 953$^h$; 953 refers to the magnet as a whole.

953$^a$ is the fixed core of said electro-magnet 953.

953$^b$ is the armature of said electro-magnet.

953$^c$ is the brass tube of said magnet 953.

953$^d$ is the exciting winding for said electro-magnet 953.

953$^e$ is an adjustable screw-threaded connecting rod, set in the armature 953$^b$.

953$^f$ is a lock-nut for the adjustable connecting rod 953$^e$.

953$^g$ is the link, connecting the armature 953$^b$ with its armature-lever 953$^h$.

953$^h$ is the armature-lever, serving as a shutter or a shutter-lever.

953$^i$ is the center-rod or axis of said lever 953$^h$.

953$^k$ is the returning spring for said lever 953$^h$.

956 is the shutter cut-off electro-magnet (or shutter-releasing electro-magnet) which acts to cut off the electric current from the shutter-operating electro-magnet 953, thereby causing or at least permitting a quick return movement of the shutter 953$^h$.

956$^b$ is the armature of said shutter cut-off electro-magnet.

956$^c$ is the brass tube of said electro-magnet.

956$^d$ is the exciting winding of said electro-magnet.

956$^e$ is the screw-threaded adjustment rod, set in the armature 956$^b$ of said electro-magnet.

956$^f$ is a lock-nut for the adjusting rod 956$^e$.

956$^g$ is a link connecting the armature 956$^b$ with its armature-lever 956$^h$.

956$^h$ is the armature-lever for the electro-magnet 956, centered at 956$^i$.

956$^i$ is the center or pivot of said armature-lever 956$^h$.

956$^k$ is the returning spring for the armature-lever 956$^h$ and armature 956$^b$.

956$^m$ is an adjustable stop-screw, against which one end of the armature-lever 956$^h$ is normally held by the returning spring 956$^k$.

956$^n$ is an adjustable screw, set in the end of the armature-lever 956$^h$, so as to act on the circuit-breaking lever or switch 957.

956$^p$ is a lock-nut, for holding the screw 956$^n$ in any position required.

957 is a lever, centered at 957$^a$, which serves as a switch. It normally makes contact and electrical connection with the contact screw 957$^b$, so that electrical current can flow through it from the battery b to the shutter-operating electro-magnet 953, when the relay-magnet 37 is energized, but said lever 957 acts, when moved from its normal position, by the action of the shutter cut-off electro-magnet 956, to break the circuit of the shutter-operating electro-magnet 953, so that the shutter 953$^h$ returns to its normal position, under the influence of its returning-spring 953$^k$.

957$^a$ is the center or pivot for the lever 957.

957$^b$ is an adjustable contact-screw, to which electric current passes, from the lever 957, on its way to the shutter-operating electro-magnet 953.

957$^c$ is an adjustable stop-screw, which limits the movement of the cut-off lever 957, when this is acted on by the shutter cut-off electro-magnet 956.

960 is the picture screen, which may be of any suitable material.

This screen is shown in Fig. 8 and some others, but is omitted in other figures.

962 is a frictional brake-lever for bearing on the film pay-out roll 38.

962$^a$ is the center-rod for the brake-lever 962.

962$^b$ is a cover of felt or leather for the brake-lever 962, where it bears on the pay-out roll 38.

962$^c$ is a contractile spring, for pressing the brake-lever 962 against the pay-out roll 38.

962$^d$ is a supporting piece for said spring 962$^c$ (and also for the returning spring 39$^d$), which is attached to the top of the bar 39$^e$.

963 is a shaft on which the weight 936, for driving the take-up roll 44, is wound, see Figs. 24, 24$^A$, 24$^B$, and 26.

963$^a$ is a key for attaching the ratchet-wheel 963$^b$ to the shaft 963.

963$^b$ is a ratchet-wheel which is attached to the shaft 963, by the key, 963$^a$.

964 is a gear which is mounted nicely but loosely on the shaft 963, and is driven by said shaft through the ratchet-wheel 963$^b$ and the pawl 964$^b$.

964$^a$ is a shoulder-pin set in the gear 964 and on which the pawl 964$^b$ is mounted.

964$^b$ is a pawl, mounted on the shoulder-pin 964$^a$ in the gear 964, and through which the weight 936 and the ratchet-wheel 963$^b$ give motion to the gear 964.

965 is a ratchet-wheel which is attached fast to the gear 964.

965ª is a pawl, which prevents the backward movement of the ratchet-wheel 965 and gear 964.

965ᵇ is the center or pivot for the pawl 965ª.

965ᶜ is a spring, which holds the pawl 965ª normally in engagement with the teeth of the ratchet-wheel 965.

966 is a key or handle for turning the shaft 963, so as to wind up the driving weight 936.

967 is a pinion set fast on the shaft 967ª.

967ª is a shaft which carries the pinion 967 and the gear 967ᵇ.

967ᵇ is a gear which is keyed to the shaft 967ª.

967ᶜ is a pinion which is keyed to the shaft 44ª, which drives the take-up roll 44.

969 is a toothed wheel, having spaces between the teeth, filled with pieces of bakelite or other suitable material 969ᵇ; the whole serving as a rotary current-interrupter, to interrupt the electrical current periodically and rapidly, see Figs. 3ᴮ to 3ᴰ; also Figs. 2ª and 18ª.

969ª is the shaft on which the wheel 969 is mounted.

969ªª, 969ªª, are keys in said shaft 969ª.

969ᵇ are pieces of bakelite or other suitable insulating material, which are used to fill the spaces between the conducting teeth of the wheel 969.

969ᶜ, 969ᶜ, are side plates for the current-interrupting wheel 969, each provided with an inwardly-turned flange which fits over the wheel 969 and over the insulating pieces 969ᵇ, set in it, to hold them in place.

969ᵈ, 969ᵈ, are ball-bearings for the shaft 969ª.

969ᵉ is a pulley, keyed to the shaft 969ª, for driving it, but it may be driven in any other suitable manner.

970 is a brush-holder.

970ª is the shaft or pivot-pin on which the brush-holder 970 is mounted.

970ᵇ is a contact spring or brush.

970ᶜ is a screw in the brush-holder 970, for tightening the grip of the same on the contact springs 970ᵇ, mounted in said brush-holder.

970ᵈ is a contractile spring which serves to hold the brushes 970ᵇ against the surface of the current-interrupting wheel 969, or against its shaft 969ª.

970ᵉ is a pin, to which one end of the brush-holder spring 970ᵈ is fastened.

970ᶠ is a piece of silver or other non-oxidizing material, attached to the bearing surface of the brush 970ᵇ. This silver is provided because of its non-sparking or low-sparking qualities.

*My central station apparatus or broadcasting apparatus*

This apparatus, stated briefly, includes:

First: Means for broadcasting speech and music; and

Second: Means for broadcasting picture-control, so as to control the projecting, on the subscriber's premises, of pictures in synchronism with the words and music that are broadcast from the central station. Insofar as the broadcasting of articulate speech (whether spoken or sung) and of instrumental music is concerned, this may be done in any suitable manner. The manner shown in my drawings consists, briefly stated, in producing electrical waves or vibrations of super-audible frequency, or of radio frequency, which serve as a carrier for the words and the music; producing, at the same time, electrical vibrations of audio-frequency, corresponding to the words and music to be broadcast, and modulating, by means of these audio-frequency vibrations, the radio-frequency vibrations, which are then distributed in this modulated form. The electrical waves or vibrations thus broadcast are, on the subscriber's premises, by processes and apparatus which are well understood and widely used, demodulated or detected and converted into audible sound. So far as the broader features of my present invention are concerned, the broadcasting and the receiving of the words and of the music electrically, may be done in ways that are now well known in the art and widely used. One apparatus for the purpose is described in detail below; but any other apparatus that is suitable for the purpose may be used.

As to the second important feature of my system, namely, the projecting of pictures on the premises of subscribers—pictures which illustrate or in some way relate to the words broadcast from the central station—pictures which illustrate persons, things, scenes, facial expressions, gestures, thoughts and feelings, or other acts or things relevant to the verbal matter broadcast—according to my preferred process, I do several things for this purpose, as, for example:

(a) The lecture, reading or address, or the play, opera or other dramatic representation that is to be broadcast is first prepared, in whole or in part; or if it already exists, it is selected.

(b) Pictures illustrative of matters and things belonging to the lecture, reading or address aforesaid, or belonging to the play, opera or other dramatic representation aforesaid, or relating to matters or things which are described in, or referred to in it, or which are relevant to it, are prepared, as before described, preferably in the form of a picture film.

(c) These pictures are copied and multiplied by any suitable copying or multiplying process.

(d) The pictures thus produced and copied (or it may be copies of these copies), are distributed bodily to the subscribers in advance of the broadcasting of the lecture, reading or address or the play, reading or opera or other dramatic representation to which they relate.

(e) Preferably, the pictures in the form of film or otherwise, distributed from the central station, are identified, as before said, by means of letters, words, numbers, marks or signs placed on them or on something connected with them, and the subscribers are advised from the central station or by persons controlling it, or acting in connection with it, when to put the appropriate film into the picture-projecting machine on the subscriber's premises. This advice may be given in various ways, of which I shall mention three, namely:

(I) The subscribers may be advised in writing, delivered by mail or by messenger, to put such a film (clearly identifying it by its distinctive letters, words, numbers, marks or signs, or in some other suitable way) into the projecting machines on their several premises at such a day, hour and minute, or fraction of a minute;

(II) Similar advice may be given by advertisements, printed in the newspapers or in other periodicals;

(III) Such advice may be given by words which are broadcast from the central station, preferably, at or near the time of the performance.

Lastly, some two or even all three of these methods may well be used at the same time, at least the third, with either the first or the second.

(f) The film, or other picture-carrying elements, having been placed in the subscriber's projecting machine, conformably to advice from the central station, the words of the lecture, reading or address or of the play, opera, or other dramatic representation, are broadcast to the subscribers and the pictures in the several projecting machines are simultaneously changed by the action of apparatus which is controlled by electrical impulses sent out from the central station, so that the appropriate picture is shown on the screen on the subscriber's premises, at the time that it is needed, to harmonize with the words broadcast from the central station.

Preferably, a similar projecting-machine, supplied with similar pictures, is similarly operated at the central station and the pictures from this projecting machine (which are similar to those produced on the subscriber's premises) are exhibited in the sight of the picture-control operator, on a screen (as 960) in the control room 12, so that he is able to see that the pictures are synchronizing with the verbal matter, that is, with the words and music, which are being broadcast at the same time from the central station.

As to the picture-controlling impulses, sent out from the central station, these may be of various sorts, as described in this application and in other applications of mine which are now pending, or in course of preparation for filing in the United States Patent Office. One means for this purpose, in a space-broadcasting system, as described and illustrated below, is to send out electrical waves for the purpose of affecting the picture-changing (or film-advancing) mechanism of the projection machines on the subscriber's premises, amplifying these electrical waves on the subscriber's premises, rectifying them, and applying the rectified currents to operate the picture-changing apparatus, as described more at length below.

With this preliminary description, it will now be convenient to turn to the drawings.

The apparatus of Fig. 1

Looking first at Fig. 1, in this the broadcasting station is marked 353. The receiving stations or subscribers' stations are each marked 355. The broadcasting station has, preferably two antennas or aerials, namely, an aerial 340, for broadcasting words and music, that is, for broadcasting a carrier wave which is modulated by words, spoken or sung, and also, preferably, by instrumental music; and another aerial 340e, which serves for the broadcasting of the electrical waves that, in turn, serve to control the picture-projecting machines on the subscriber's premises, and which, preferably, also control a similar projecting machine at the central station or otherwise in the sight of the picture-control operator. The waves from the two antennas, 340 and 340e, we shall assume have different lengths and frequencies. The receiving stations (the subscribers' stations 355, 355) are furnished with a receiving antenna 341, as shown in Figs. 1, 2a and 7A; but each of said stations may be furnished with a plurality of receiving antennas, (as 341 and 341e) one serving to receive waves on which speech or music are broadcast and the other to receive the picture-controlling waves, as shown schematically in Figs. 4, 5, 6, and 7B. 350 is the power connection for a broadcasting station, and 351 is the ground connection for a receiving station.

Instead of the form of antenna shown symbolically in the drawings aforesaid, a loop antenna or a plurality of loop antennas may be provided, particularly in the receiving apparatus. These loop antennas are now well known and widely used in the art; and yet other forms of antenna are known in the art, for example, the plate or condenser antenna. This matter of antennas will be understood without further illustration or description, and the reader will understand that any form of antenna—any form of wave-distributing or wave-receiving device that is suitable for the purpose may be used.

The apparatus of Fig. 2a

Turning now to Fig. 2a, this illustrates, schematically the music studio with the musicians' room 11, in which the musicians, with their instruments and the telephonic transmitter or electrical pick-up 1, are located and the control room 12, which, preferably, is separated from the musicians' room 11, by sound-proof partitions, parts of which, marked 11b, 11b, are of clear glass, so as to permit persons in one of the rooms 11 or 12 to see persons in the other of said rooms, while other parts of said partition 11a, 11a, are made of opaque material, preferably, in each case, with double walls to insulate the one room acoustically from the other.

In the room 11, the pick-up 1 is located, as aforesaid; and in this room the musicians sit in chairs 40, 40, some of which are arranged to be quite near to the electrical pick-up 1, while other chairs are located much more remote from it, as the drawings show. A singer or a violinist should, preferably, sit in one of the chairs 40, that is, near to the electrical pick-up 1, while a player on the double bass, and still more so, one who plays on the brass instruments or who plays the tympani, should stand or sit at a much greater distance from said pick-up 1. Instead of sitting in the chairs 40, 40, the musicians may stand in whatever positions, with relation to the pick-up 1, may seem best to them, as is often done. These are details which are best controlled by a competent musician on the spot, either in the musicians' room 11, or in the control room 12.

The electrical pick-up 1 may be of any suitable kind. That seen in Fig. 2a is of the kind shown in Fig. 9, and hereinafter described, having two circuits, namely—

(a) An exciting circuit or field circuit 8a, which includes the exciting coils 5a, 5a, (Fig. 9) of the field-magnets 5, 5, of the transmitter or pick-up, the battery b and the rheostat R4, by which the intensity of excitation of the field magnets 5, 5, aforesaid, is varied at will; and (b) The working circuit 8, which includes—

(I) The inductive coils 5b, 5b, wound on the poles of the field magnets 5, 5, (Fig. 9) in which currents are induced by the vibrations of the diaphragm 1a, 1a, lying between said poles;

(II) The grid G of the vacuum tube v'; and (III) The filament F of said vacuum tube v'.

(c) Preferably, also, a high-pass wave-filter 640 is provided, by which sounds that are low in pitch are excluded from the vacuum-tube amplifier v'.

In the musicians' room 11, or in the control room 12, or in any other convenient place, a vibration-amplifying device, preferably, an amplifying device of the vacuum-tube variety, is located, serving to amplify the electrical vibrations produced in the electrical pick-up 1, by the action of the vibrations of the air on the diaphragm 1ᵃ of said pick-up. See, for this diaphragm, Fig. 9. In Fig. 2ᵃ (also in Fig. 9) this vibration-amplifying device is indicated diagrammatically by the vacuum tubes v', v², v³, with their associated and accessory parts and connections, all of which are now well known and widely used in the art. The grid G of the first vacuum tube (Fig. 9) is fed with electrical vibrations corresponding to words or music or to both of these from the pick-up 1, and the output circuit 354 of the last tube v³, feeds the broadcasting apparatus, 353, as illustrated in Fig. 2ᵃ, and more clearly in Fig. 3, and as described more at length below.

In Figs. 2ᵃ and 9, transformer couplings are shown between the several vacuum tubes (as v', v², v³, et cetera) of the amplifier; but resistance couplings, as shown in Fig. 7ᴮ, and which are now well known in the art, or any other couplings that are suitable for the purpose, may be used instead of the transformer couplings, shown in Figs. 2ᵃ and 9, et cetera.

The control room 12, is, preferably, separated from the musicians' room 11, by sound-proof walls, as 11ᵃ and 11ᵇ, the latter being formed of clear glass, as before said. And in the control room 12, the following persons and things, in addition to the vacuum-tube amplifiers before described, should, preferably, be located, namely—

(a) A loudspeaker, preferably of the kind described below, and marked 3, 4, which is made to be as nearly as practicable the very same acoustically as the loudspeakers which are furnished to the subscribers, as described more at length below. This loudspeaker may be fed from a power amplifier tube (as, for example, the tube v³, in Fig. 2ᵃ, or in Fig. 9, or the tube v², in Fig. 3) with audio-frequency vibrations; and this is the common practice. But, preferably, I feed said loudspeaker by means of a radio receiving set, such as the subscribers are furnished with.

(b) A control operator for the words and music broadcast, whose chair, 40ᶜ, is shown in Fig. 2ᵃ;

(c) A control apparatus for the control operator, preferably, one that is delicately responsive and easily controlled, by which the control operator is enabled to give expression to the music, and to compensate, in great part, for modifications and inequalities in the electrically-reproduced music (the music from the loudspeaker 3, 4) as it would sound if no control apparatus and no control operator were provided. Any control apparatus that is suitable for the purpose may be provided.

(d) A picture-control operator who oversees and controls the synchronizing of the pictures (controlled from the central station) with the words and music that are broadcast from it. This picture-control operator may, when extreme economy is necessary, be the same person as the control operator for the words and music. But, preferably, a different individual from the music-control operator serves as picture-control operator, so that the latter can give his whole attention to the controlling of the pictures. In the drawings, Fig. 2ᵃ (also in Fig. 2ᶜ), 40ᵈ is the chair or seat for the picture-control operator, and 9 is his key or switch (shown more clearly in Fig. 18ᵃ) by which he closes and opens a circuit as required, to advance the pictures in the projecting machines on the subscriber's premises, each picture or frame as required.

(e) Preferably, I also provide, in the control room 12, a picture-projecting apparatus 8ᶜ, which is similar to the picture-projecting apparatus furnished to the subscribers, and which, preferably, like the subscriber's projecting-machines, is controlled by electrical impulses, sent out from the central station, so that its behavior is as nearly as possible the same as that of the projecting machines on the subscriber's premises. This picture-projecting machine 8ᶜ, at the central station, is preferably arranged to throw its pictures onto a suitable screen 960, which is located in a position to be constantly viewed by the picture-control operator, who hears from the loudspeaker 3, 4, the words (whether spoken or sung) that are broadcast, and the music accompanying them and sees, at the same time, the pictures that are being produced by a projecting machine, which is the same, as nearly as practicable, as the projecting machines furnished to the subscribers. The screen 960 may be attached to the wall 12ᵈ of the room 12, towards which the picture-control operator, when sitting in his chair 40ᵈ, faces; or said wall 12ᵈ, suitably covered, painted or treated, may, itself, serve as the screen on which the pictures are projected.

Preferably, the musicians' room 11, and particularly the control room 12 should be feebly illuminated, in order that the pictures thrown on the screen by the projecting machine 8ᶜ, in the control room 12, can be more readily viewed. Or, as an alternative to the darkening of the rooms 11 and 12, the picture-control operator, with his chair 40ᵈ, his controlling keys 9, and 9*, his current interrupter 475, his picture-projecting machine 8ᶜ, and screen 960, and a suitable loud-speaking apparatus, as 3, 4, acoustically similar to that furnished to the subscribers, may be placed in a room of his own, 11ᵘ, which is kept almost dark, so that he can the more readily view the pictures thrown from his projecting machine 8ᶜ, on to the screen 960. This modification is illustrated in Fig. 2ᶜ in which the room 11ᵘ, for the picture control operator is located at the left of the musicians' room 11;

(f) Preferably, a musical conductor in addition to the music-control operator, is provided in the control room 12, and a conductor's box or podium 12ᵇ, is also provided, on which the conductor or directing musician stands, in the room 12 to beat time for the musicians in the room 11, and to direct them by gestures, signals, or otherwise. Of course, this directing musician may work in the musicians' room 11, in which the musicians who sing and play are located. But while it is well to have a directing or controlling musician in the room 11, who is in close proximity to the musicians, and can easily give them any desired instructions, and place them in any positions with relation to the pick-up 1, that seem desirable to him, it is also desirable to have a conductor in the room 12 who hears the music, not as it is produced by the musicians in their room 11, but from a loudspeaker 3, 4, which, preferably, is exactly similar acoustically as described below, to the loudspeakers furnished to the subscribers on their several premises. In other words, the conductor in the room 12 hears the electrical voice of the music; he hears, as nearly as practicable, the very same music as the subscribers hear on their several premises; and if that music is not satisfactory, he can direct and control the musicians who sing or play in the room 11, so as to improve such music.

The speech-and-music circuit 354 (Figs. 2ª, 9, etc.) feeds the broadcasting apparatus 353, so as to affect its antenna 340, as described more at length below, in connection with Fig. 3; and the picture-control circuit 354ᶜ, operated by the picture-control operator's key 9, in Fig. 2ª, (and see, also Fig. 18ª) also acts on the broadcasting apparatus so as to control the action of the antenna 340ᶜ, which serves for broadcasting picture control, as described more in detail below.

With this brief and general description of the apparatus at the central station, we may now consider—

*My speech-receiving and music-receiving and picture-control receiving apparatus on the subscriber's premises*

For this purpose, we have, preferably, as shown in Fig. 8—

(a) A wireless receiving apparatus 36, which, preferably, is made to be the same, as nearly as practicable, as the wireless receiving apparatus provided at the central station, and to which the control operator listens.

(b) A loudspeaker 3, 4, which, preferably, is similar acoustically to that at the central station, to which the music-control operator and other musicians in the control room 12 listen, as explained more at length below.

(c) A picture-projecting machine 8ᶜ, whose controlling electromagnet or magnets are fed from the wireless receiving apparatus. This machine, also, is preferably similar to the projecting machine at the central station, at least in respect to feeding the pictures synchronously in the projecting machines on the subscriber's premises, and in that at the central station;

(d) A picture strip or film 19ª or other collection of pictures, is, preferably, placed in the projecting machines on the subscriber's premises (or in so many of them as are used to receive pictures) conformably to directions from the central station, as before explained; and this picture strip or film is, preferably, similar to the picture strip which, at the same time, is placed in the projecting machine 8ᶜ, at the central station, whose pictures the picture-control operator (seated in the chair 40ᵈ) watches. 36ª, 36ª, are tuning-control knobs, and 36ᵇ is a volume-control or loudness-control knob, belonging to the wireless receiving set 36, seen in Fig. 8. Figs. 3ᴳ, 3ᴴ, 3ᴵ and 44ᶜ described more in detail below illustrate my picture film.

*More detailed description of my apparatus*

With this brief and general description of the essential features belonging to my apparatus, we may now take up the several portions of the apparatus more in detail. Wide variations in detail are practicable, and are easily made by persons skilled in the art. But, notwithstanding, it seems desirable to illustrate one set of details; and when this has been done, persons skilled in the art can vary from the details described in many ways, without departing from the essential features of my invention, which are set forth in the statement of claim at the end hereof.

Turning, first, to Fig. 3, this, when taken in connection with Fig. 2ª, already described, illustrates one means for broadcasting words (whether spoken or sung) and music from the central station, by producing an electrical wave or carrier wave of superaudible frequency or radio frequency, and modulating this high-frequency wave by the vibrations of lower frequency, belonging to the speech and music that are being broadcast.

In Fig. 3, the circuit 354, which is seen in Fig. 2ª as the output circuit of the vacuum-tube vibration-amplifying-device ($v'$, $v^2$, $v^3$, et cetera), whose input circuit is fed from the electrical pick-up 1, may be regarded as the input circuit of the broadcasting apparatus. This apparatus is shown in Fig. 2ª symbolically, and marked 353; but in Fig. 3, the essential parts belonging to it are shown schematically. These, described briefly and confining our description at first to the part of the apparatus which serves for the broadcasting of words (whether spoken or sung) and of music, consist of the following parts:

(a) The input circuit 354, before described, in connection with Fig. 2ª, whereby electrical vibrations corresponding to speech and to music, are fed to the broadcasting apparatus;

(b) An audio-frequency amplifying device; that is, a device for further amplifying the vibrations existing in the input circuit 354;

(c) An oscillator, that is, a source of high frequency oscillations, marked 343;

(d) A modulating device or modulator, whereby the speech vibrations and the electrical musical vibrations from the input circuit 354 aforesaid are impressed upon the high frequency vibrations from the oscillator aforesaid;

(e) A broadcasting antenna or aerial 340, whereby the modulated high-frequency electrical oscillations are thown off into space;

(f) A direct-current source $B^5$, for supplying the energy thus thrown off into space;

(g) One or more batteries, or other direct current sources for the several vacuum tubes, conformably to approved practice in the art;

(h) Transformers or other suitable means for connecting (or coupling) the several vacuum tubes belonging to my apparatus, with each other;

(i) Switches, rheostats, condensers and other usual accessories of a broadcasting apparatus; these are already well known in the art.

As before said, I, preferably, use in the present state of knowledge, for amplifying the vibrations from the electrical pick-up 1, a vacuum-tube amplifying device. Two stages of audio-frequency amplification are shown in Fig. 3, in the tubes $v'$ and $v^2$, and practically a third stage in the modulator tubes $v^3$ and $v^4$; that is, these latter tubes not only modulate the vibrations, but also exert an amplifying effect on them. And these several stages of amplification, shown in Fig. 3, are in addition to the three stages of audio frequency amplification, belonging to the apparatus shown in Fig. 2ª, whose output circuit 354 is the input circuit of the tube $v'$ in Fig. 3. But a greater or less number of stages of amplification may be provided, according to the necessity of the case. All this is now well known in the art.

As to the oscillator or source of high-frequency electrical vibrations 343, this, preferably, is of the continuous-wave type, but may be of any suitable sort or kind thereof. Three broad types of continuous-wave oscillators have been widely used in the art, namely—

(a) The Poulsen arc;

(b) The high-frequency alternators of Fessenden and Alexanderson; and (c) The vacuum tube of Fleming and De Forest, arranged to serve as an oscillator, in a manner that is now well known and is widely used in the art.

The latter device is now used very generally, indeed, almost universally, and seems to be, on the whole, preferable to any other, especially for high-frequencies. These matters are well understood in the art, so that I need not go into them any further here. For it will be understood that any oscillator that is suitable for the purpose may be used, in connection with my broadcasting devices.

The modulating device for example as in Fig. 3, may be of the same general type as that described in the patent to Heising No. 1,137,315, issued April 27, 1915, in which two vacuum tubes (marked $v^3$ and $v^4$, in my Fig. 3) are connected together in series; the high-frequency electrical vibrations from the oscillator (343 in my Fig. 3) being applied to the grid of one of these tubes (the tube $v^4$ in my Fig. 3) and the musical electrical vibrations, by which the high-frequency vibrations are modulated, being applied to the grid of the other one of said tubes—the tube $v^3$ in my Fig. 3. But other forms of modulating device are well known in the art, for example—

(a) Heising's two-grid modulator, having two grids in the same vacuum tube, one grid being connected with the high-frequency oscillator and the other grid with the source of musical electrical vibrations, by which the high-frequency vibrations are modulated. This form of apparatus is described in the Letters Patent of the United States to Heising No. 1,199,180, issued Sept. 26, 1916, reissued as Patent No. 14,967;

(b) Heising's so-called constant-current system, which is described in the Letters Patent of the United States to him, Nos. 1,442,146 and 1,442,147, issued Jan. 16, 1923. This system of modulation is well known and widely used, and may well be employed instead of the series-connected modulator tubes, shown in my drawings;

(c) Yet many other forms of modulating devices are known in the art, which it is not considered necessary to mention here.

But it will be understood that any modulating device whatever that is suitable for the purpose may be used in practicing my invention, in combination with the other elements herein described.

The broadcasting antenna or aerial 340, which serves for speech and music in Fig. 3, and also the other antenna 340$^e$, in my Fig. 3 aforesaid, which serves for the broadcasting of picture control, may, also, be of any suitable sort or kind whatever. The direct-current source for furnishing the energy that is thrown off into space by the antenna 340 or 340$^e$ in Fig. 3, is marked B$^5$ in the drawings. This source may be of any suitable sort or kind. For a station of small power, a storage battery may well be used; but for a station of larger power, a direct-current dynamo, or a good rectifying device should be provided, preferably, one of the three-phase type, in which three-phase current from the electric light mains or from any other suitable source, is increased in voltage by step-up transformers and applied to rectifying tubes; with filters of the best kind for suppressing the ripples of the direct-current and producing a direct current as nearly uniform and steady in voltage as possible. All this is well known in the art, and any source of high-voltage direct current that is suitable for the purpose may be used.

With the exact details shown in Fig. 3 (which, however, may be altered within wide limits, if desired) the musical electrical currents supplied by the input circuit 354 are fed through the corresponding step-up transformer $t'$, or in any other suitable manner, to the grid G of the corresponding first-stage vacuum tube $v'$. And from the plate circuit of this tube, amplified currents are fed through the inter-stage transformer $t^2$ (or in any other suitable manner, as for example, thru a resistance coupling) to the grid of the second-stage tube $v^2$. And from the plate circuit of this tube, when only two stages of amplification are used (or from the plate circuit of the last tube of the audio-frequency amplifier, if a larger number of stages of audio-frequency amplification be provided) the musical electrical vibrations are transmitted by the transformer $t^3$, or by a resistance coupling, or in any other suitable manner, to the grid G of the vacuum tube $v^3$, which belongs to the modulator. The plate or anode P of this tube $v^3$ is connected by the wire 507, in series with the filament F belonging to the tube $v^4$. And the plate-circuit of the tube $v^4$ is connected, through the primary winding 395 and the direct-current source B$^5$ with the filament F of the tube $v^3$.

The current of electrons, then flows from the negative pole of the source B$^5$ to the filament F of the tube $v^3$; thence, through the vacuous space in said tube, to the plate P thereof; thence, by the wire 507 to the filament F of the tube $v^4$; and thence, across the vacuous space in said tube $v^4$ to its plate or anode P; and from this, through the primary winding 395 of the transformer $t^5$ to the positive pole of the direct-current source B$^5$.

Filament-heating batteries or A-batteries, marked A, anode batteries or B-batteries, marked B, and one or more grid-biasing batteries, or C-batteries, marked C, are provided, as shown in the figures, and according to approved practice in the radio art. But other sources of direct current may be provided, instead of these batteries, as for example, direct-current dynamos or rectifying devices with filters, called battery-eliminators, as is now well known; for indeed, this has become common practice in the art.

The musical electrical currents, then, or the speech currents, which are supplied by the input circuit 354, are amplified by the corresponding vacuum-tube amplifiers $v'$ and $v^2$, (Fig. 3) with the associated parts; are employed to modulate the high-frequency currents from the corresponding oscillator, 343, and the amplified, modulated currents from the plate circuit of the tube $v^4$ are applied by the transformer $t^4$, or in any other suitable manner, to the corresponding antenna or aerial 340. For this purpose, said transformer $t^4$ is provided with a primary winding 395, in series with the plate P and the direct-current source B$^5$, and with a secondary winding 395$^a$, in series with the aerial 340 or 340$^e$, and its adjustable tuning condenser C$^{21}$.

In the lower part of Fig. 3, another broadcasting device is shown, having the oscillator 343$^e$ acting on the power tube $v$, which, in turn, through its plate circuit 395 and the transformer $t$, acts on its broadcasting antenna, 340$^e$. This broadcasting device serves to broadcast picture-controlling electrical waves; it will be referred to later in connection with the matter of picture control.

*My radio receiving apparatus*

Radio-receiving apparatus is made in a great variety of forms, as, for example, a crystal detector, without amplification; a crystal detector with one or more vacuum tubes for amplification; vacuum-tube apparatus, without the crystal and with a single tube, serving the double purpose of detection and amplification. But better vacuum-tube receivers are made with various combinations of tubes, as two, three, four, five or more of them. The combinations of receivers made with a plurality of tubes and accessories or associated parts are exceedingly numerous, and many of these are well known in the art.

The best radio-receiving apparatus of a very simple character, that I know, for receiving speech and music, consists of an antenna 341; a tuner 342; a detector 344; and a telephonic receiver or loud-speaker 3, preferably provided with a horn 4, as shown schematically in Fig. 4. This is a one-tube apparatus of limited usefulness. A better apparatus comprises an antenna 341; a tuner 342; a radio-frequency amplifier 348; a detector 344, and a loud-speaker, 3, with a horn 4, as shown schematically in Fig. 5. Or an audio-frequency amplifier 346, following the detector 344, may be used, instead of the radio-frequency amplifier 348 preceding it. But a still better apparatus has both sorts of amplifiers and comprises an antenna 341; a tuner 342; a radio-frequency amplifier 348; a detector 344; an audio-frequency amplifier 346; and a telephonic receiver or loud-speaker 3, as shown schematically in Fig. 6. Such an apparatus may have, according to the circumstances of the case, one, two or more stages of radio-frequency amplification 348, and also one, two or more stages of audio-frequency amplification, 346. This sort of apparatus, when properly made and adjusted conformably to the best practice in the art, has a high degree of selectivity, by reason of the radio-frequency amplification, which is usually in two or more stages; and it has ample power, by reason of the combination of radio-frequency amplification and audio-frequency amplification.

The upper set of parts in each of the schematic drawings, Figs. 4, 5, and 6, from the antenna 341 to the loud-speaker 3, with its horn 4, serves for receiving speech and music vibrations that are broadcast from the central station by the antenna 340; but the lower set of parts in each of said Figs. 4, 5, and 6, from the receiving antenna 341e to the picture-projecting machine 8c, serves for receiving picture-controlling impulses that are broadcast from the antenna 340e. In the lower or picture-controlling set of parts in each of said Figs. 4, 5, and 6, it will be observed that there is a receiving antenna 341e, a tuner 342, a radio-frequency amplifier 348, and a rectifier 344a, which acts on the picture-projecting machine 8c in the manner illustrated in Figs. 24 to 40, and hereinafter described.

In Figs. 4, 5, 6, and 7B, in which two receiving antennas, 341 and 341e, are provided; one of these serves to receive speech and music, and the other serves for picture control. Each of these antennas is, preferably, tuned or in some way adjusted in agreement with a corresponding broadcasting antenna or aerial; that is, the receiving antenna 341, serving to receive speech and music, is tuned or adjusted in agreement with the speech-and-music broadcasting antenna 340, so that the former receives from the latter; and in like manner, the receiving antenna 341e, serving for picture control, is tuned or adjusted in agreement with the corresponding broadcasting antenna 340e and receives from it. But a single receiving antenna 341, only may be provided, which receives from both of the broadcasting antennas 340 and 340e, as illustrated, for example, in Figs. 1 and 2a, and more in detail in Fig. 7A.

Of the several forms of receiving apparatus for speech and music shown schematically in the upper set of parts, fed by the antenna 341, in Figs. 4, 5 and 6, respectively, namely:

(a) The antenna 341, the tuner 342, the detector 344, and the loud-speaker 3, in Fig. 4;

(b) The antenna 341, the tuner 342, the radio-frequency amplifier 348, the detector 344, and the loud-speaker 3, in Fig. 5; and (c) The antenna 341, the tuner 342, the radio-frequency amplifier 348, the detector 344, the audio-frequency amplifier 346, and the loud-speaker 3, in Fig. 6—all these forms of apparatus are well known in the art, and the last combination (paragraph "c" above), particularly, is widely used in this country, and has the advantage, as before said, of giving a high degree of selectivity, and a good degree of loudness, when required.

One circuit arrangement for the type of receiving device shown symbolically in Fig. 6 is illustrated schematically in Fig. 7A. Thus, Fig. 7A aforesaid shows, in effect, two radio receiving devices for receiving from the broadcasting antennas 340 and 340e, respectively, shown in Fig. 3. One of these receiving devices serves, as before said, to receive speech and music from the antenna 340, while the other serves to receive picture-controlling impulses (or more shortly, picture-control) from the broadcasting antenna 340e. This reception may be effected by means of two receiving antennas 341 and 341e, as in Fig. 7B or by means of a single receiving antenna 341.

Considering Fig. 7B, the receiving device for music and speech shown in this figure, and fed from the broadcasting antenna 340 (seen also in Figs. 1 and 3) includes, briefly and informally stated, a receiving antenna 341, a tuner, a radio-frequency amplifier, a detector, an audio-frequency amplifier, and a loud-speaker. The antenna 341, which is shown schematically, may be either of the outdoors grounded type, or of the loop or indoors type; or, indeed, it may, as before said, be of any other type whatever that is suitable for the purpose. The tuner, shown schematically by the tuning condensers, $C^{22}$, $C^{23}$ and $C^{23}$, may also be of any suitable type; preferably, air condensers are provided, each having two sets of vanes, one of which sets is fixed while the other is movable, to adjust the capacitance. Such condensers are well known and widely used in the art; and, preferably, the tuning condensers of each set (of each horizontal row of parts in Fig. 7B, or at least the two condensers $C^{23}$, $C^{23}$, belonging to the same sub-set of parts, are connected together, so that they are operated by a single knob or other single control. This mode of working is well known in the art, and needs no further description.

Two radio-frequency-amplifying vacuum tubes, $v'$ and $v^2$, are shown in each sub-set of parts, in Fig. 7B; but a larger number of stages of amplification may well be used; or, on the other hand, in favorable circumstances, a single radio-frequency amplifying tube may be used. To prevent these tubes from developing reactance effects, any suitable device for preventing the self-oscillation of the tube may be provided. The device shown for this purpose in Fig. 7B, is a small neutralizing condenser $C^{25}$, connected between the grid G of the tube and a suitable point on the secondary winding of the transformer ($t^2$ or $t^3$) whose primary is fed by the plate-circuit of the same tube. All this is according to the well-known neutrodyne circuit arrangement of Professor Hazeltine, described in the United States Letters Patent to him, No. 1,450,080, of March 27, 1923, and No. 1,489,222 of April 1, 1924, to which reference is made for a fuller description of said neutralizing arrangements and the best manner of adjusting and using them. This neutrodyne circuit, moreover, is well known and widely used in the art.

The detector tube $v^3$ is, (or at least may well be) of the usual type, with a tuning condenser $C^{23}$, a blocking condenser or grid condenser, $C^{24}$, a grid-leak 388, and a plate by-pass condenser $C^{35}$, for by-passing the primary coil $d^6$, which is connected in series with the plate P. But the well-known crystal detector or any other type of detector that is suitable for the purpose may be used, instead of the vacuum-tube type shown in my drawings.

The audio-frequency amplifying tubes $v^4$ and $v^5$, fed from the antenna 341, in Fig. 7B, with their connections and accessories, are of a well known type, that will be understood from the drawings, by persons skilled in the art.

With the exact details shown in Fig. 7B, each of the receiving antennas 341 and 341e is tuned by means of the corresponding reactance coil $6^d$, and the adjustable condenser $C^{22}$, which are in series with each other, but which are arranged, as the drawings show, in such a manner that they form parallel or alternative paths for the currents that flow in the corresponding antenna. The coil $6^d$, with the corresponding adjustable condenser $C^{22}$, forms what is known as a rejector circuit. The grid G of the tube $v'$ is connected with the corresponding antenna (341 or 341e) above the rejector circuit; and below the rejector circuit, said antenna is connected with the corresponding filament F. The rejector circuit $6^d$, $C^{22}$, in circuit with the antenna 341 is tuned, by adjusting the condenser $C^{22}$ (or in any other suitable manner) into resonance with the waves that are broadcast by the broadcasting antenna 340; and, similarly, the rejector circuit $6^d$, $C^{22}$, that is connected with the receiving antenna 341e, is tuned, or adjusted to receive the waves that are broadcast by the other broadcasting antenna 340e; see Figs. 1, 3, et cetera.

The waves propagated from the receiving antenna 341 to the grid G of the corresponding first-stage vacuum tube $v'$, are communicated in an amplified form, by the plate circuit of said tube $v'$, through the transformer $t'$ or through any other suitable circuit arrangement, to the grid of the second-stage tube $v^2$; and the plate circuit of this tube acts, through the transformer $t^2$, or through any other suitable circuit arrangement, on the grid of the detector tube $v^3$. And the plate circuit of this tube acts through the transformer $t^3$, or through any other suitable circuit connection, upon the grid of the first-stage audio-frequency-amplifying tube $v^4$; and the plate circuit of said tube $v^4$ acts through the transformer $t^4$ or other circuit connection, on the grid of the second-stage audio-frequency-amplifying tube $v^5$. And the plate circuit of said tube $v^5$ acts, through the transformer $t^5$, or through any other suitable circuit arrangement, on the corresponding loud-speaker 3, which, preferably, is provided with a horn 4.

In Fig. 7B, transformers may be used to connect the plate circuit of one tube with the grid of the next following tube in the series, and are shown in connection with some of the tubes, while the tubes between the detector tube $v^3$ and speaker 3, 4 are connected by resistance couplings. But other modes of connecting or coupling the successive vacuum tubes of a set, in a radio-receiving device, are known and may be used; for example, resistance couplings and choke-coil couplings, both of which are well known and widely used in the art.

The transformer coupling shown when well executed, has certain advantages; but when ill executed, it may be very poor. I prefer to make my transformers (as $t^3$, $t^4$, $t^5$, et cetera) in those cases in which transformer couplings are provided, with a sufficient amount of iron (with a sufficient cross-section of iron) so that they are never magnetized near to saturation; and with a good air-gap, for example, an air-gap whose length is as much as one-twentieth (1/20th) of the length of the path of the magnetic flux in the iron; so that the chief resistance to the action of the magneto-motive force of the transformer primary $6^d$, lies in the air-part of the magnetic circuit of the transformer rather than in the iron-part. The result of this is that the reluctance of the magnetic circuit, considered as a whole, is nearly constant, and is very nearly the same at all parts of the cycle; and is very nearly the same for electrical or magnetic vibrations that are very small, and for vibrations that are very large. But a greater or less length of air-gap than that above mentioned may be provided. If the frequency at which the apparatus is working is high, say, three hundred thousand (300,000) or more cycles per second, I consider it best to use air-core transformers (transformers without iron cores) for the transformers that work at these high frequencies. But for transformers working at audio frequencies, or at low frequencies, iron may be used in the transformers, if this is of high quality and well laminated.

In Fig. 7B, there are, for the speech-and-music receiving apparatus, six vacuum tubes, namely, two radio-frequency amplifying tubes $v'$ and $v^2$, a detector $v^3$, and three audio-frequency amplifying tubes $v^4$, $v^5$ and $v^6$. But, as I have before pointed out, a greater or less number of tubes may be provided in a set or in a sub-set, according to the circumstances of the case. In some cases, a detector tube may be used, without radio-frequency amplifying tubes, and also without audio-frequency amplifying tubes. But in the great majority of cases, it is preferable to use either radio-frequency amplification or audio-frequency amplification; and the best results, it is well known, are obtained by providing both radio-frequency amplification and audio-frequency amplification. And, as before said, a greater or less number of stages of either kind of amplification may be used.

I show a single A-battery or filament-heating battery or other direct-current source, connected to feed the filaments of all the vacuum tubes; and a single anode battery or B-battery, or other direct-current source, for supplying the necessary voltage to the anodes of all the vacuum tubes. But several batteries may be used for the several tubes, if desired.

Instead of using primary batteries or storage batteries for the vacuum tubes, direct-current dynamos, with wave-filters to smooth out the ripples of the current, may be used. Also, rectifiers with wave-filters or battery eliminators, as they are popularly termed, may well be used, as before said; and I intend, in appropriate cases, to use them, particularly for the anode or space currents. Such battery eliminators are now will known and widely used in the art, so that I need not describe them in detail here.

From the foregoing, my apparatus, in a simple form, for broadcasting through the air, speech (whether spoken or sung) and music, and for receiving them radio-phonically by the subscribers, will be readily understood. It is, in the main, similar to what is commonly used in the broadcasting art; but any other suitable system for broadcasting speech and music may be substituted for it.

Various parts of my preferred apparatus for broadcasting and receiving speech and music radio-phonically, which I have described in a general fashion above, I shall describe more in detail below, but it will now be convenient to give, in this place, a general description of—

My picture-controlling system and apparatus

This has been very briefly described above. With the apparatus shown in Figs. 1 to 8, I provide, preferably, in addition to the apparatus for broadcasting speech and music, another co-acting broadcasting apparatus, by which electrical waves or vibrations are thrown off into space, which differ in some particulars from the speech-carrying waves and the music-carrying waves, so that the picture-controlling waves affect a different receiving or detecting device, preferably, a rectifier (marked 344ᵃ in Figs. 4, 5 and 6) by which a continuous current (or a direct current) is produced; and this current I then apply to operate a picture-projecting machine on the subscribers' premises (and, also, preferably, a similar machine in the picture-control room in the central station) so as to change the pictures from time to time, and preferably, at irregular intervals, according to the circumstances of the case, synchronizing the pictures with the words and music to which they relate.

Turning, now, first to Fig. 1, it will be seen that two broadcasting antennas, 340 and 340ᵉ, are provided, connected with the broadcasting station 353. The antenna 340 serves, as before described, for broadcasting speech and music; but the antenna 340ᵉ serves for broadcasting electrical waves or impulses which I apply to the controlling of my pictures, on a plurality of premises simultaneously, as before briefly described, and as described more in detail below.

Turning, next, to Fig. 2ᵃ, in this we have, in addition to the apparatus for use in broadcasting words (whether spoken or sung) and music, as before described, the following parts, namely:

(a) A chair, 40ᵈ, for the picture-control operator;

(b) A key or switch, 9, to be manipulated by him for the purpose of causing the pictures to be advanced, picture by picture, as required, in the picture-projecting machines on the subscribers' premises. This key 9 controls a circuit (marked 354 in Fig. 2ᵃ), by which it is connected with the broadcasting apparatus, 353; and (c) A picture-projecting apparatus 8ᶜ, which is, preferably, controlled from the receiving station 355, the same as a subscriber's projecting machine is controlled, and which, preferably, projects its pictures onto a screen 960, or wall, 12ᵈ, which is in front of the picture-control operator, so that he readily sees the various pictures as they are projected, one after another, and sees that they synchronize with the words and music broadcast from the central station, and to which such pictures relate, or to which they are in some way relevant or suitable.

Turning, next, to Fig. 3, in the upper part of this, we have the speech-and-music broadcasting apparatus before described, which is fed by the input circuit 354 (seen also in Figs. 2ᵃ and 9) and feeds, in turn, the broadcasting antenna 340. And below this speech-and-music broadcasting apparatus in the figure, we have, for the purpose of picture control—

(a) The oscillator 343ᵉ, preferably, having a different frequency from the music-and-speech broadcasting oscillator 343;

(b) The power-tube $v$, whose grid G is affected by the oscillator 343ᵉ; and (c) The broadcasting antenna 340ᵉ, which is acted upon inductively by the plate circuit of the power tube $v$ aforesaid, and serves to broadcast electrical waves, whose frequency is controlled by the oscillator 343ᵉ aforesaid.

Preferably, said oscillator 343ᵉ produces its oscillations continuously while the apparatus is in action; but the broadcasting antenna 340ᵉ throws off waves (or, at least, effective waves) a portion of the time only, that is, when it is desired to affect, in some way, the picture-controlling electro-magnets (as 37, 13 and 13*) on the subscriber's premises. Divers modes of working are practicable to effect this end. One is to open and close the switch $s'$, which, when open, leaves the filament F of the power tube $v$, cold, and the power tube $v$, consequently, inactive. Another mode of working is to open and close the switch $s^3$, which, when closed, short-circuits the resistance R that otherwise is in circuit with the filament F of the power tube $v$. The amount of this resistance itself is, preferably, regulated in such a way by the rheostat $R'$, shown in the drawings, that, when it is inserted into the circuit of the filament F (that is, when the switch $s^3$ is open) the filament F is quite hot, but yet not hot enough to give off an electron current that is strong enough, when broadcast by the antenna 340ᵉ, to actuate the picture-controlling electro-magnets 37 and 13, on the subscriber's premises. But when the switch $s^3$ is closed, it short-circuits the resistance R, and the temperature of the filament F suddenly rises, provided, of course, that the rheostat $R'$, in circuit with the filament F and the filament-heating battery A of the power tube $v$, are set to regulate the filament-heating current to a point at which there is considerable emission of electrons from the filament F—a sufficiently strong emission of electrons to give rise to an effective broadcasting from the picture-controlling antenna 340ᵉ, when the resistance R is short-circuited.

Thirdly, we may open and close the switch $s^2$ which connects the oscillator 343ᵉ (through the transformer $t$) with the grid G of the power tube $v$.

In each of these cases, the effect of closing the switch $s'$, or $s^2$ or $s^3$, will be to bring the power tube $v$ into action on its broadcasting antenna 340ᵉ, so that waves of the frequency of the oscillator 343ᵉ will be broadcast from such antenna. One of the switches $s'$, $s^2$ or $s^3$, and, preferably (so far as quick action is concerned) the switch $s^3$ or $s^2$, is controlled by the picture-control operator's key, 9. This control may be direct, the said key 9 being intercalated into the circuit, the same as the switch $s'$ or $s^2$ or $s^3$, belonging to the power tube $v$ in Fig. 3; or the picture operator's key 9 aforesaid may operate, through an electro-magnet 10, or other power device, the switch $s'$, or $s^2$ or $s^3$, and even two or more of these switches. This mode of acting is preferable, where the broadcasting apparatus is a powerful one, with a high voltage; and also it is preferable when the music studio, Fig. 2, and the actual broadcasting apparatus, Fig. 3, are located some distance apart—a very common case.

With the details of construction and arrangement described above, the effect of the picture-control operator's closing his key, whether it closes the switch $s'$, $s^2$ or $s^3$ (Fig. 3) or some two or more of these switches, say the switches $s^2$ and $s^3$ (Fig. 3), is to throw out into space a train of electrical waves or vibrations from the power tube $v$, and the antenna 340$^e$, which differ in some way substantially from the vibrations thrown off by the music broadcasting antenna 340, so that they affect a different wave receiving or detecting device; for example, they are of a different wave length and a different frequency from the waves thrown off by the antenna 340. And the waves thus thrown off from the antenna 340$^e$ affect (through the tuner 342, the radio-frequency amplifier 343, and the rectifier 344$^a$, seen in Figs. 4, 5 and 6) an electro-magnet 37, in the receiving apparatus, as described below, particularly in connection with Figs. 7$^B$ and 24, to 44.

All this will be better understood by referring to Fig. 7$^B$ wherein there are two receiving antennas, namely—

(a) The receiving antenna 341, which serves for the receiving of music and speech, and is tuned or otherwise adjusted to receive the waves thrown off by the corresponding broadcasting antenna 340, as before described; and (b) The receiving antenna 341$^e$, which serves to receive picture-controlling impulses, and is tuned or otherwise adjusted to receive the electrical waves that are thrown off by the picture-control broadcasting antenna 340, seen in Figs. 1, 2$^a$, 3 to 6, etc.

The means in Fig. 7$^B$ for receiving and detecting and amplifying the speech and music waves from the broadcasting antenna 340, have already been sufficiently described.

As to the means for receiving picture-controlling waves, turning, first, to Fig. 7$^B$, the antenna 341$^e$ acts on the grid G of the tube $v'$ (in the lower row of tubes in the figure) and this tube, in turn, through the coupling transformer $t'$, acts on the grid of the tube $v^2$, which, through the coupling transformer $t^2$, acts on the grid of the tube $v^3$; and this tube, through the coupling transformer $t^3$, acts on the grid of the tube $v^4$; and this latter tube, through the coupling transformer $t^4$, acts on the tube $v^5$. This is a rectifier tube, provided with two cylindrical plates P, P, and with two hot filaments F, F, to act on these two plates respectively. With the exact details shown in Fig. 7$^B$ (which, however, may be varied from within wide limits, if desired) the two plates, P, P, of the rectifying tube $v^5$, are connected with opposite ends of the secondary winding 6$^e$, of the transformer $t^4$, and the filaments F, F, are connected in series with each other, and with the filament-heating battery A. The mid-point of the secondary winding 6$^e$ of the transformer $t^4$ is connected with the one terminal of the electro-magnet 37, and the other terminal of said electro-magnet is connected with the mid-point between the two filaments, F, F. An equalizing condenser or current-storing condenser $C^{40}$ is connected across the terminals of the electro-magnet 37 aforesaid. The effect of this arrangement is that, when one of the plates P, P, is positive, the other is negative, and the electron current flows from one of the hot filaments F to whichever one of the plates P is, at the instant, positive. The electron currents which thus flow from the filaments F, F, (from one of them at any one instant) to the plates, P, P, pass through the exciting winding of the electro-magnet 37 aforesaid, and when of sufficient strength, magnetize said magnet to such an extent that it attracts its armature 37$^b$, giving movement to the armature lever 37$^h$, (which serves also as a switch) bringing it into contact and electrical connection with the corresponding contact screw 37$^m$, thereby closing the circuit of the battery or direct-current source $b$, and of the electro-magnets 13 and 13*, which give movement to the picture film 19$^a$, in any suitable manner, for example, in the manner illustrated in detail in Figs. 24 to 39, and see particularly, Figs. 27 to 39.

Instead of providing a rectifier of the kind shown in my Fig. 7$^B$, operated by electron discharge in a high vacuum, any other rectifier may be used that is suitable for the purpose. The raytheon rectifier, which contains a rarefied inert gas (as helium) and acts by ionization, is well known and widely used in the art. And other rectifiers, operating on different principles, are also well known in the art. Any rectifier whatever that is suitable for the purpose, may, as before said, be used in practicing my invention. The essential matter is that I make the radio waves that are controlled from the central station, operate a device (some device, any suitable device) on the subscriber's premises, by which the picture film 19$^a$ is advanced, from time to time, as required; and any form of rectifier or other device that is operated by and responsive to the radio waves from the central station, and which is suitable for the purpose, may be used.

With the details of my apparatus, then, before described (and which, it should be understood, may be altered within wide limits, if desired) the effect of the picture-control operator at the central station putting down his key 9 is, as before said, to cause the oscillator, 343$^e$, the power tube $v$, and the aerial 340$^e$, to throw off into the air a train of waves which, on the subscriber's premises, act on the rectifying tube $v^5$ to send an electric current through the relay electro-magnet 37; and this magnet, in turn, through its armature lever 37$^h$, and the local battery $b$, on the subscriber's premises, brings the magnets 13 and 13* into action, to operate the film-feeding mechanism of the picture-projecting machine on the subscriber's premises.

Films, ribbons, bands and picture-strips have been operated (that is, fed or advanced from time to time, as required) by electro-magnets in various ways, and any way that is suitable for the purpose may be used with my picture projecting apparatus. But the means shown in Figs. 24 to 44, with the exact details there shown, will be understood from the following description of my picture projecting apparatus. This, in its preferred form, includes the following principal parts, namely;

(a) A suitable lamp, for illuminating the film 19$^a$ and the screen 960, preferably, in the present state of knowledge, an incandescent lamp, although any other lamp that is suitable for the purpose may be used instead of it. This lamp, shown symbolically only, is marked L;

(b) Condenser lenses for collecting the light from the projection lamp L and concentrating it upon the film 19ª and the object glass 935; these condenser lenses may be of any suitable sort or kind. They are shown schematically in the drawings and are marked C⁴¹;

(c) Pictures to be fed through the projection machine in due succession, preferably, pictures formed on a film and yet again, preferably, formed on a film that is in the form of a ribbon or strip for more convenient feeding through the machine. This film is marked 19ª;

(d) Means for presenting the pictures in due succession, preferably, film-feeding mechanism combined with the film and the optical system. This film-feeding mechanism is discussed more in detail below.

(e) An object glass, or objective lens or erecting lens, 935, which may be of any suitable form or kind;

(f) Means for effectively cooling the film or for protecting it from the heat rays of the projection lamp L, so that it is made practicable to keep a picture or "frame", as it is technically called, standing in the gate, and showing on the screen, as long as may be desired;

(g) Preferably, a shutter for shutting off the light of the projection lamp from the screen, while the film is being moved.

*My picture feeding mechanism*

Pictures may be formed, and have often been formed on glass plates or slides; and many devices have been invented for feeding these glass plates or slides automatically in succession through a projecting machine or magic lantern; that is, for presenting the glass slides, one after another in due order and succession, in the path of the rays of light from the projection lamp to the screen, and, preferably, intermediate the condenser lens and the objective glass or objective lens. Such devices, with the feeding of the slides electrically controlled, may be used, to some extent, in practicing my invention, or at least in practicing some parts of my invention. But, for most practical purposes, I consider it desirable, as before said, to provide pictures that are formed upon a film of celluloid or other suitable material, prepared for the purpose, as is done in connection with moving pictures.

Pictures on celluloid may be arranged on a sheet, or on leaves, somewhat like the leaves of a book, or on a plate or a disc, for example, in a spiral on a disc, so that by revolving the disc intermittently (or step by step) and moving either the disc or the optical system, but preferably the disc, radially, the spirally-arranged pictures are presented, one after another, in due order and succession, at the gate, and are displayed, in turn, on the screen.

Pictures arranged on a sheet of celluloid or other suitable substance, or on leaves, or on a disc as above referred to, may be used in practicing my invention, considered in its broader aspects. But, preferably, and ordinarily, I arrange the pictures on a photographic film, which is made, preferably, in the form of a ribbon or of a strip. And, in the drawings, Figs. 24 to 44, I show a picture-carrying film, 19ª, for this purpose, after a fashion that is common in the moving picture world, and well known in the moving picture art.

In the drawings, see particularly Fig. 25, also Figs. 24, 24ᴱ, 24ᶠ, 24ᴳ and 25ᴮ, 43 and 44, 19ª is the picture film which, at the commencement of the showing of a set of pictures, is, preferably, wound on the pay-out roll 38. From this roll, with the details of construction illustrated in Figs. 24 and 25, the film passes over, that is, above and to a considerable extent, around, the rolls 39, 39, which are mounted on the shaft 39ª, then under the sprocket wheels 41, 41, which are keyed to and mounted on the shaft 41ª and so the film feeds into the film-loop which is seen in Fig. 25 above, and at the right of the gate 29ª; then said film passes through the gate between the fixed member 29ª, and the hinged member 29ᵇ, which is hinged at 29ᶜ and is spring-pressed against the fixed member 29ª so as to hold the film with a reasonable degree of tightness, as is customary in the art. And from the gate 29ª, the film 19ª passes down to the quick-acting sprocket wheels 32, 32, which are mounted on and keyed to the shaft 32ª, which, when actuated by the electro-magnet 13 (Figs. 26 to 36) serves to drag the film 19ª through the gate 29ª, whenever it is required to change the picture.

From the quick-acting sprocket 32, the film 19ª passes over the roll 42 (centered at 42ª) at the right of said sprocket wheel 32, and under the roller 43, and thence to the take-up roll 44, by which the slack is taken up and onto which the film 19ª is wound, after it has passed through the gate 29ª.

The following details also may be mentioned, although it is to be understood as to these and all other details, that they may be altered within wide limits, if desired, without departing from the broader features of my invention, which are set forth in the statement of claim at the end hereof. The rolls 39, 39, are mounted on the shaft 39ª, which, in turn, is mounted in the frame 39ᵇ (Figs. 25 and 25ᴰ), which is itself pivoted at 39ᶜ, and is normally held by the contractile spring 39ᵈ in contact with the felted stop 39ᵉ. Said rolls 39, 39, with the upwardly spring-pressed frame 39ᵇ, carrying them, serve, when a sudden jerk comes on the film 19ª from the action of the upper sprocket wheels 41, 41, to move downward, thereby paying out the film 19ª and preventing the strain on said film 19ª, which would otherwise result from the sudden movement of the upper sprockets 41, 41, with the film 19ª, and the inertia of the pay-out roll 38, resisting such sudden motion. Then, when the upper sprocket wheels 41, 41, come to rest (and, indeed, even before it), the returning spring 39ᵈ carries the frame 39ᵇ and the rolls 39, 39, back towards their normal positions; and in so doing, the film 19ª is drawn off from the pay-out roll 38. The rolls 39, 39, and the spring-pressed frame 39ᵇ, which carries them, thus serve to give elasticity to the operation of the device, and serve to prevent strains on the film 19ª, and on the pay-out roll 38, which otherwise would fall on them. And, similarly, the lower frame 43ᵇ, with its rolls 43, 43 (which are similar to the frame 39ᵇ and rolls 39, 39 in Fig. 25ᴰ), serves, when the film 19ª has been jerked suddenly through the gate 29ª by the action of the lower sprockets 32, 32, and said film has passed to the right in Fig. 25 towards the take-up spool 44, and this spool, under the influence of the weight 936, or other motor described below, is moved in the direction of clock hands, as viewed in Fig. 25, and winds that portion of the film 19ª that has just passed through the gate, onto itself (so that it would, but for the presence of the rolls 43, 43, and the downwardly-pressed frame 43$^b$, come to rest with a sudden jerk on the film 19$^a$) to yield and thereby prevents such jerk on the film, which would otherwise result from the sudden arresting of the take-up spool 44.

To hold the film 19$^a$ against the lower sprocket wheels 32, 32, rolls 42, 42, are provided, mounted in the frames 42$^b$, 42$^b$, and held by the contractile spring 42$^d$ in contact with the film 19$^a$ on the opposite sides of said sprocket wheels 32, 32, see particularly Figs. 25, 24$^E$, 24$^F$ and 24$^G$. Similar rolls 42, 42, similarly mounted in the frames 42$^b$, 42$^b$, are provided for pressing the films 19$^a$ aforesaid against the upper sprocket wheels, 41, 41.

As I have before stated, any apparatus that is suitable for feeding pictures, may be used in carrying out the broader features of my invention, but the specific form of apparatus shown by me for the purpose in the drawings, will be understood, from the following:

Picture controlling impulses from the central station affect the relay electro-magnet 37 (Figs. 7$^A$ and 7$^B$) in the manner before described, or in any other suitable manner. And this relay magnet 37, through its armature lever 37$^h$, and the contact screw 37$^m$, closes the circuit of the battery $b$ through the film-feeding electro-magnets 13 and 13*. These magnets may be made to be exactly alike, but, preferably, the magnet 13, which actuates the quick-acting sprocket wheels 32, 32, that drag the film 19$^a$ through the gate 29$^a$, is made to be relatively quick-acting; and the other electro-magnet 13*, which operates the upper or slower sprocket wheels, 41, 41 (which feed the film to the loop, seen in Fig. 25, to take the place of that portion of the film which is dragged through the gate by the lower sprocket wheels, 32, 32), is relatively slower acting. This difference, in the speed of action, may be made in the manner described below; that is, briefly stated, by giving a lower (or smaller) time-constant to the quick-acting electro-magnet 13, and a larger or longer time-constant to the slower-acting electro-magnet 13*. The time-constant of an electro-magnet, it will be remembered, is $$t = \frac{L}{R}$$

in which $t$ is the time-constant in seconds, or fraction of a second; L is the self-induction of the circuit in henries; and R is its resistance in ohms. The mechanisms through which each of these electro-magnets acts on the corresponding wheels 34, 34, Fig. 26, and following are (at least, may well be) similar, so that a description of one is, in effect, a description of the other. The course of the film through the machine, and the relation to it of the sprocket wheels 32 and 41, has been described in connection with Figs. 27, 24 and 25. The connections between the picture-film-feeding electro-magnets 13 and 13*, and the sprocket wheels 32, 32, are best shown in Figs. 25, 26 and 27 to 39, and particularly, in Figs. 27 to 31, all which have been before briefly described.

Any kind of an electro-magnet that is suitable for the purpose of giving movement to the sprocket wheels may be used for that purpose. The form shown in Figs. 26 and 29 has a fixed core, 13$^a$, preferably, cylindrical in shape, which is hollowed out to receive the tube 13$^c$, which may be of brass, bronze, or other non-magnetic material. The armature 13$^b$ which is of the plunger type, works inside the tube 13$^c$, and when in its normal position of inaction, with the magnet unexcited, stands with its lower end, preferably, a little above the upper end of the fixed core 13$^a$ aforesaid. The position of said armature, 13$^b$, with relation to the fixed core 13$^a$, is adjustable by means of the screw-threaded piece 13$^e$, which is adjustable in the armature 13$^b$ by means of a lock-nut 13$^f$. Preferably, this adjustable piece 13$^e$ is connected by a pin 13$^{e*}$, to a link 13$^g$, which, in turn, is pivoted by the shoulder pin 13$^m$, to the armature lever 13$^h$, which is mounted on the shaft 13$^i$. This armature lever is normally held by the contractile spring 13$^k$ against the felt-covered stop 13$^n$, but it is drawn downward by the attraction of the fixed core 13$^a$ for the armature 13$^b$, when said magnet is energized, by the passage of a current of electricity of sufficient strength through its exciting winding 13$^d$. The circuit of this electro-magnet is controlled, preferably, by the relay electro-magnet 37 (seen in Figs. 7$^A$ and 7$^B$), its armature 37$^b$, with its armature-lever 37$^h$, (which also serves as a switch) as before described in connection with Fig. 3 (or 7$^A$ and 7$^B$); the whole arrangement of the parts being, preferably such, as before described, that when the picture-control operator closes his key 9, the switch $s'$, $s^2$ or $s^3$, seen in Fig. 3, is closed. And a train of waves is thrown out upon the air by the oscillator 343$^e$, the power tube $v$, and the broadcasting aerial 340$^e$. These waves, taken up by the subscriber's antenna (341$^e$ in Fig. 7$^B$), and amplified by his radio frequency amplifying device (for example, by the tubes $v'$ to $v^4$ in the lower row of tubes in Fig. 7$^B$), and rectified by the rectifying tube $v^5$, act, through the relay electro-magnet 37, to close the circuit of the picture-feeding electro-magnets 13 and 13*, as before described.

Turning, now, to Fig. 29, the electro-magnet 13, through its armature 13$^b$ and the link 13$^g$, gives movement to its armature-lever 13$^h$. This lever carries a pawl 13$^p$, which is pivoted on the shoulder pin 13$^q$, and which has its lower end urged to the left in Fig. 29 against the ratchet wheel 34, by the contractile spring 13$^r$, one end of which is attached to the upper and shorter arm of the pawl 13$^p$, while its other end is attached to the lug 13$^s$ on the armature-lever 13$^h$. The film-driving ratchet wheel 34, which is keyed fast to the sprocket-wheel shaft 32$^a$, and on which ratchet wheel the electro-magnet 13 acts through its armature lever 13$^h$, and the pawl 13$^p$, has X teeth, each of which occupies a space expressed in angular degrees, on the periphery of said wheel, equal to $$\frac{360°}{X}$$

And, preferably, all the adjustments are made in such a manner that the armature-lever 13$^h$, acting through its pawl 13$^p$, on said ratchet wheel 34, gives to it and to the shaft 32$^a$, and to the sprocket wheels 32, 32, a movement of rotation on the axis of said shaft, of $$\frac{360°}{X}$$

and this is the movement of the sprocket shaft 32$^a$ and the sprocket wheels 32, 32, which is necessary to drag the film 19$^a$ through the gate 29$^a$, a distance equal to one picture space or frame on the film, in other words, a sufficient distance to change from one picture to the next succeeding picture on the film. With the exact details shown in the drawings (which, however, as before said, may be varied widely in this particular, as in others) the sprocket 32 has twenty-four (24) teeth, and a movement of three of these teeth is necessary and sufficient to move the film 19ᵃ one picture-space or frame; and the ratchet wheel 34 has eight teeth, each of which corresponds to three teeth of the sprocket wheel 32.

With the exact details shown in the drawings (see particularly Figs. 27, 29, 30 and 31), the pawl 13ᵖ is mounted on one side of the armature lever 13ʰ in a position to engage with the ratchet wheel 34 aforesaid. But said armature-lever 13ʰ (to which said pawl 13ᵖ is pivoted) itself lies immediately over the stopping-wheel or sto-wheel, 35, and has its end that is nearest to said pawl 13ᵖ shaped in such a manner (as shown in Figs. 29, 30 and 36) that when said armature-lever 13ʰ is drawn downward by the attraction of the magnet core 13ᵃ on its armature 13ᵇ, the curved end of said armature lever 13ʰ comes down between the teeth of the stop-wheel 35; and the two wheels (the ratchet wheel 34 and the stopping-wheel 35) are mounted on the sprocket shaft 32ᵃ and keyed firmly to it (by the key 32ᵃᵃ) in such relative positions that when the pawl 13ᵖ has moved the ratchet wheel 34, the full amount that is required, to change the picture, the appropriate tooth of the stopping wheel 35 comes against the curved end of said armature lever 13ʰ, and is thereby arrested. Thus, a pre-determined movement of the ratchet wheel 34, the stopping-wheel 35, and the sprocket shaft 32ᵃ, the sprocket wheels 32, 32, and the film 19ᵃ, is effected.

A spring-actuated locking pawl 937 is centered at 937ᵃ, and is held by the contractile spring 937ᵇ, in contact with the film-driving ratchet wheel 34. It serves, when properly mounted, to prevent the ratchet wheel 34, the shaft 32ᵃ, the sprocket wheels 32, 32, and the film 19ᵃ from moving backwards. But it is easily lifted out of engagement with its wheel 34, to permit backward movement, when that is required, as for example, in adjusting the film. Keyed to the sprocket wheel shaft 32, with the ratchet wheel 34 and the stopping wheel 35, is the checking wheel 33. A lever, 33ᵃ, centered at 33ᵇ, is held by the contractile spring 33ᶜ, resting down upon said checking wheel 33; and the tension of the spring 33ᶜ aforesaid is made adjustable, for example, by the screw-threaded rod 33ᵈ, set in an unthreaded hole in the rail 33ᵉ, and adjustable therein by the lock-nuts 33ᶠ.

The checking device shown in Fig. 28 (and in Figs. 27 and 31) acts only by friction. An alternative form of checking device is shown in Fig. 28ᴬ, in which the checking wheel 33* is shaped as shown in the drawings, with recesses in its periphery equal in number to the teeth of the film-driving ratchet wheel 34. And the checking lever 33*, in Fig. 28ᴬ, is provided with a small, hardened steel roller 33ᵍ, loosely but nicely mounted on a hardened steel shoulder pin 33ʰ, in the lever 33ᵃ*. The roller 33ᵍ, which sets into one of the recesses that are cut in the periphery of the wheel 33* sets into a different one of said recesses with each action of the film-feeding electro-magnet 13. In the checking device of Fig. 28ᴬ, a greater burden is imposed on the film-feeding magnet 13 to start the movement of the ratchet-wheel 34, the shaft 32ᵃ, and the sprocket wheels 32, 32, by reason of the action of the checking wheel 33*, keyed to said shaft 32ᵃ on its roller 33ᵍ, lever 33ᵃ*, and spring 33ᶜ. On the other hand, the device shown in Fig. 28ᴬ has the advantage in this, that its spring-pressed roller 33ᵍ exerts a positive centering influence on the wheel 33*, and through the shaft 32ᵃ and the sprocket wheels, 32, 32, on the film, 19ᵃ, to move it to exactly such a position, with each action of the film-feeding electro-magnet 13.

Instead of actuating the pawl-carrying lever 13ʰ by means of the electro-magnet 13 directly, said electro-magnet, or the relay electro-magnet 37 (but, preferably, the electro-magnet 13) may bring some other form of power device into action, for example, it may actuate valve mechanism which brings a pneumatic power device into action, a construction which is well known and widely used in modern pipe organs, with electro-pneumatic actions.

The upper sprocket wheels, 41, 41, which feed film to the film-loop (standing above the gate 29ᵃ in Fig. 25) are (or at least, may well be) actuated by another electro-magnet 13*, which is similar to the electro-magnet 13, before described, and with similar component parts (as the fixed core 13ᵃ, the armature 13ᵇ, the brass tube 13ᶜ, the winding 13ᵈ et cetera), and with similar connections between said magnet 13* and its sprocket wheels 41, 41. But, as before said, for various practical reasons, I consider it preferable, to make the electro-magnet 13, which feeds the film through the gate, quicker-acting than the electro-magnet 13* that actuates the upper sprocket wheels 41, 41, and feeds the film to the loop that stands above the gate in Fig. 25. This may be done by applying more voltage (for example, more cells of battery) to the one electro-magnet than to the other; see Fig. 7ᴮ in which supplemental cells b' are provided for the magnet 13 that do not serve for the magnet 13*; and by making the quicker-acting electro-magnet 13, with a smaller cross section of iron, less numerous turns of wire, and a higher ohmic resistance; and by making the slower-acting electro-magnet 13* with a larger cross section of iron and a greater length of iron core, and with more numerous turns of wire, preferably, of a larger size, so that it has a greater amount of self-induction, and a smaller ohmic resistance than the magnet 13. For the time-constant of an electro-magnet, is, as before-said, given by the equation aforesaid, $$t = \frac{Lj}{R}$$

and the more the self-induction is increased and the ohmic resistance diminished, the greater that time-constant will be; while reducing the self-induction and increasing the ohmic resistance will reduce the time-constant and quicken the action of the magnet.

For giving movement to the take-up roll 44 (best seen in Figs. 24 and 25) a weight, a spring or a small electric motor, may be provided, or any other driving device that is suitable for the purpose. In Figs. 24, 24ᴬ, 24ᴮ and 24ᴮᴬ, I show for this purpose a weight 936, which is hung by a cord 936ᴬ from a shaft 963, so as to turn this shaft in the direction of clock hands, as seen in Fig. 24ᴬ. Attached fast to the shaft 963 by a key 963ᵃ is a ratchet wheel 963ᵇ. Mounted nicely but loosely on said shaft 963 is a gear 964 carrying a shoulder pin 964ᵃ, on which a pawl 964ᵇ is mounted, so that it engages the teeth of the ratchet wheel 963ᵇ. A spring (not seen in the figures) serves to hold the pawl 964ᵇ, which is mounted on the gear 964, normally in engagement with the teeth of the ratchet wheel 963ᵇ, which, with the shaft 963, is driven by the weight 936. Attached fast to the gear 964 is another ratchet wheel 965; and a pawl 965ª, centered at 965ᵇ, is held by a contractile spring 965ᶜ in contact with said ratchet wheel 965. The pawl 965ª serves to prevent the backward movement of the ratchet wheel 965, and of the gear wheel 964. By backward movement, I mean movement in the reverse direction to that which is caused by the weight 936, in falling. The outer end of the shaft 963 aforesaid is made square or is otherwise suitably shaped to be engaged by a key or handle 966, which serves for winding up the weight 936. The details of construction above described permit the weight 936 to drive the gear 964 aforesaid in the direction of clock hands in Fig. 24ᴬ, and yet permit the winding up of said weight, when it has run down, without thereby giving movement to the gear 964. Said gear 964, on the shaft 963 (driven by the weight 936 through said shaft 963, the ratchet wheel 963ᵇ and the pawl 964ᵇ, as aforesaid), gives movement to a small pinion 967, which, with a much larger gear 967ᵇ, is keyed fast to the shaft 967ª; and the gear 967ᵇ, in turn, meshes with another small pinion 967ᶜ, which is keyed to or formed on the shaft 44ª that carries the take-up roll 44.

Thus, the weight 936, through its cord or chain 936ª, the shaft 963, on which said cord is wound, the ratchet wheel 963ᵇ, keyed to said shaft, and the pawl 964ᵇ on the gear 964—gives movement to said gear 964, which, in turn, through the pinion 967, shaft 967ª and gear 967ᵇ, gives movement to the pinion 967ᶜ on the shaft 44ª, and so to said shaft 44ª and to the take-up roll 44.

For adjusting the film, et cetera, the sprocket wheels 32, 32, are adjustable on their shaft 32ª into any angular position desired, by the means shown in Figs. 24, 24ᶜ and 24ᴰ. That is, there is a sleeve 32ᵇ connected with said sprocket wheels, and this sleeve, at one end, is slotted or split, and is furnished with ears or extensions, 32ᵈ, which, by the screw 32ᶜ, can be tightened on the shaft 32ª, in any position desired, so as to lock said sleeve 32ᵇ and the sprocket wheels 32, 32, to the sprocket shaft 32ª, firmly.

Turning, now, to Figs. 24 and 25, and particularly to Figs. 24ᴱ, 24ᶠ and 24ᴳ—to insure that the sprocket wheels, as 32, 32, (or 41, 41) with the rolls 42, that bear against them, in order to hold the film 19ª against said sprocket wheels, shall engage the outer margin of the film 19ª, without engaging the center portion on which the pictures stand, the said sprocket wheels, 32, 32 (or 41, 41) and rolls 42, 42, may be made as shown in Figs. 24 and 24ᴱ to 24ᴳ aforesaid, in which—

42ª is the shaft for the rolls 42, 42, provided with spacing collars 42ᵉ, 42ᵉ, to separate the rolls 42 the correct distance apart on their shaft 42ª;

42 is the roll proper, having teeth or recesses cut in it to mesh with the teeth on the sprocket wheels 32, 32, (or 41, 41);

42ᶠ is a flange-piece which serves as a flange to retain the film 19ª in place, in those cases in which such retention is needed, and serves also (that is, the part inside the flange serves) to bear on the film 19ª; and 42ʰ is a thin disc turned or ground true with the roll proper, 42, and with that part of the flange-piece 42ᶠ which is inside the flange. Said disc 42ʰ, like the roll proper 42 and the portion of the flange-piece 42ᶠ inside of the flange, engages with the film—the disc 42ʰ engaging with that portion of the film which is inside the perforations or slots, and outside the picture. The roll 42 proper (Figs. 24ᴱ and 24ᶠ), the flange-piece 42ᶠ, and the inner disc 42ʰ, are riveted or pinned together, and are keyed fast to the shaft 42ª, and, preferably, also are pressed onto that shaft tightly, and against the corresponding spacing collar 42ᵉ. But any other arrangement of sprocket wheels, with or without the rolls 42, that is suitable for the purpose, may be used instead of the details shown in the drawings and before described.

*Means for cooling the film*

It is eminently desirable to provide a large screen, and to illuminate it brightly, when required. A powerful projection lamp L is necessary for this purpose—and it should be the more powerful, the larger the screen and the more brilliant its illumination. Much less power in the lamp, of course, is required for a screen in an ordinary residence than in a moving picture theatre. In projection machines for residences, incandescent lamps seem to be more practicable in the present state of knowledge, than arc lamps; although improved arc lamps, in which the arc is enclosed in a vacuum tube, seem likely at any time to be perfected to the point at which they will be preferable for domestic use, to incandescent lamps. Any projection lamp that is suitable for the purpose may be used, in practicing my invention, and whatever lamp be used, I consider it practically very desirable, and indeed important, that the heat thrown on the film be reduced to such a point that the film can stand in the gate for many seconds, or even minutes, without being damaged—can stand there, indeed, as long as the picture or frame is suitable for illustrating the matter in hand. To this end, I provide efficient cooling means for the film, for example, a water cell 945 to absorb the heat rays; a heat-absorbing glass 947, for the same purpose, both interposed between the lamp L and the film 19ª, and, also, when necessary, means for blowing cooling air upon the film at the gate, so as to prevent it from becoming overheated. We may well consider these three devices briefly, in order, namely:

(a) A water cell, 945, is provided, located in the path of the rays from the projection lamp L to the film, and serving to absorb the heat rays on their passage to the film 19ª to a large extent; and the light rays of the wave-lengths that are most important for vision, to a very small extent. This water cell or vessel is, preferably, made of very clear and good glass, and is filled with distilled water, or at least with clear and clean water, suitable for the purpose, or with some other suitable fluid, for example, an aqueous solution of alum. Also, said water cell is, preferably, provided with a cover 945ª, to exclude dirt and dust, and to reduce the amount of evaporation from the water. Cooling means may be provided for the water; for example, a worm, 946, of glass pipe or of clean and non-oxidizable metal pipe, placed in the water cell 945, preferably, at or near the top of the same, or otherwise suitably connected with it; and through this worm, cooling water, from the town water supply or from any other suitable supply, is passed. Such a device, with a regulating cock or valve 946ª, is shown in the detail view Fig. 25ᴬ. But, in many cases of domestic projection machines, such water-cooling devices will not be necessary, especially in the cooler months of the year;

(b) A plate of heat-absorbing glass 947, with a mounting 947ª for the same, by which it is held in position, is also provided. This plate is located between the projection lamp L and the film 19ª, preferably, between the water cell 945 and said film 19ª. Heat-absorbing glass is now well known in the moving picture art, and is of various kinds. Any kind that is suitable for the purpose may be used. The water cell 945, and the heat-absorbing glass 947, tend, when well applied, and tend very strongly, to reduce the amount of heat that is thrown upon the film. But, in some cases, it is desirable to supply also—

(c) Means for blowing cooling air upon the film 19ᵃ, feeding a current of air against it to cool it. Any means for producing this current of cooling air may be provided that are suitable for the purpose. A simple means, shown in dotted lines in Fig. 24 and shown in Fig. 25, partly in elevation and partly in section, consists of a small centrifugal blower, marked as a whole 950, which is operated in any suitable manner, for example, by a small electric motor 951, shown in dotted lines in Fig. 24. These fan motors are well known in the electric art; and said blower 950 may be driven by the electric motor 951, or in any other suitable manner. With the details shown in the drawings, the armature shaft 951ᵃ of the electric motor has a pinion 951ᵇ, keyed to it, which meshes with a gear 950ʰ, that is keyed to the shaft 950ᵇ of the blower 950, which gives movement to the fans or vanes 950ᵈ of the blower. The said blower drives a current of air through the pipe 950ᵍ and the nozzle 950ᵐ, against the film 19ᵃ, where it stands in the gate 29ᵃ, and thereby removes heat from the same. When not needed, the blower 950, of course, is stopped by shutting off current from the electric motor 951 that drives it, or in any other suitable manner. With the exact details shown in the drawings, the blower 950 has a case or shell 950ᵃ, which may be of any suitable type, and a shaft 950ᵇ, to which is keyed a web or radius piece (a sleeve with arms) 950ᶜ, and to the arms of this radius piece the plates or vanes 950ᵈ of the blower are attached by screws 950ᵉ, or in any other suitable manner. 950ᶠ, 950ᶠ, are ports by which air enters the blower near the center, to be driven out of it centrifugally near the periphery, into its outlet pipe, 950ᵍ. To this outlet pipe is bolted (by bolts 950ʰᵃ, provided with butts 950ⁱ), or secured in any other suitable manner, the pipe 950ᵏ, whose nozzle or small end, 950ᵐ, delivers the air to the film 19ᵃ as it stands in the gate.

Instead of the centrifugal blower shown, any suitable pumping device may be used, for example, a pumping device with bellows, such as are used in player pianos, and for other purposes. Three bellows, driven by three cranks, which stand at 120 degrees to each other, will give a fairly constant stream of air, particularly when an equalizing bellows or reservoir is connected with them; and when properly built and mounted, this bellows device or pump operates with very little noise. Such a device may well be used instead of the centrifugal blower shown in Figs. 24 and 25. But with the apparatus of Figs. 24 and 25, the very high speeds which are usually necessary with centrifugal blowers, and which tend to produce considerable sound, are quite unnecessary, for a comparatively small volume of cooling air is sufficient to keep the film cool, especially when the heat rays have been absorbed to a great extent by the water cell 945, and the heat-absorbing glass pane 947.

Any usual or known means may be provided for cleaning the air which enters the blower 950, or for cleaning it before it passes from said blower to the nozzle 950ᵐ. Various devices are known for this purpose. And it is desirable to use some suitable device for excluding dust and dirt from the stream of air that passes from the nozzle 950ᵐ against the film 29ᵃ.

When not necessary, the water cell may be omitted or it may be thrown out of action by temporarily removing it. The blower 950 should be thrown out of action at any time when it is not needed, by cutting off current from the electric motor that drives it, as before-said, or in any other suitable manner. The heat-absorbing glass may be omitted in many cases, if both the water cell and the blower are provided—it may be omitted in some cases when either the water cell or the blower is provided, but the heat-absorbing glass is, preferably, furnished with the water cell and with the blower, and one of the latter (either the water cell or the blower) may be omitted in some cases, but in other cases, I consider it preferable to provide and to use all three devices, even though, at times, one or more of them may be unnecessary, and may be temporarily removed or thrown out of action.

*My shutter apparatus*

If the number of pictures provided is not very large, and the change from picture to picture not rapid, a shutter for cutting off the light while the picture is being changed, is not necessary, but when rapid changes of the pictures are made, I consider it desirable to furnish a shutter. Apparatus for this purpose is illustrated in Figs. 7ᴮ, 40, 41, 42 and 42ᴬ to 42ᴰ.

Usually, the shutter of a moving-picture machine revolves continuously, and is connected mechanically with the film-feeding mechanism, commonly called the intermittent movement or the Geneva movement, in such a manner that one of the blades of the shutter cuts off the beam of light on its passage from the film to the screen, while said film is being moved to change from one picture or frame to another. But, with my process and apparatus, I prefer, as before explained, to move the film so as to change from one picture to another, at irregular intervals, controlled from the central station, holding the picture, in some cases, standing in the gate and showing on the screen for a very brief period (it may be for a fraction of a second only), and at other times keeping the picture standing in the gate and showing on the screen for many seconds, or even for minutes. I have, therefore, contrived an intermittently-moving shutter, as distinguished from a continuously-revolving shutter. And, preferably, I locate this shutter inside the barrel or case 935ᵃ of the projection lens 935 at or near to the point at which the rays cross each other, and where the cross section of the beam of light is very small. While the picture is showing, the shutter 953ʰ lies outside of (that is, away from and, with the exact details shown in Figs. 7ᴮ and 40 below) the beam of light which passes through the barrel 935ᵃ of the projection lens on its way to the screen 960. But, when the picture is being changed (by the action of the film-feeding electro-magnet 13 or otherwise) said shutter 953ʰ moves very quickly into the path of the beam of light, passing from the projection lamp L through the film 19ᵃ to the screen 960, and cuts off said beam, so that it does not reach the screen 960, or if it reaches the screen at all, reaches it in a broken and altered state, such that the picture does not show on the screen while the film is being moved. But as soon as the film has been moved and the picture changed, said shutter 953ʰ returns to its normal position, leaving a free passage for the beam of light which is passing through the projection lens from the projection lamp L to the screen 960.

The shutter 953h, with the means for moving it, is best seen in Figs. 7B and 40, of which Fig. 7B, showing the circuits, is more diagrammatic, while Fig. 40 (on a larger scale and not showing the circuits) shows the mechanical details of construction more clearly, which are further disclosed by Figs. 41 to 42D.

In Fig. 7B, the receiving antenna 341 is, as before described, tuned or otherwise adjusted to receive electrical waves corresponding to speech and music from the broadcasting antenna 340, which is seen in Figs. 1, 3, et cetera. All this has been before described, so that further description of it here is unnecessary. And the receiving antenna 341e in Fig. 7B is, as before described, tuned or otherwise adjusted to receive picture-controlling impulses from the broadcasting antenna 340e, which is seen in Figs. 1, 3, et cetera. The electrical waves picked up by the receiving antenna 341e (whether this be of the grounded type or of the loop type or of any other suitable type) are amplified by the tandem-connected vacuum tubes $v'$, $v^2$, $v^3$ and $v^4$, seen in the lower row, in Fig. 7B; and the secondary winding of the transformer $t^4$, which constitutes the output circuit of the vacuum tube $v^4$, feeds the rectifier $v^5$; and this, in turn, feeds the relay electro-magnet 37, as before described, so that when a train of electrical waves from the broadcasting antenna 340e is taken up by the receiving antenna 341e, these, if sufficiently strong, give rise to a direct current in the rectifier $v^5$ and in the relay electro-magnet 37, so that said magnet attracts its armature 37b; and, this, through the link 37g, gives movement to the armature lever 37h, which, acting as a switch and coming into contact with the adjustable contact screw 37m, closes the circuit of the local battery $b$, through the electro-magnets 13 and 13* before described; and, also, at the same time, it closes the parallel circuit of the shutter-operating electro-magnet 953; and, at the same time, closes also the parallel circuit of the shutter cut-off (or shutter releasing) electro-magnet 956, by the circuit arrangements which are clearly delineated in Fig. 7B. The shutter-operating electro-magnet 953 thereupon gives movement to its armature 953b and to its armature lever 953h, which serves as a shutter lever, drawing down the outer end of the said lever 953h against the felted stop 953e, and, at the same time, lifting the inner end of the shutter lever 953h (Figs. 7B and 40) so that it cuts off the beam of light that is passing through the projection lens 935. At the same time, the electro-magnet 13, which is larger, much more heavily loaded, and necessarily slower-acting, is moving the film 19a through the gate 29a. At the same time, and before this film-feeding movement of the electro-magnet 13 has been completed, the shutter cut-off (or shutter releasing) electro-magnet 956 attracts its armature 956b and gives movement, through the link 956g, to its armature lever 956h, bringing the right hand end of this lever (in which the adjusting screw 956n is mounted) into engagement with the lever 957, (which serves also as a switch) thereby breaking the electrical connection which normally subsists between said lever 957 (centered at 957a) and the contact screw 957b, and breaking the circuit of the shutter-operating electro-magnet 953, whose armature 953b and armature-lever 953h, then, under the influence of their contractile returning spring 953k, return to their normal positions and leave the beam of light, passing from the projection lamp L, through the projection lens 953, free to pass on, unhindered, to the screen 960.

By regulating the positions of the screw-threaded adjustment rod 956e in its armature 956b, and by regulating the positions of the screws 956m and 956n, which limit the play of the armature lever 956h, and also by adjusting the screws 957b and 957c, which limit the play of the lever 957, the quickness of action of the armature lever 956h on the circuit-breaking lever 957, may be regulated within wide limits. And by regulating the position of the screw-threaded adjustment rod 953e (Fig. 40) in the armature 953b, of the shutter-operating electro-magnet 953, and by regulating, also, the positions of the stops 953e, 953e (best seen in Fig. 40) the amount of movement and the quickness of action of the shutter 953h is easily controlled, within wide limits; and by the other adjustments above specified, the quickness of action of the shutter cut-off electro-magnet 956, and the cut-off lever 957, is easily adjusted, so that the shutter cuts off the light from the screen practically as soon as the film commences to move, under the influence of the film feeding electromagnet 13, and (returning to its position) permits the light from the projection lamp L to fall on the screen 960 again, practically as soon as the picture has been changed. The desired difference is easily made by the means above described, and which are illustrated in Figs. 7b and 40.

Preferably, I cast or otherwise form the barrel 935a of the projection lens with a hole or recess 935n (Figs. 42, 42c, and 42d) in its wall, located where the shutter lever 953h passes through the wall, and sufficiently large to admit said shutter lever. But, as cast, the recess 935n does not pass through the wall; it is a recess in the wall but not a hole going through it. Then, with a suitable milling cutter, I cut a slot 935l in the wall 935e, to admit (and to barely admit) the central enlarged portion of the shutter lever 953, where the pivot pin 953l passes through it, producing by means of the action of said cutter on the projection or lug 935m, cast on said barrel 935a, a free space (that is, the slot 935l) for the central part of the shutter lever 935h, which sets closely and neatly, but not tightly, in said slot, and I cover over the top and bottom of the slot, thus cut for the central portion of the shutter lever 953b, with the parts 935k, 935k, which are attached by screws, solder, or in any other suitable manner, to the barrel 935a, with their horizontal portions lightly touching, or almost touching the central rounded portion of the shutter lever 953h. The sides or wall of the slotted lug 935m serve (a) to receive the center pin 953l, by which the shutter 953h is pivoted; and (b) to close at the sides as nearly dust-proof as practicable, the opening in the barrel 935a for the shutter lever 953h, and through which dust might enter into the barrel 935e; and the pieces 935k, 935k, aforesaid, serve to close this opening at top and bottom. When these various parts—the shutter-lever 953h, the slotted lug 935m, and the top and bottom pieces 935k, are all nicely made, fitted and mounted, the entrance of dust into the barrel 935a through the opening made in the same for the shutter-lever 953h is prevented largely, or entirely.

Instead of the shutter 953h, before described, any other shutter whatever that is suitable for the purpose may be used. And any other means for operating said shutter may be provided that is suitable for the purpose, instead of those shown in the drawings, and before described.

Having described the leading features of my apparatus, I shall now describe some accessory matters, and also shall describe more in detail some of the things shown in the drawings, which have heretofore been described or referred to briefly, or in a general way only. In addition to the telephonic transmitter or electrical pick-up 1, in the music room 11, I also provide, preferably—

(a) Suitable musical instruments, for example, a pianoforte, an organ or other keyboard instrument, and also the more important orchestral instruments, such as the bowed instruments, the wood-wind instruments, the tympani, etc., but all of these are well known in the art, and illustration of them, or detailed descriptions of them are not thought to be necessary; whether shown or not, they are to be understood;

(b) Chairs, 40, 40, for the musicians, which may be grouped in convenient proximity to the pick-up 1; some chairs nearer to it than others, according to the instruments or voices concerned. The chair for a violinist, or for a flutist should be located nearer to the pick-up than the chair in which a player on a brass instrument, as the trumpet or trombone, sits. These are details which, as before said, are best settled by a competent musician on the spot;

(c) Other usual accessories are provided, such as milliampere meters or other visible indicators of the magnitude of the voice-corresponding or music-corresponding electric currents. Preferably, the current for such an indicator is taken off from an amplifier after the original sound vibrations have been amplified. This, and other accessories, which are well known in the art, are, preferably, provided.

Any form of telephonic transmitter or of electrical pick-up that is suitable for the purpose, may be used. A number of such devices are known in the art. The best known and most widely used of these, in English-speaking countries, at least, are—

(a) The double-button carbon transmitter, with strained diaphragm, of the Western Electric Company, which is well known and widely used in the art, in this country;

(b) The condenser transmitter of Mr. E. C. Wente, having a strained diaphragm. This, also, has been developed by the Western Electric Company, and is used, more or less, by them and their licensees. It is now well known in the art.

(c) The British Broadcasting Company's transmitter, designed by Captain H. J. Rounds, which is well known and widely used in England.

Any of these or any other telephonic transmitter that is suitable for the purpose may, as before-said, be used in practicing my invention.

A transmitter of my own invention, shown in Fig. 9 is described hereafter. Suffice it to say here that such transmitter is an inductive transmitter, acting by electro-magnetic induction, and has, preferably, two windings, namely, a field winding or exciting winding on the field magnets 5, 5, (which are of soft iron) by which the intensity of the magnetic field of the transmitter; in which its diaphragm 1$^a$ vibrates, is controlled, and another winding on the poles of the cores 5, 5, on opposite sides of the diaphragm 1$^a$, in which electric currents corresponding to speech or music, are induced by the vibrations of the iron diaphragm 1$^a$, of such transmitter. The exciting winding of each of my inductive transmitters 1, 1, is controlled by the corresponding rheostat R$^4$, which is shown schematically in Fig. 2$^a$ and others, near to the controlling lever 28, on which the speech-and-music control operator acts. This rheostat R$^4$ may be of any suitable kind. Said rheostat R$^4$ may be controlled (or operated) by the supervising musician in any suitable manner, for example, by the lever 28 which is located in a convenient position to be operated by the supervising musician, while seated in his chair 40$^c$. Said rheostat R$^4$, with the lever 28 for operating it, is shown, as before-said, also in Fig. 18$^D$, and is described more at length hereinafter.

The output circuit 8 of each of my transmitters 1, is connected, preferably, through a vacuum-tube audio-frequency amplifier, with the input circuit 354 of the corresponding broadcasting device 353, which serves for broadcasting speech and music. This output circuit 8, with my particular type of telephonic transmitter or electrical-pick-up, shown in Fig. 9, is the circuit of the working coils 5$^b$, 5$^b$; but in a different type of transmitter it will be more or less different in detail. But, in any case, the output circuit of the transmitter 1 is connected, preferably, to feed the corresponding audio-frequency amplifying tube $v'$.

The audio-frequency amplifier, into which the output circuit 8 of the transmitter 1 feeds, has one or more stages of audio-frequency amplification, but preferably a plurality of them. Two, three, four or more stages may be necessary in the particular circumstances of the case. But a greater or less number of stages of audio-frequency amplification may be provided, either in the music studio, or at the broadcasting station, or at both of these—as many stages as may be necessary, under all the circumstances of the case.

The output circuit of the audio-frequency amplifier, belonging to the music studio, that is, the secondary winding 6$^e$ of the transformer $t^3$, in Figs. 2$^a$ and 2$^c$ or of the last transformer of a series, is connected with the corresponding broadcasting device 353, and forms the input circuit 354 of such broadcasting device.

The music studio (the rooms 11 and 12 with their appurtenances and accessories) may seem, in the drawings, to be in rather close proximity to the broadcasting antennas or aerials, 340 and 340$^e$; but, preferably, it is separated from them by a convenient distance, according to the most approved practice in the art, so as to avoid prejudicial reactions between the high-tension broadcasting devices and the apparatus belonging to the music studio.

It remains to describe, more in detail, my particular form of telephonic transmitter or electrical pick-up, shown in Fig. 9; my expression rheostat R$^4$ with the balanced lever or hand lever 28, for controlling said rheostat, shown in Fig. 2$^a$, and more in detail in Fig. 18$^D$; after which certain modified forms of my apparatus will be described. But, first, of

*My telephonic transmitter or electrical pick-up*

This device, as shown in Fig. 9, comprises the following, namely:

(a) A diaphragm of soft iron or steel 1$^a$;

(b) Stiff metal rings, preferably, steel rings 3$^a$, 3$^a$, between which such diaphragm is tightly clamped and firmly held in place, by screws or rivets 3$^{aa}$, 3$^{aa}$;

(c) A cylindrical frame or case 3ᶠ, preferably of brass, bronze, or other suitable non-magnetic material, for supporting the diaphragm rings 3ᵃ, 3ᵃ, and the magnet cores 5, 5, hereinafter described. Preferably, the case 3ᶠ is provided with a circular shelf 3ᵍ, on which the diaphragm rings 3ᵃ seat; that is, said diaphragm rings are firmly clamped between said shelf 3ᵍ and the cover 3ᵏ by screws 3ᵗ, 3ᵗ, (which are clearly seen in Fig. 9), or in any other suitable manner;

(d) Soft-iron magnet cores 5, 5, mounted on opposite sides of the diaphragm 1ᵃ and in close proximity to it, and preferably made to be adjustable. Preferably, the cores 5, 5, are each provided at the end remote from the diaphragm 1ᵃ, with a head like that of a bolt, by which they can be easily turned, when it is required to adjust them. Also, said cores have each a screw-thread cut on it for a sufficient distance below the bolt-head. The upper core-piece 5, is mounted in a collar 3ᵖ, which is supported by the arms 3ᶦ, 3ᶦ, that rise from the ring-shaped cover 3ᵏ. And the lower core-piece 5, is similarly mounted in the collar 3ᵐ, which is attached to the lower wall of the cylindrical case 3ᶠ. 3ⁿ, 3ⁿ are lock-nuts for locking the cores 5, 5, in whatever positions they may be adjusted into, respectively.

With the preferred arrangement of parts, shown in Fig. 9, each of the rod magnets 5, 5, has two coils wound on it, namely, a field-coil or exciting coil 5ᵃ, by which the said core is magnetized more or less as required; and a working coil 5ᵇ, in which alternating currents are induced by the vibrations of the diaphragm 1ᵃ, caused by sound waves. The working coil 5ᵇ is located at the end of the core-piece 5, as near as practicable to the diaphragm 1ᵃ. But the exciting coil or field-coil, 5ᵃ, is located farther off from the diaphragm and, preferably is made to be of a much larger size and with much more numerous turns of wire than the working coil 5ᵇ. The two field-coils or exciting coils 5ᵃ, 5ᵃ, are wound or connected together in such a manner that the corresponding magnet cores 5, 5, have opposite kinds of magnetism (having opposite signs, as N and S) near to the diaphragm 1ᵃ, so that the said diaphragm is in a relatively strong field between them; and the working coils 5ᵇ, 5ᵇ, are connected together in such a manner that the electric currents induced in them by the vibrations of the diaphragm, support each other in the working circuit.

Preferably, as beforesaid, the frame or case 3ᶠ for the transmitter or electrical pick-up 1, is made of brass, bronze or other suitable non-magnetic material. For, when so made, the cores 5, 5, will lose their magnetism more readily and more completely, when the current of the battery $b$ is cut down or cut off; in a word, the magnets 5, 5, will obey more quickly and perfectly the controlling rheostat R⁴.

The intensity of the magnetic field of the core-pieces 5, 5, belonging to the transmitter shown in Fig. 9, it will be seen depends upon the quantity of the electric current from the battery $b$ flowing in the field-coils 5ᵃ, 5ᵃ, so long as saturation is not approached; and this current is controlled by the rheostat R⁴, which is shown schematically in Fig. 2ᵃ and, in one mechanical form, in Fig. 18ᴰ. With the details of construction and arrangement as shown (which details, however, may be altered within wide limits, if desired) the rheostat R⁴, inserted in the exciting circuit of the electro-magnets 5, 5, of the telephonic transmitter or electrical pick-up 1 (Fig. 9) is operated by the supervising musician, seated in his chair 40ᶜ, and is used by him to give expression to the music. But other devices for giving expression to the music may be used instead, as pointed out hereinafter, and illustrated, for example, in Fig. 2ᵃ′, in which the rheostat or adjustable resistance R⁴ is connected in potentiometer fashion, across the secondary winding 6ᵈ of the transformer $t^2$, which constitutes the output circuit of the audio frequency amplifying tube $v^2$, so the voltage applied to the amplifying tubes $v^3$ and $v^4$, at the music studio, and to the input circuit 354, of the corresponding broadcasting device 353 is varied at the will of the control operator, by operating through the lever or handle 28, the rheostat R⁴.

*My expression rheostat, illustrated in Figs. 13 to 17ᴬ*

The rheostat R⁴, shown schematically in Figs. 2ᵃ and 2ᶜ, and in Fig. 9, may be of any suitable type or kind whatever, and may be operated by the hand or by the foot of the supervising musician; or it may be operated by him in any other way that is suitable for the purpose. One mode of constructing such a rheostat and of operating it is shown in Fig. 18ᴰ or the rheostat may be of the general type shown in my Patent No. 1,203,804, or may be otherwise constructed.

For example, as shown in Fig. 18ᴰ the rheostat-operating lever 28 on shaft 28ᵃ is connected by an arm 28ᵇ and a link 28ᶜ to an arm 85 pivoted as at 85ᵃ and having a contact portion 85ᵇ for cooperating with the graduated resistance elements 84, 84. This mechanism may conveniently be associated with the table 29, adjacent the picture-changing-control switch or switches 9, 9ᵃ. The lever 28 is adapted to be operated by the supervising musician. In one alternative arrangement, as shown schematically in Fig. 2ᵃ′, the rheostat R⁴, operated by the balanced lever 28, may be used in a potentiometer fashion to control the action of one vacuum tube or another tube following it, in an audio-frequency amplifier, in which the resistance R⁴ is inserted in the secondary circuit or winding 6ᵉ of the transformer $t^2$; one terminal of this secondary winding is connected with the filament F, and the other terminal is connected through the resistance R⁴ with said filament F, while the movable part of the rheostat R⁴ is connected with the grid G of the tube $v^3$. Thus by moving the movable member of the rheostat R⁴ over the resistance part of the rheostat, the voltage applied to the grid G of the tube $v^3$ is varied at the will of the operator. But the rheostat R⁴ may be used to control the loudness of the electrically produced sounds in any other manner suitable for the purpose, whereby the supervising musician may govern the loudness of the sound within wide limits as he may think best.

*Telephonic transmitters and receivers*

Subject to what is explained elsewhere herein, any telephonic receiver or speaker, and any transmitter suitable for the purpose may be used in the practice of my invention. Partly for the reasons stated below, as to the desirability of standardization and uniformity, my personal predilection is for instruments of the diaphragm type with horns. But cone loud-speakers and other hornless receivers or "dynamic" speakers are well known and preferred by many persons. Such receivers, or any others suitable for the purpose (and the same with respect to transmitters) may be utilized in carrying out my invention of broadcasting speech and music and broadcasting also picture-controlling impulses, whereby pictures are controlled on the premises of the subscribers in proper synchronism with the sounds broadcast from the central station. The construction as illustrated for example in Fig. 9 may be considered as representative of one preferred form, as to diaphragm mounting and other features, either for an inductive transmitter or pick-up, as actually shown in said Fig. 9, or for a telephonic receiver. Depending to some extent upon the arrangement for volume-control, whether as in Fig. 9, or as in 2ª, 2ª', 7ᴮ, and others, the materials of the parts may be variously selected as between magnetic and non-magnetic materials. As stated, and in so far as the broad features of my invention are concerned, any suitable form of transmitter and of receiver may be employed.

*On providing radio receiving devices which are as nearly as practicable acoustically identical, for the supervising musician and also for the subscribers or listeners-in*

In transmitting words for a play or the like from a central station to the premises of subscribers and producing pictures on those premises, serving to illustrate the play, but controlled and synchronized from the central station with the words of the play, and particularly, in transmitting words and music for a musical show, an opera, an operetta, or the like, from a central station to the premises of subscribers, with pictures on the subscribers' premises, to illustrate such musical show, opera, operetta, or the like, the following things I have found to be important, to the production of the best effect, namely:—

(a) The words should be transmitted to the subscribers' premises and reproduced there with as much fidelity to the words spoken at the central station as practicable.

(b) The music, also, should be transmitted with as much fidelity to the original as practicable, and, in particular, the music produced on the subscribers' premises should be as nearly as possible, the same as that which the control operator hears; that is, the musical voice on the subscribers' premises should be the same qualified electrical voice which the control operator produces (by his control) and listens to in the control room, and not a different thing, made different by different receiving apparatus, and, particularly, by different loudspeaker apparatus. This applies also to the words transmitted.

(c) The pictures on the subscribers' premises should be as good as practicable and should be well synchronized with the words and music coming from the central station.

If any of these three things is poorly done, if the words or music are not properly transmitted, or if the electrical voice of the music on the subscribers' premises is substantially different from the electrical voice to which the control operator listens in the control room; or if the pictures on the subscribers' premises are not properly synchronized with the words relating to them which are broadcast from the central station, then the result on the subscribers' premises will be imperfect and more or less unsatisfactory.

Now, the electrical voice of the music, that is, the sounds given off by the loud-speakers 3, 3, depend upon a number of things, as follows:—

(a) On the sounds produced by the musicians in the room 11.

(b) On the sounds picked up by the pick-up devices I, I, that is, on the shape of the electrical waves in the output circuits of the telephonic transmitters or electrical pick-ups, I, I. These, under favorable circumstances, should bear a close relation to the wave-forms of the sound waves producing them.

(c) On the perfection of the modulating apparatus, by which the musical electrical waves from the pick-ups I, I, are impressed upon the carrier-waves or high-frequency waves, that are thrown into space by the broadcasting antenna 340.

(d) On the faithfulness of the radio-receiving apparatus in reproducing, at the detector, electrical vibrations similar in wave-form to those which were impressed by the modulator at the broadcasting station, on the broadcast waves; and on the faithfulness of the audio-frequency amplifier in amplifying the audio-frequency waves, received by it from the detector. In this part of the process many distortions and corruptions of the wave are possible; especially is this so with the action of the detector, which, by its unequal response in the plate-circuit to the changes of voltage in its grid-circuit, introduces into the electrically-reproduced music resultant tones which were not in the music, as originally produced by the musicians, and which tend to corrupt the electrically-reproduced music, especially to corrupt the chords, and more especially, to corrupt chords that include notes deep in pitch, as before explained. And, (e) When the best that is possible, or at least the best that is practicable, has been done to produce electrical waves for the loud-speakers which waves are as nearly as practicable the same as the music played by the musicians, everything then depends upon the response of the loud-speaker apparatus. This, under favorable circumstances, may produce a fairly good effect. But under other circumstances, it ruins music which, with a good loud-speaker apparatus, would be acceptable.

By my system, the supervising musician listens preferably, as much as possible, to the electrical voice of the music; this is, to the music produced by the loud-speakers 3, 3, of the radio-receiving set, which loud-speakers are located in convenient proximity to him, in his room 12. And by his manipulation of the controlling lever 28, with the corresponding rheostat R⁴, (or by the control of other devices for the same purpose) he corrects, to a considerable extent, errors of the musicians and unequal responses of the various electrical instruments and gives to the music such expression as he thinks best.

Now, I have found, as stated above, that it is important, exceedingly important, to the production of the best effects musically, that the subscribers or listeners-in should hear the same electrical voice of the music, as nearly as possible, as the supervising musician hears, and not a different and distorted effect. To this end, I prefer to provide, alike for the supervising musician and for the subscribers who listen in, radio-receiving sets that are as nearly as practicable exactly alike, electrically and magnetically, and also loud-speaker sets that are as nearly as practicable exactly alike acoustically. There may be differences in ornamentation, mounting and appearance of the sets furnished to different subscribers, but in essence—in electrical and acoustical characteristics, they should, to secure the best results, be as nearly as practicable the same. This condition may be satisfied, so far as the radio-receiving apparatus (apart from the loud-speakers) is concerned, by providing vacuum tubes, transformers, variable condensers, batteries or battery substitutes, shielding devices and other accessories which are as nearly as practicable, alike. For this purpose, it is desirable to have a standard receiving set, with which other sets are compared and made to be as nearly as possible, exactly the same; and with one of these standrad sets, each set that is manufactured is, preferably, made to be as nearly as practicable the same, in all electrical and magnetic particulars that are of importance; preferably, they are made to be alike in every detail. Stated otherwise, whatever form of radio-receiving apparatus is provided for the supervising musician or control operator to listen, in his room 12, to the electrical voice of the music, substantially the same apparatus is provided, preferably, for each of the subscribers or listeners-in. The outer form of the apparatus, indeed, which one subscriber has may differ in some particulars from that of another subscriber, or from that of the supervising musician. What is important is that the electrical-music effects produced in each case, be, as nearly as possible, exactly alike. And while this condition may be approximately satisfied by forms of apparatus that are more or less different in certain particulars, it is most easily and certainly satisfied by making all of the radio-receiving apparatuses or receiving sets (that for the supervising musician and those for the subscribers or listeners-in) copies, in essential particulars, of the same receiving apparatus that is taken as a standard, with which all others are to be compared and as far as practicable, equalized. But it is consistent with substantial identity of two radio-receiving sets (substantial identity in electrical, magnetic and musical characteristics) that different cases or cabinets be provided for the tubes and accessories and differently-ornamented horns, if these horns be alike in substance, and particularly if they be alike in their internal shapes and sizes; and yet wider differences may be made between two sets, if such electrical and acoustical identity be preserved, that they produce substantially the same results musically.

*My standardized loud-speaker apparatus*

Many forms of loud-speaker apparatus are known and in practical use. I have stated above that, subject to the explanation to be given below, any form of telephonic receiver or of loud-speaker apparatus that is suitable for the purpose may be used in practicing my invention. I have referred to two forms of loud-speaker apparatus, one with electrically-excited fields, the other with permanently magnetized fields. I have also explained above the importance of making the loud-speakers, to which the subscribers listen, acoustically similar to those to which the supervising musician listens, at the music studio. And the qualification of the statement above that any form of loud-speaker apparatus that is suitable for the purpose may be used in practicing my invention, is that the best effects will only be obtained with loud-speakers which are of such a nature that one can be made to be (and is made to be) like another acoustically; and which are of such a nature, also that they preserve well their acoustical characteristics from day to day, and from year to year.

First, as to the diaphragms 1ª, 1ª, by making a great number of these from the same melt of steel (or from similar melts, when it is not practicable to make all from the same melt) rolled and annealed under similar conditions, a high degree of similarity can be obtained. When these have been fastened between the retaining 3ª, 3ª, they are very little subject to change; and they can be clamped in place in the receiver without any change in pitch resulting from such clamping, and differing more or less with the circumstances and the tightness of said clamping; whereas, with most receivers having diaphragms, the fundamental resonance pitch of the diaphragm is changed, by clamping it in place; and its resonance pitch changes somewhat with the tightness or the looseness of the clamping. Before clamping my diaphragms 1ª, 1ª into place between their retaining rings 3ª, 3ª, each diaphragm, preferably, is tested, (as, by comparing it with a standard diaphragm or with a standard tuning fork) for its fundamental resonance pitch; and all diaphragms that differ in pitch from the pitch of the standard diaphragm by more than a permissible minimum (for example, one-third of a comma, though a greater or less minimum than this may be used) are rejected; and after the diaphragms are clamped in their rings, they are, preferably, again tested, each for its fundamental resonance pitch, by comparison with a standard diaphragm or a standard tuning fork and all that differ from the standard by more than a permissible minimum, are rejected.

Thus, substantial accurateness and agreement in the fundamental resonance-points or resonance pitches of the diaphragms, alike of the supervising musician's set, and of each subscriber's set, is readily attained.

And so as to the horns, these, preferably, by suitable apparatus and tools are made to be acoustically alike, as nearly as practicable; are made, preferably, of the same material and of the same, or substantially the same, internal size and shape. and by cutting a little more or less off of the small end of each horn, the horns can be made to have the same fundamental resonance within a permissible minimum of variation, for example, one-third of a comma, though a greater or less minimum error than this may be permitted. Preferably, the horns 4, 4, are of the exponential type, that is, exponential or nearly exponential rather than of the cone type, with straight sides.

A plurality of diaphragms and of horns, may well be used, as described below in connection with Fig. 8. But when a single diaphragm and horn are employed, alike at the central station and on the subscriber's premises, I have used a diaphragm of steel, two inches (2″) in diameter, fourteen one-thousandths (14/1000) of an inch thick, with a horn, say, six and one-half (6½) feet long, five-eighths (⅝) of an inch in diameter, at the small end, where it connects acoustically with the cap 3ʰ of the receiver or unit, and, say, two (2) feet in diameter at the bell. But all these dimensions may, of course, be varied; they are merely dimensions that I consider suitable. But the more important matter is to provide a really good radio-receiving set and a thoroughly good loud-speaker for the supervising musician and for the subscribers and to insure a very close correspondence between the qualities and characteristics or constants of the radio-receiving apparatus to which the supervising musician listens, and of those to which the subscribers or listeners-in listen; and to make the loud-speakers that serve for the supervising musician and those that serve for the subscribers or listeners-in as nearly as practicable, exactly alike acoustically, so that the listeners-in will hear exactly the same electrical voice of the music, as far as possible, in their loud-speakers, as that which the supervising musician hears. This, rather than the exact details of the receiving apparatus (though these details are important) is the more important matter.

Loud-speakers of the type above described made in the way above described, can be made and preferably are made to be very nearly the same acoustically; and their nature is such, as before said, that, apart from meddling with the adjustments of the magnet cores 5, 5, or $3^b$, $3^b$, and apart from physical damage to the receiver 3 or the horn 4, which, with proper care of them, will seldom happen, they will retain the same fundamental resonance-pitches at the same temperatures and with very little alteration of those pitches with usual alterations in room temperature, for a long time. And they can be made practically new at any time by putting in a new standardized diaphragm, firmly clamped between its retaining rings, $3^a$, $3^a$.

My diaphragms $1^a$, with supporting or stiffening rings $3^a$, as before described, are convenient and useful; having a known, uniform and constant fundamental resonance pitch, they tend to facilitate the attainment of good results. But with sufficient care and skill, good results may, perhaps, be attained with diaphragms that are not provided with any stiffening or supporting rings, but which are firmly clamped between the receiver cap $3^h$ and the diaphragm seat $3^g$ (see Fig. 9) or against any other suitable supporting surface that may be substituted for it.

*Modified and alternative constructions of my film-feeding mechanism*

Instead of providing two electromagnets, 13 and 13*, one of which gives movement to the shaft $32^a$ and the sprocket-wheels, 32, by which the film $19^a$ is dragged through the gate, and the other of which gives movement to the shaft $41^a$ and the sprocket-wheels 41, by which the film is fed to the loop above the gate $19^a$, I may gear the two sprocket-shafts, $32^a$ and $41^a$ together, and use one electromagnet only to drive both of said sprocket-shafts. One gearing for this purpose is clearly shown, partly in section and partly in elevation and partly diagrammatically, in Fig. 43, in which—

32 is one of the sprocket-wheels for dragging the film $19^a$ through the gate $29^a$, as before described.

$32^a$ is the shaft to which the sprocket-wheels 32, 32, are keyed fast, as before described.

41 is one of the sprocket-wheels for use in feeding the film $19^a$ to the loop that stands above the gate $29^a$. And, $41^a$ is the shaft to which the sprocket-wheels 41, 41, are keyed—all as before described. Further, $32^f$ is a pinion, keyed to the sprocket-shaft $32^a$, and $41^f$ is a similar pinion and with an equal number of teeth, which is keyed to the other sprocket-shaft $41^a$; and said pinions are connected together by intermediate gears, 939, centered on the shaft or pivot pin (for it may well be either) $939^a$ and 940, centered on its shaft or pivot pin, $940^a$. In a word, the pinion, $32^f$ keyed to the sprocket-shaft $32^a$, meshes with the gear 939, which meshes also with the other gear 940, and this in turn meshes with the pinion $41^f$, that is, keyed to the sprocket-shaft $41^a$. The result of the arrangement described is that the sprocket-shaft $32^a$, when turned a little by the action of the electro-magnet, 13, on the driving ratchet 34, (Figs. 26 and 29) gives movement through the pinion $32^f$, and intermediate gears 939 and 940, to the other pinion $41^f$, on the shaft $41^a$, and so gives movement to the sprocket-wheels 41, 41, that feed the film $19^a$ to the loop above the gate $29^a$.

Many forms of gearing are practicable for connecting the sprocket-shafts $32^a$ and $41^a$; and any gearing whatever that is suitable for the purpose may be used instead of the gearing shown in my Fig. 43.

It is usual, in motion-picture machines, to provide a loop of film above the gate $29^a$, from which loop, film is drawn to take the place of that which is dragged through the gate. I have shown this loop in my Figs. 25 and 43. An alternative form of apparatus, which I have contrived, is shown, partly in section and partly in elevation in Fig. 44, in which no sprockets are provided for feeding the film loop, but a shock-eliminator (or stress-eliminating device) is provided, to cushion the dragging of the filament through the gate, and the resulting pull on the pay-out roll 38. In this figure, which is to be taken in connection with Fig. 25, and other figures before described, 32 is one of the sprockets for dragging the film $19^a$ through the gate $29^a$, when the picture is to be changed; and $32^a$ is the shaft for said sprocket; 38 is the pay-out roll of film, from which film is drawn, that is, passed through the gate $19^a$; and 44 is the take-up roll on to which the film is wound that has passed through the gate—all as before described. And the sprocket-shaft, $32^a$, and sprocket-wheels 32, are operated by the magnet 13, in the manner before described; but they may be operated in any other suitable manner. When the sprocket-wheels 32, 32, move quickly, to drag the film $19^a$ through the gate, enough to change the picture, the strain on the film, instead of reaching directly to the pay-off roll 38, takes effect first in dragging downwards the rollers 39, 39, mounted on the shaft $39^a$, (of which one roll only is seen in Fig. 44) with their supporting frame $39^b$. And as the film $19^a$, the rolls 39 and the supporting frame $39^b$, move downwards somewhat towards the gate, $29^a$, the other pair of rolls 39* with their supporting frame $39^{b*}$ rise somewhat. Movement down towards the gate, $29^a$, of the rolls 39, with their supporting frame $39^b$, puts a strain upon the returning spring $39^d$, which causes a tension on the film $19^a$ which is transmitted to the rolls 39*, and supporting-frame $39^{b*}$ lifting them from their normal position, against the tension of the returning spring $39^d$. This tension is passed on through the film $19^a$ to the pay-off roll 38 which, under its influence, begins to turn in order to pay-off the film $19^a$. If the pictures are rapidly changed, the rolls 39 and 39*, turn, and the film $19^a$ passes over them and they oscillate, vertically, more or less, and the film is paid off from the roll 38, as much as is required. But, if there be a single movement of the sprockets 32, 32, or a few movements only, at the end of said movement or movements, the rolls 39 and 39*, with their supporting frames $39^b$, and $39^{b*}$, are returned to their normal positions by their respective returning springs $39^d$ and $39^{d*}$.

With this device, the rolls 39, 39, with their yielding supports, $39^b$ and $39^d$, and also the rolls 39*, with their yielding supports $39^{b*}$ and $39^{d*}$, give an element of elasticity to the film $19^a$, enabling it to pay-down suddenly into the gate $29^a$, without involving any severe strains upon the film $19^a$, or on the pay-out roll 38.

The yielding rolls 39 may be provided without the rolls 39*; that is, the rolls 39* may be omitted and the film $19^a$ may pay-down directly from the pay-out roll 38 to the yielding roll 39; in which case, preferably, the pay-out roll 38 is placed at a lower level, or the yielding roll 39 on a higher level, or both. This will be readily understood; and see also my Fig. 44, in which this modified arrangement of the film-feeding devices is shown.

With the form of film-feeding mechanism shown in Figs. 26 to 36, and before described, the energy for moving the film is imparted by the electro-magnet 13, through its armature 13ª, armature lever 13h, and pawl 13p to the film-driving ratchet 34, shaft 32ª, and sprocket-wheels 32.

In yet another form of film-feeding mechanism that I have invented, the electro-magnet 13 serves only to permit a movement of the film (as distinguished from giving it movement) caused by a driving weight, spring, electrical motor or the like.

*Changing pictures the most of the time, with moving pictures for brief intervals*

As I have said before, for some purposes, I prefer to use my changing pictures for the whole of a play, lecture, reading, or other performance. But it is sometime very important to show a movement, a gesture, a change in facial expression and so on, for which rapidly changing pictures are necessary; say, for example, twelve or more changes in the picture per second. The key or switch 9, shown in Figs. 2ª, 18ª and others is quite sufficient for use in controlling my changing pictures; but when it is desired to produce a moving picture even for a brief interval of time, the individual movements of the hand required for each change in the picture (for each change from one picture or frame to another) make it difficult, if not impossible, to secure good results with the key 9 alone; or if secured, it is only secured by much skill on the part of the operator. To avoid this difficulty, I provide, preferably, another picture-controlling key 9* (Figs. 2ª, 18ª) connected with a device for interrupting the circuit or changing its condition automatically, so that the picture-controlling operator, when he wishes to produce quickly-changing pictures or moving pictures, has only to depress the key 9*, whereupon electrical impulses are sent out automatically, whereby the pictures are changed in rapid succession, without any pains or effort on the part of the operator, who holds the key 9*, down for the moving pictures, but releases it when his series of moving pictures has come to an end. The apparatus shown for this purpose in Figs. 2ª and 18ª has, with the key 9, for changing the pictures once each time it is depressed, another key 9*, as before stated, for bringing on moving pictures.

Looking at Fig. 3, it will be seen that the key marked 9 (and also marked $s^2$), performs the same function as the key or switch $s^2$ in Fig. 3, that is, when closed, it connects the secondary circuit 6e of the transformer t, whose primary is fed by the oscillator 343e, with the grid G of the power tube v, whereby the oscillator 343e, and the power tube v are brought into action on the picture-control broadcasting aerial 340e. But when the switch 9 (or $s^2$) is open, said oscillator 343e and the power tube v do not act on the broadcasting aerial 340e. In addition to the picture-control key 9, (or $s^2$) for sending out a single train of waves, so as to change the pictures on the subscribers' premises, making one picture change each time the key 9 is closed—we have also another key 9*, as before said, which closes the circuit of the secondary winding 6e, of the transformer t (fed by the oscillator 343e) through the current-interrupting wheel 969, whose periphery consists alternately of a segment or tooth of the conducting wheel 969, and a segment of bakelite or other suitable insulating material 969b. This wheel interrupts the circuit of the secondary winding 6e, of the transformer t—that is, it interrupts the connection between this secondary winding and the grid G, of the power tube v, with a frequency which is equal to tn, in which t is the number of conducting teeth in the wheel 969—the number of current interruptions, which said wheel produces in one revolution; and in which n is the number of revolutions which said wheel 969 makes in a second. Thus, for example, with eight conducting teeth in the periphery of the wheel 969, as shown in Fig. 3, and supposing this wheel to make one hundred and twenty (120) revolutions per minute or two (2) revolutions per second, there will be sixteen (16) interruptions per second, of the connection between the grid G of the power tube v, and the secondary winding 6e, of the transformer t, fed by the oscillator 343e; sixteen trains of waves per second will be thrown on the air by the aerial 340e; and the pictures on the subscribers' premises will be changed at that rate; that is, at the rate of sixteen (16) pictures per second; and a brief series of moving pictures to illustrate a movement, a gesture, or an expression of the face, can be thrown upon the screen, on the premises of the subscribers, and also in the control room at the central station, where the picture-control operator watches the screen and the pictures produced on it.

Preferably, a mark as Stop or *st*, is placed on the last few pictures of a series of moving pictures, so that the picture-control operator, while watching the screen, has ample time to release his key 9*, and terminate the rapid feeding of the picture film through the projecting machines on the subscribers' premises. He will then operate his key 9, until another series of rapidly-changing pictures is required, when he again depresses the key 9*; and so on alternately, depressing the key 9 or 9*, whichever is at the moment required. And just as I put a mark, as Stop on the film to indicate to the picture-control operator when to release the key 9*, so also, preferably, I put another mark, as Start or 9*, followed by a time-duration mark, as ten seconds, one minute or the like, on the last picture, of the slow-change set, for example thus, Start in ten seconds, or more briefly, 9* 10 sec. specifying that the picture or frame so marked is to stand in the gate and on the screen for ten seconds, and that at the end of such ten seconds, the picture-control operator is to depress his key 9*, so as to bring a series of quickly-changing pictures into action; see Fig. 3H.

The nature of the film, having some frames or pictures whose feeding is controlled by the action of the key 9, at intervals of time greater than the time of visual persistence, so that such pictures each show on the screen for a greater time (usually a much greater time) than the time of visual persistence, and other frames or pictures whose feeding is controlled by the key 9*, through the current interrupter 969, so that said pictures are fed through the projector at intervals of time less than the time of visual persistence and are shown on the screen for periods of time less than the time of visual persistence, will be understood from the explanation before given and from the drawings, and particularly from Fig. 3ᴴ, in which, as indicated by the legends affixed to the same, some of the frames serve for changing pictures, in contradistinction to motion pictures; and these changing picture frames, with the details illustrated in the drawings and before described (but which may be altered within wide limits, if desired) are fed by the projecting machine, on the subscriber's premises, in response to electrical impulse sent out from the central station, under control of the key 9, at intervals of time greater than the time of visual persistence, so that said pictures stand in the gate and show on the screen for periods of time longer than the time of visual persistence. But other frames on the same film, as indicated by the marks in Fig. 3ᴴ, serve for motion pictures, and these frames are fed by the projecting machines, on the subscriber's premises, at intervals of time less than the time of visual persistence, in response to electrical impulses broadcast from the central station and which are controlled, in the preferred form of my apparatus, by the automatic interrupter, 969, Fig. 3ᴬ, so long as the key 9* is held down, by the control operator at the central station.

In Fig. 3, the keys 9 and 9*, are connected to interrupt the connection between the grid G of the power tube $v$ and the secondary winding 6ᵉ of the transformer $t$, fed by the oscillator 343ᵉ, just as the key $s^2$ is connected, in Fig. 3. But, if desired, said keys 9 and 9*, or either of them may be connected in circuit with the resistance R, and the filament F, as the key $s^3$ is, in Fig. 3.

Instead of providing a revolving current interrupter 969, as shown in Figs. 3, 3ᴮ, 3ᶜ and 3ᴰ, a vibratory current interrupter might be used. Electrically-vibrated tuning forks have been used as current interrupters, and an electrically-vibrated tuning fork might, in this case, be used as a current interrupter; or a current interrupter of the trembling-bell type may be used. And, in fact, any current interrupter whatever that is suitable for the purpose may be provided. And other devices may be used for throwing a series of trains of picture-controlling radio-waves on the air, for example, an alternator of low frequency (say, about 16 cycles per second) as described below.

*My loud-speaker having a plurality of diaphragms of different sizes or a plurality of horns of different lengths, or both*

It is a common practice in the broadcasting art, at present, to provide a single loud-speaker or loud-speaking unit to serve for all purposes. This loud-speaker may be a diaphragm with a horn, or it may be a cone loud-speaker or a dynamic loud-speaker, both of which are now well known and widely used. This method of working with a single unit has the advantage of simplicity and cheapness, but I have found that better results—much better results—musically, are produced by providing a plurality of loud-speakers which have different acoustic characteristics. For example:—

(a) A plurality of similar diaphragms, connected respectively to horns of different lengths; or (b) A plurality of diaphragms of different sizes, connected each with its own reinforcing horn; these horns being of the same size and shape; or (c) A plurality of diaphragms of different sizes, connected respectively with horns of different lengths; the smaller diaphragms having higher resonance points and shorter horns, and the larger diaphragms having lower resonance points and longer horns.

This last method of working I consider to be the best, so far as musical results are concerned; and apparatus for the purpose is illustrated in Fig. 8, in which three receivers are provided in a set, having diaphragms of different sizes respectively, and horns of different lengths respectively. These diaphragms are preferably made of steel and are mounted preferably in the retaining rings 3ª, 3ª, as before described, and said diaphragms and horns may have the following sizes, respectively, namely:—

| Diaphragms | | Horns | |
|---|---|---|---|
| Diameter | Thickness | Length | Bells |
| 1¾" | .012¾ | 33" | 18" |
| 2½" | .015½ | 51" | 21" |
| 3½" | .020 | 78" | 24" |

The above dimensions are given by way of illustration only; they are sizes that I consider suitable. But other sizes may be used. Two diaphragms may be used in a set instead of three; or four, or five, or six, et cetera, may be used, instead of three. But three diaphragms are substantially better than two; and while not so good as four, five, six or more, they are less expensive and less bulky than a larger set of loud-speakers would be.

Instead of using diaphragms with horns, other loud-speakers, for example, the well known paper-cone loud-speaker or dynamic loud-speaker may be used, preferably, a plurality of them having different diameters respectively, and different resonance points. But my loud-speakers with diaphragms of steel, particularly when these are mounted in the retaining rings 3ª, 3ª, and connected with good horns, are susceptible of being made almost exactly alike, and will remain in good condition for a long time and are but little affected by the weather—are much less affected by the weather than paper-cone receivers or wooden-diaphragm receivers. They are, in fact, particularly useful in securing acoustical sameness in the loud-speakers at the central station to which the speech and music-control operator listens, and the loud-speakers on the premises of the subscribers.

*My telephonic receivers and my electrical pick-up*

In telephone receivers as ordinarily made and in most loudspeakers that have a diaphragm, an electro-magnet to vibrate it, and a horn, the electro-magnet is on one side of the diaphragm, and the horn is on the other, and the lengths of the air gaps (and with them the impedance of the circuit) is changed by the motion of the diaphragm. The length of the air gaps is greater, and the impedance of the circuit less when the diaphragm moves away from the electro-magnet, but the length of the air gaps is less and the impedance of the circuit is greater when the diaphragm approaches its magnet; and this variation in the length of the air gaps and in the impedance of the circuit tends to produce distortion of the sound waves and an impairment of the music. But with my loudspeaker, and with my electrical pick-up, shown in Fig. 9, the two poles of the electro-magnet are located on opposite sides of the diaphragm; there are two air gaps, not on the same side but on opposite sides of the diaphragm, and when one of these air gaps lengthens, the other shortens by the same amount, and the aggregate length of the two air gaps is constant and unchanged. This tends to eliminate, or at least to diminish distortion effects.

Figure 44A:
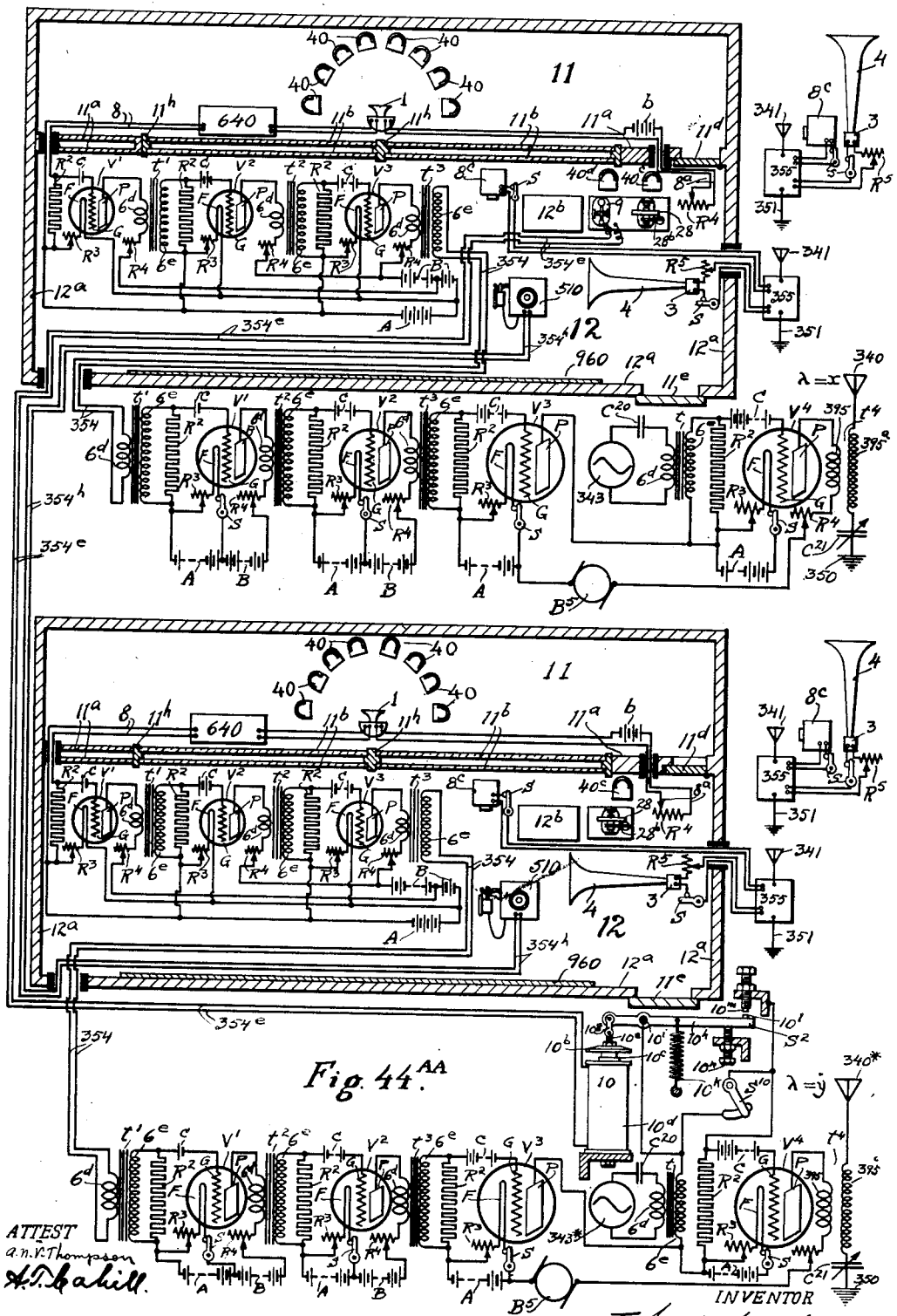

*The broadcasting apparatus of Fig. 44AA*

It is eminently desirable in broadcasting speech, music, and picture-control, according to my invention, to have two wave lengths or wave frequencies at command, one to serve for the broadcasting of speech and music, and the other to serve for the broadcasting of picture-control. Broadcasting stations, in most cases, have one wave length only at command. But it seems reasonable to expect that two wave lengths can be obtained in proper cases. When that is impracticable, however, for a single broadcasting station, two stations, each having its own wave length, and each ordinarily broadcasting speech and music independently of the other, may be connected together electrically to broadcast, when desired, speech, music, and picture-control according to my process, as if they were one station. This will be understood the more readily from Fig. 44AA. Considering said figure, this is a diagrammatic view, showing schematically two broadcasting stations 353 and 353*, which are ordinarily independent. One of these stations, marked 353, is shown at the top of the sheet, and the other, marked 353*, is shown near the bottom of the sheet. These stations may be located close together, or they may be many miles apart. Each of these stations, preferably, has a music studio of its own, feeding the output circuit 354, as shown in Figs. 2ᵃ, 2ᶜ, but the music studio may be of any other type that is suitable for the purpose. Each broadcasting station, preferably, has its own oscillator (as, 343 or 343*), its own input circuit 354, its vibration-amplifying devices, as v', v², v³, etc.; its modulator (for example, the tubes v³ and v⁴ with their accessories) and its own broadcasting aerial as 340 or 340*. The oscillators 343, and 343*, belonging to the two stations 353 and 353* respectively, have preferably each its own frequency or wave length, which is indicated in the drawings by the signs λ=x for the broadcasting aerial 340, and λ=y for the broadcasting aerial 340*. But the two stations are connected electrically in such manner, that, when desired, they can work together as one, preferably broadcasting speech or music (or speech and music) from one of the aerials (as 340) on one wave length and broadcasting picture-control from the other aerial 340* aforesaid, on a different wave length.

To this end, in Fig. 44AA a circuit 354ᵉ is provided which, connects the stations 353 and 353*; said circuit 354ᵉ is controlled by the picture-control-operator's key or switch 9 which is shown in Figs. 2ᵃ to 2ᶜ, and also in Fig. 18ᵃ. The picture-control-operator's key 9 aforesaid may be located either at the station 353, or at the station 353*; or at a point intermediate between them, or at a point otherwise located, but which is electrically connected with the stations 353 and 353* aforesaid, and which is provided with means for producing audibly for the picture-control operator, the speech and music which are being broadcast, as before described in connection with Figs. 2ᵃ and 2ᶜ; in which the radio-receiving apparatus 355, with the loudspeaker 3, 4, brings the speech and music that are being broadcast within the hearing of the picture-control operator; also, preferably, the picture-projecting apparatus 8ᶜ aforesaid is provided, controlled by the radio-receiving apparatus 355, which brings under the eyes of the picture-control operator, pictures the same as those that are being exhibited on the subscriber's premises, and under control from the central station, as before described. Preferably, with the apparatus of Fig. 44AA, the picture-control-operator's key 9, controls (through the circuit 354ᵉ and the electro-magnet 10, and the armature 10ʰ, and armature lever 10ʰ s²) the output circuit of the oscillator belonging to one of the two associated stations, say, the oscillator 343*, so that preferably, when the picture-control operator closes his key 9 (and so closes the circuit 354ᵉ) the electro-magnet 10, through its armature 10ʰ, and armature lever 10ʰ s², closes the output circuit of the oscillator 343*, so that said oscillator acts on the grid of the corresponding power tube v⁴; and said power tube acts on the broadcasting aerial 340, so that the latter throws off into space waves of the frequency of said oscillator 343*.

The armature lever 10ʰ s², in Fig. 44AA, it will be observed, is connected with one terminal of the secondary winding 6ᵉ of the output transformer t, belonging to the oscillator 343*; and when the electro-magnet 10 acts to bring its armature lever 10ʰ s² into contact with the contact point 10ᵐ, the circuit is closed to the grid G of the power tube v⁴, and the aerial 340* radiates waves the frequency of the oscillator 343* into space.

When the station 353* is broadcasting independently of the station 353, a by-pass switch s¹⁰ connects the secondary winding 6ᵉ of the output transformer t, fed by the oscillator 343* with the grid G of the power tube v⁴, independently of the armature lever 10ʰ s², and the contact screw 10ᵐ. But said by-pass switch s¹⁰ is opened when the station 353* works, as a part of or controlled from, the other station 353. That is, when the two stations 353 and 353* are working independently of each other, then, preferably, the switch or key 9 is open; the circuit 354ᵉ is open, and the switch 10ʰ s² is, also, open; but the by-pass switch s¹⁰ aforesaid is closed, so that the output circuit of the oscillator 343* acts upon the grid G of the corresponding power tube v⁴, belonging to the station 353*. In this state of things, the two stations (353 and 353*) are entirely independent of each other, and each acts to broadcast speech or music (or speech and music) for itself and without regard to the other. But when the by-pass switch s¹⁰ at station 353* is open, and the picture-control-operator's key 9 is closed from time to time, the two stations 353 and 353* operate as one, and are for the time being, in effect, one station only; and speech and music are broadcast from one of the oscillators 340, 340* on one wave length, and picture-control is broadcast from the other oscillator 340* on another wave length.

Thus, the two stations are, when required, each independent, a station acting entirely by itself; but when desired, the two stations, by the electrical connection between them, are made into one station, one part of which serves to broadcast speech, and music, while the other part serves to broadcast picture-control for the pictures to accompany the words (whether spoken or sung) that are broadcast from the other broadcasting device.

The two broadcasting apparatuses 353 and

353* may be located close together, or they may be located many miles apart, according to the circumstances of the case. The circuit 354ᵉ, connects them so that they become, in effect, one station, when required as before explained. Also, the telephone circuit 354ʰ and telephone instruments 510, 510, serve to connect the two broadcasting apparatuses 353 and 353*, so that instructions can be passed incidentally from one to another, to facilitate coordinating them as one station, at one moment, and operating quite independently, as two stations at another moment.

In Fig. 44ᴬᴬ, the picture-control operator's keys 9 and 9* and accessory apparatus are located preferably, at one of the stations, the station 353, at which also the music control key 28 for the control operator belonging to the station, is located, so that both the music and the picture-control for the two stations come from the station 353, but obviously, instead of locating the picture-control apparatus at the station 353, to control the station 353*, it might equally well be located at the station 353* to control the station 353, or said picture-control apparatus, as before pointed out (and see Fig. 2ᶜ) may be located at some other place, electrically connected with one or, preferably, with both of the two broadcasting stations, aforesaid, so that these two stations, when cooperating, are practically one station.

*Broadcasting speech, music, and picture-control, with a sound-record for the speech and music*

In general, in broadcasting speech, music, and picture-control, I prefer to broadcast the voices of speakers, singers, or instruments that are produced for the purpose at the time in the music studio; that is, to broadcast speech that is spoken, or music that is sung or played by living musicians at the moment, rather than recorded music or canned music. But for some purposes, sound records will be useful and permissible. This mode of working, indeed, has long been known and at times has been widely used in the broadcasting art. One mode of working for this purpose is to use a disk phonograph record, which acts on the needle and diaphragm, carried by the tone-arm of the machine; the disk record vibrates the needle and the diaphragm in the usual manner, and the diaphragm acts on a carbon microphone (or, indeed, forms part of a carbon microphone) or the diaphragm is made in whole or in part of iron, and acts inductively on a small electro-magnet, having a winding in which alternating currents are produced, corresponding to the sounds recorded on the disk, and these currents are applied in the usual manner to the grid of a vacuum-tube amplifier; and the output circuit of the amplifier is connected with the modulator of the broadcasting device. All this is old and well known in the art.

Another way of working is to employ a photographic sound record which may be made by the Ries process, as disclosed in U. S. Letters Patent No. 1,473,976, dated November 13, 1923, or by Hoxie's process, disclosed in Letters Patent No. 1,598,577, dated August 31, 1926, or by any other suitable process. An apparatus for broadcasting with a suitable photographic sound record, and for controlling pictures on the subscriber's premises from a central station, in suitable synchronism with the words and music that are broadcast from such station, is shown in my Fig. 44ᴮ, in which:—

511 is a strip or ribbon of celluloid or other suitable material on which the photographic sound-record has been made, by any suitable process.

512, 512 are rolls or cylinders on which the sound-record 511 is wound, and from one of which, say the upper one, it is wound onto the other at a suitable and uniform speed which may be as low as one foot per second, but is more frequently about 1½ ft. a second, or from 80 to 90 ft. a minute.

512ᵃ, 512ᶜ are the shafts or centers of the film-carrying rolls 512, 512.

513 is a closed box or case having opaque walls. In this case is a small incandescent lamp 514, whose filament F is fed by the battery $b$. The current through said filament F, the temperature of said filament, and the intensity of the light given off by it, are controlled by the rheostat $R^3$. Behind the lamp 514 is a reflector, 514ᵃ and in front of it are condensing lenses $c^4$, $c^4$ which are suitably mounted in the opaque cylindrical case 515, which is furnished with a circular flange 515ᵃ, by which it is attached to the case 513 aforesaid, by screws, not shown in the figure. The lens-carrying case 515 has a front-piece 515ᵇ and at the center of this is a light-slot 515ᶜ whose dimensions, measured vertically, are very small, say about 1/1000 of an inch at the front side where the film 511 touches it, but whose dimensions horizontally are much greater, for example 5/64 of an inch; but it may be either more or less than this. The light from the lamp 514 is concentrated by the lenses $c^{41}$, $c^{41}$, on the light-slot 515ᶜ. The sound film 511, with its record of speech or music or both, passes immediately in front of the light-slot 515ᶜ, and all the parts are so arranged and shaped (as the drawings show) that said sound film 511, with its sound record lies closely against the curved front surface of the front-piece 515ᵇ, and the light-slot 515ᶜ therein, covering said slot closely.

The central portion of the front-piece 515ᵇ with its light-slot 515ᶜ is shown on a larger scale in the detail view, Fig. 44ᴮᴬ. The principle of all this, with some details of construction, is well explained in the patent to Ries aforesaid, No. 1,473,976, and it is well understood in the art, so that I need not dwell further upon it here.

In front or to the right of the photo-phonic film 511 is a photo-electric cell 516, having an anode A and a cathode Ca to which the opposite poles of the battery B are connected; also, said circuit which contains the battery B, anode A, and cathode Ca is connected with the amplifier 517. This connection may be made in any suitable manner, for example, by connecting the primary winding of a transformer in series with the battery B, anode A, and cathode Ca, and then connecting the secondary winding of this transformer, one terminal to the grid of the first-stage vacuum tube of the audio-frequency amplifier 517, and the other terminal to the filament of said first-stage tube; or the connection between the photo-electric cell 516 and the amplifier 517 may be made in any other suitable manner. The output circuit of the amplifier is the same as the input circuit 354 of the broadcasting apparatus; that is, the output circuit 354 of the amplifier 517 feeds the grid G of the audio-frequency amplifying tube $v'$, belonging to the broadcasting apparatus; and from this tube $v'$ to the broadcasting aerial 340, everything is, or at least, may well be, as before described in connection with Fig. 3, and as shown, also, in Fig. 44ᴮ. For picture-control, the oscillator 343ᵉ, the power tube $v$, the high-voltage direct-current source $B^5$, and the broadcasting aerial 340ᵉ, with their accessories, are provided; also, the operator's key 9, controlling the circuit 354ᵉ is provided, and this circuit controls the power tube $v^4$ and the broadcasting aerial 340ᵉ in the manner shown in the drawings, and before described, or in any other suitable manner.

The picture-control operator, who hears the music and speech that are being broadcast, as before described in connection with earlier figures (as Figs. 2ᵃ, 2ᶜ, 3 and 4 to 7ᴮ, etc.) operates the key 9 at the correct intervals of time, so as to change the pictures on the subscriber's premises, as before described, in proper synchronism with the words and music that are being broadcast from the central station with the record 511, just the same as if the words and music so broadcast were from the lips of living speakers or singers, and from instruments played at the moment by living musicians, as before described in connection with earlier figures, so that nothing further need be said in this place. The sound record 511 takes the place of the living speakers or musicians and gives off to the photo-electric cell 516, the amplifier 517, and the broadcasting apparatus, the sounds that were once recorded on such record from the lips of speakers or singers, and by instruments played at the time the sound record was made.

*My modified radio-receiving apparatus of Fig. 44ᴱ*

Generally speaking, I consider it desirable in receiving picture-controlling impulses which are broadcast from the central station through the air or the ether, to receive these with tuned devices, as is commonly done in radio work of all kinds; to amplify the waves so received with a suitable amplifier, preferably, a radio-frequency vacuum-tube amplifier, and then to rectify these waves with a suitable rectifier, and to apply the rectified current to operate an electro-magnet, which through suitable devices changes the pictures in the subscriber's picture-projecting machine. This mode of working is illustrated in preceding figures. But, while I consider the rectifier as in general preferable, it is not indispensably necessary; any other mode of applying picture-controlling currents, received from a central station, to operate the subscriber's picture-changing apparatus that is suitable for the purpose, may be used. One other mode of working (to mention one only) that is practicable is to use a photo-electric cell. Preferably, the picture-controlling waves or currents received from the central station are amplified and applied to a small incandescent electric lamp, which throws its light upon a photo-electric cell, and brings this cell into activity when currents are received from the central station, which, when amplified, are sufficiently strong to produce sufficient radiation from the lamp to actuate the photo-electric cell. This, preferably, working through a suitable amplifier, operates a suitable electro-magnet; for example, the relay magnet 37 before described.

One apparatus for this purpose is illustrated in Fig. 44ᴱ, which is a diagrammatic view showing schematically a form of radio-receiving apparatus for use on the subscriber's premises for receiving speech, music, and picture-control according to my invention. This figure is in general similar to Fig. 7ᴮ before described, except that the lamp 514 is fed from the output circuit of the vacuum tube $v^4$ in the lower row, instead of the rectifier $v^5$, belonging to Fig. 7ᴮ; also, as in Fig. 44ᴮ the photo-electric cell 516 is provided with its anode A and cathode Ca, and these are connected together by the battery B; and they are connected, also, with the amplifier 517 in the manner before described in connection with Fig. 44ᴮ, or in any other suitable manner; and the output circuit of the amplifier 517 (marked 517ᵃ, in Fig. 44ᴱ) is connected to feed the relay magnet 37; and this magnet controls the electro-magnets 13, 13*, 953, and 956, as before fully described in connection with Fig. 7ᴮ and other figures; and particularly, said relay magnet controls through the magnet 13 the film-feeding mechanism of the subscriber's projecting machine, and through the magnets 953 and 956, said magnet 37 controls the shutter 953ʰ, all as before described in connection with earlier figures, as 7ᴬ and 7ᴮ, and also Figs. 24 to 44.

In Fig. 44ᴱ the lamp 514 is lighted solely by means of the radio currents received by the receiving antenna 341ᵉ, amplified by the amplifying tubes, and applied by these to the lamp 514. But in the detail view, Fig. 44ᴱᴬ, said lamp 514 is heated to a good degree by the battery $b$, which may be of greater or lesser strength as required, but said lamp is not heated by said battery alone to a point at which its radiation, when applied to the photo-electric cell 516, will operate (through the amplifier 517) the relay magnet 37. But when the heat, derived from the current of the battery $b$, is sufficiently increased by electric currents from the output circuit 514ᵈ of the tube $v^4$ in the lower row in Fig. 44ᴱ, then said lamp 514, thru the photo-electric cell 516 and the amplifier 517, operates the relay electro-magnet 37 aforesaid.

*Distinctive marks on my picture films*

On each set of my changing-pictures, I preferably place, as before said, distinctive marks of some suitable kind, by which each set of pictures may be easily identified. These marks may be numbers, or they may be descriptive words or letters of the alphabet, or numbers with one or more words or letters of the alphabet, or they may be of any other suitable sort. These distinctive marks are preferably placed on each film at the beginning, and also at the end of the same. See, for example, Fig. 3ᴳ in which distinctive marks are shown at the beginning of the film, namely, the marks "Film A—16,001 of the A. B. C. Co." But any other marks that are suitable for the purpose may be used. And if the marks are made sufficiently small, they may be placed (or at least, a part of them may be placed) on each frame or picture, or on every $n$th frame in which $n$ is any suitable number, for example, 10.

Also, I prefer, in some cases, at least, to mark each frame with a distinctive mark, for example, with serial numbers as 1, 2, 3, to $n$. This, also, is shown in Fig. 3ᴳ and in Fig. 44ᴮ.

Figure 44C:
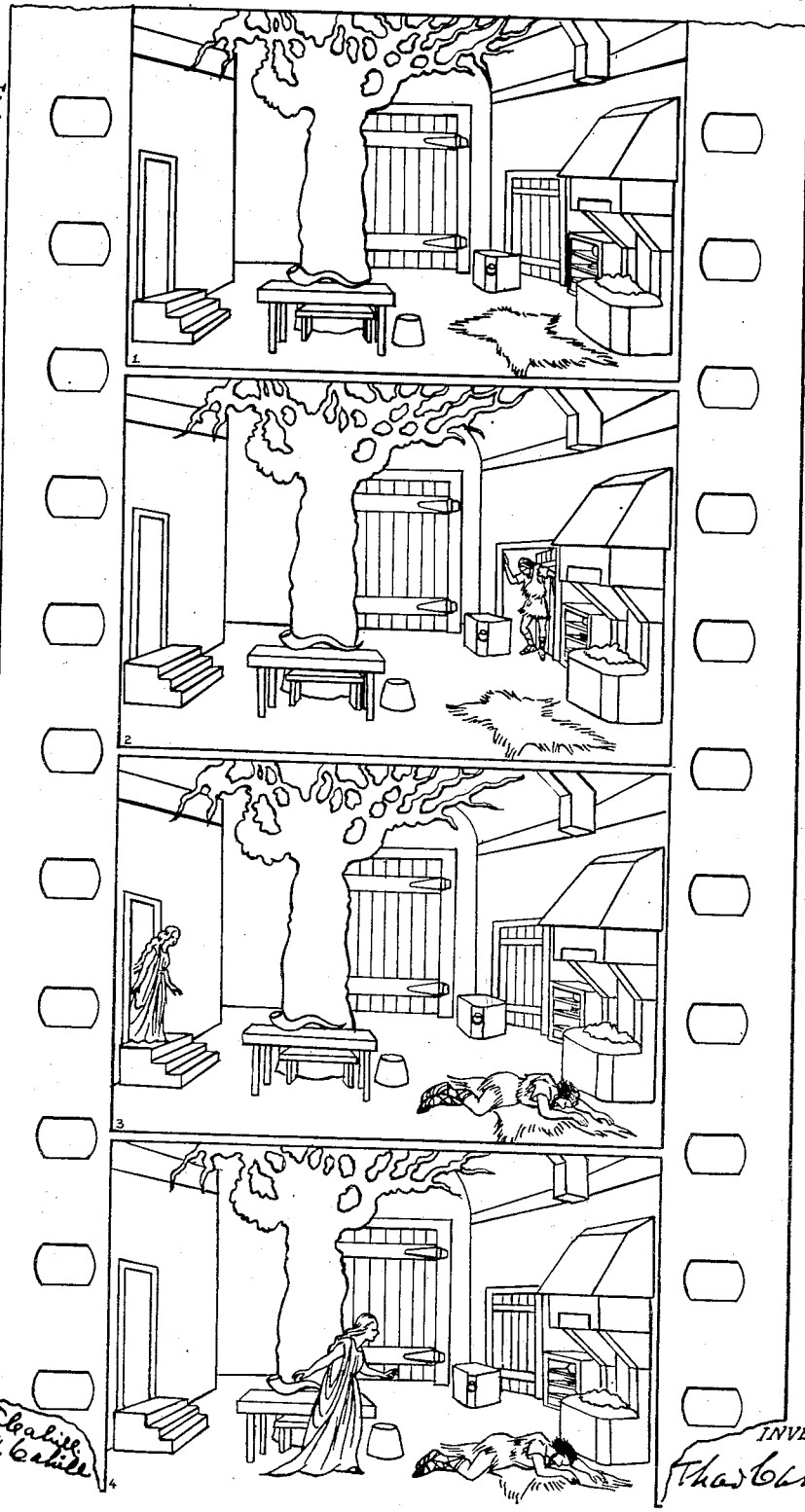

My picture-control operator, who operates the picture-controlling key 9 (and sometimes, also, the supplemental key 9*) preferably hears the words and music, as before explained, and sees the pictures as they are exhibited; and he may act to change the pictures, if thoroughly competent and very conversant with them, on his own knowledge, and without any written or printed instructions. But in many cases, it is quite practicable and desirable to give him exact written or printed instructions which he can readily follow; thus, in operas, operettas, musical shows, plays that are acted in conformity to a written or printed book, and generally, in any case in which there is a written or a printed paper or book, from which someone reads or sings, or in conformity to which he reads or sings, marks may be placed on such paper which serve as directions to the picture-control operator, when to change the pictures. One illustration of this is given in my Fig. 44D. This, as before said, shows a portion (the first portion excepting the overture or introductory music) of the music of the Wagnerian opera Die Walkuere, with my marks thereon. The score shown is taken from a pianoforte score by Kogel, published by Peters, with the stage directions abbreviated in some cases to save space, and with the words translated into English by me, instead of the original German words. The German is, of course, preferable for all who understand it, but for the benefit of the public, which, in general, does not understand German, I have translated it. On this musical score will be observed here and there numbers in circles as ① ② ③ ④ etc. These numbers, which are distinguished from marks of fingering and other marks often found on music, by being enclosed in a circle, correspond each to the numeral on the appropriate picture or frame, and give to the picture-control operator exact directions as to when he shall change the pictures, by depressing his key 9; that is he depresses his key 9 at that point of time in the music at which the corresponding mark (as ② or ③ or whatever it may be) stands; and these marks on the music, taken in connection with the corresponding marks on the several frames or pictures (see Fig. 3G and Fig. 44C) indicate whether the picture film is in the position in which it should stand at the moment or not; and if the film has lagged, the picture-control operator by his key 9 brings it up into proper position.

I have before explained in words the principle of my invention, with respect to changing-pictures, as distinguished from moving pictures. But an understanding of the matter may be facilitated by considering Fig. 44C, in which 4 pictures are shown, constituting the first portion of a series of pictures to illustrate Wagner's opera Die Walkuere. These pictures, as a reference to Fig. 44C will show, are as follows:—

The first picture (marked 1 in the lower left-hand corner) shows the interior of Hunding's dwelling. And while this picture is showing, the noise of a storm is heard outside.

The second picture (marked 2) shows the same interior, but with the door at the right open, with Siegmund in the door entering, and in the attitude of one staggering, or barely able to stand up. And while this picture is showing, Siegmund's words—

Whose hearth this may be, here must I rest me are sung by him.

The third picture (marked 3) shows the same interior, but the door at the right is now closed. Siegmund is lying at the hearth, and Sieglinde is standing in the door at the left looking at him. And while this picture is standing in the gate and showing on the screen, her words are sung—

A strange man; him must I question.
Who came in the house and lies at the hearth?

The fourth picture shows the same room as before with Siegmund still lying at the hearth, but Sieglinde, who has received no answer to her question, has advanced towards Siegmund as far as the middle of the room, and is looking at him intently. While this picture is showing, Sieglinde's voice is heard saying—

He lies there tired with traveling;
Is he insensible? Or is he sick?

Now, more pictures than four might be used to illustrate the foregoing for the time of the above is sixty-two measures of Wagner's music, most of it in 3—2 time and occupying perhaps four minutes. Thousands of pictures would pass through the gate, and be shown each for an instant on the screen, with moving pictures to illustrate this. But the four pictures, shown in Fig. 44B, and above previously described, serve to show each of the different states of things, broadly considered, which transpire during the time said pictures are showing.

Thus, by my process, a small number of pictures as compared with moving pictures are availed of to show as much as can be shown with a small number of pictures. And while these are at times inferior to moving pictures, they are at other times superior in that they show the scene in an accurate and quiet manner, and in a way that is easy for the eyes. As my changing pictures are relatively very few in number for the same time, as compared with moving pictures, they can be and should be better pictures than motion pictures usually are; preferably they are, in general, as far as practicable, in natural colors or a close approximation to the same, as before stated, and with an interesting background—pictures of high grade and with as much artistic and dramatic merit as is practicable. Also, they may be on a larger scale than most motion pictures are, that is, a larger picture or frame, with less amplification, for the same size of picture on the screen.

In Figs. 3 to 3D I show an automatic current interrupter, for interrupting the wave-trains, radiated from the picture-controlling aerial 300e, so as to change the pictures on the subscriber's premises fairly rapidly (say, for example, at the rate of about 16 per second or even more) so long as the key or switch 9* is closed. This current interrupter is a simple and practicable device for the purpose, but practically the same effect may be obtained by substituting for said current interrupter an alternator, having a frequency of, say, about 16 cycles per second, or even somewhat more. This alternator, when connected with the grid of one of the vacuum tubes and properly adjusted will vary the current, if desired, from a maximum, when the voltage of the alternator coincides with the voltage normally applied to the grid, to a minimum or even zero, when the voltage of the alternator is opposed to that normally applied to the grid. This will be readily understood; and any other device that is suitable for the purpose, by which the waves broadcast from a central station are interrupted or varied periodically, so as to change the pictures on the subscriber's premises with the correct frequency (say, about 16 times in a second) may be used, instead of the current-interrupting device, shown in Figs. 3 to 3D.

But my electric current-interrupter 969, shown in Figs. 3A to 3D, has this advantage over other current interrupters, and over an ordinary alternator, that by suitably cutting the slots in the conducting wheel 969, into which the insulating segments 969b, 969b are set, and by suitably regulating the widths of said insulating segments 969b, the period of time that the circuit is closed, as compared with that during which it is open, is easily regulated, at will, so as to leave say, one unit of time for the waves or other electrical impulses that actuate the electro-magnet 37 on the subscriber's premises, to change the picture, and three units of time (or more or less than this, as required) for the picture to stand on the screen, before another picture-changing impulse is broadcast from the central station, to effect another change of pictures.

*The making of pictures for practicing my process*

The pictures required for practicing my process may be prepared in any suitable manner, as, for example:—

(a) Paintings or drawings may be made, such as are suitable for the purpose; these are then photographed on a film and reduced in size, suitably for the film on which they are thus photographed. From the negative thus prepared, positives may be produced by the contact process (by contact printing), or in any other suitable manner.

(b) Photographs may be made in any suitable manner directly on a film, as is done for motion pictures, but preferably with changing pictures as before explained, instead of motion pictures, for the most of the work, or in some cases for all of it. Or, (c) Still-picture photographs may be made on a much larger scale than the film photographs. These still-pictures are touched up and improved and then photographed, on a reduced scale, on to a film, so as to make a negative, from which, in turn, positives are made by any suitable process. Or, (d) Motion pictures may be made with a suitable motion picture camera; the best or most useful of these pictures or frames may be selected, a small part of the whole but sufficient in number for my changing pictures, as before described; and from the pictures or frames so selected, a film is made in any suitable manner; and from this, as a negative, positives are made in any suitable manner for distribution to the subscribers.

(e) In some cases, in which a good motion-picture film is in existence, the pictures belonging to the film may be viewed by a competent person, and a portion of them (in general, a small portion) selected, sufficient in number for my changing pictures, as before explained, with, in some cases, moving pictures for a short period of time to illustrate a particular act, gesture, or expression; and from the pictures so selected, a negative film is made, from which, in turn, positives are produced in any suitable manner, for distribution to the homes of the subscribers.

(f) Two or more of the preceding modes of working may be used in making a suitable film, as, for example:—

(I) Making one or more paintings to illustrate a scene or a person, and photographing, on a reduced scale, these paintings onto a suitable film to make a negative;

(II) Making one or more still-picture photographs, on a much larger scale than the film pictures, to illustrate things that are best illustrated in that way, and then touching up these photographs, and photographing from the improved photographs onto a film, on a smaller scale;

(III) Making motion pictures for another part of the same work, and selecting such of these as seem most useful—and making up from the foregoing, either with or without any other suitable means, a negative film, from which positives are made in any suitable manner for distribution to the subscribers.

In making pictures to illustrate a dramatic performance, an opera, an operetta, or a musical show, good photographs of the stage and of the actors in various critical or representative conditions of things are very helpful and these, when touched up or otherwise improved by competent persons and then reduced photographically onto a film, to make a negative, either with or without photographic reductions of suitable paintings, and either with or without other pictures, taken in a motion-picture camera, are quite useful in making up the negative required, from which, by suitable copying processes, positives are produced for distribution to the subscribers.

I have spoken herein of making a negative from which positives are produced by contact printing, or in any other suitable manner, for distribution to the subscribers, so that each will have a suitable film at his home for use in his picture-exhibiting machine, controlled electrically from the central station. But when the subscribers are numerous, it will be desirable to make a plurality of negatives which are then used at the same time, each to make positives. One practicable mode of doing this is to first make a suitable negative; from this make, by contact printing, or in any other suitable manner, one or more positives; from these, make by contact printing, or otherwise, a plurality or even a multiplicity of negatives; and then use each of these negatives (or each of a plurality of them) in turn, by contact printing or otherwise, to make positives. In this way, a great number of positives can be made in a brief period of time, sufficient to supply the subscribers.

My changing pictures may be made, and preferably are made, so far as practicable, in colors, in some suitable manner, as, for example:—

(a) By hand coloring;
(b) By tinting;
(c) By printing through a stencil, or in any other suitable manner;
(d) By chemical toning;
(e) By natural-color photography, by the prizma or Kelley processes, or by the technicolor process, or in any other suitable manner.

Those processes in which the positive stock is coated on both sides, and one side is availed of for one color (say, orange-red) and the other side for another color (as blue-green) are probably the most practicable so far as natural-color photography is concerned. One process of this sort is described in the United States patent to Mejia, No. 1,174,144, dated March 7, 1916, and see also my Fig. $3^{I}$, showing diagrammatically a picture-film for my changing-pictures, coated on both sides, according to the process of Mejia described in the Letters Patent aforesaid. In Fig. $3^{I}$, $19^{a}$ is a film of celluloid or other suitable transparent picture-carrying material; $19^{a1}$ and $19^{a2}$ are coatings of gelatine, collodion, or other suitable substance, upon the opposite sides of said film $19^{a}$, to hold the sensitizing agent; and $19^{b1}$, $19^{b2}$ represent the layers of sensitizing material. These films may be made and colored by the technicolor process, or in the way described by Mejia in his Letters Patent aforesaid or in any other suitable manner that is known in the art of making photographic films in natural or approximately natural colors. And while black and white pictures may be used and, when well executed, are sometimes good, it is proper to say that pictures in natural colors, or in good approximations of those colors, are much more important to producing the best effect with my system of changing pictures than they are with motion pictures. For my pictures, in general, change much less frequently than motion pictures do, and the eye is less occupied with those changes; and I have found that it is even more important that the eye should be pleased with what it sees and should be occupied with the details and color differences of the various scenes presented to it, with my changing pictures than with motion pictures.

*Miscellaneous*

In Figs. 24ᶠ, 25, and other figures, the film-feeding sprocket wheels 32, 32, are shown with twenty-four teeth, and in Fig. 29, the driving ratchet wheel 34 which is keyed to the shaft 32ᵃ, to which the sprocket wheels 32 are also attached, is shown with eight teeth. And with these details, a movement of one tooth of the driving ratchet wheel 34 corresponds with a movement of three teeth of the sprocket wheels 32, 32, and with a movement of the film 19ᵃ of one picture or frame, as before explained. To match this, three tooth holes per frame or picture on each side of the film 19ᵃ would be correct. But four such tooth holes are provided in standard moving-picture theatre film, thirty-five millimetres wide; and in several of my figures (as 3ᴳ and 44ᶜ) the draftsman has followed this standard practice, and has shown four holes per frame. It will be understood that the film-feeding sprocket wheels 32, 32 may be arranged to move either three or four teeth for each movement of the film, and that the film 19ᵃ may have four holes per frame as in standard motion picture theatre practice, or it may have three holes only to conform to the details as to the number of the teeth in the driving ratchet 34 and the sprocket wheels 32, 32, shown in my figures and before described. If the same size of picture film be used as in standard motion picture practice, that is, thirty-five millimeters wide, with a movement of three-quarters of an inch of the film for each picture or frame, the standard practice of four holes is suitable. But if the film be narrower and the movement of the film per frame be less (for example, nine-sixteenths of an inch or half an inch) then a movement of two or three teeth would be sufficient and two or three holes in the film on each side for each movement, corresponding to a picture or frame, would be sufficient. And with smaller pictures, for example, those commonly used in residences, with forty pictures to the foot, or three-tenths of an inch ($\frac{3}{10}''$) per frame, as well as with still smaller pictures, a single perforation or hole per frame, preferably, one perforation on each side of the film would be sufficient.

I have before spoken of my changing pictures which stand in the gate, preferably for irregular intervals of time, some for a short time, and some for many seconds or even for several minutes, according as the control operator thinks best and effects by the intelligent manipulation of his key 9; and of my moving pictures which in most cases, at least, serve preferably for only relatively short intervals of time, and which are brought into use by depressing the key 9*, as before described.

Referring to the drawings: in Fig. 3ᴴ, the first section of the film 19ᵃ, the first frame that is seen at the top, marked 4 and all the frames following, down to and including No. 26, are for changing-pictures, but the frames following No. 26, that is, Nos. 27 to 53 inclusive, are for motion-pictures controlled by the key 9*; and on the changing-picture frame, No. 26, though without that number affixed to it is marked, as directions to the picture-control operator, "9* in 5 sec." which signifies, in effect, to press the key 9* down, in order to bring on the changing-pictures in five seconds from this time. And as this section of motion-pictures, running to and including frame No. 53 is approaching its end, say ten frames from the end (but, of course, it may be more or less than ten) the letters st., signifying stop, are shown on the frame, in letters or type of moderate size; but on the last two frames of the changing-picture series, these letters are shown quite large. The first mark st., of moderate size, serves to make the changing-picture operator alert, so that the moment the larger sign St appears on the screen (from frame 52, in the second section of film 19ᵃ in Fig. 3ᴴ) he instantly releases his key, so that the motion-picture series stops, and the changing-picture series beginning with the frame 54 in Fig. 3ᴴ, are brought on, each as required, preferably by manipulating the key 9; and again, after a series of these changing-pictures, each lasting longer than the period of visual persistence, have been shown, the sign appears on the film and screen (with the exact details shown in Fig. 3ᴴ, on frame 62) "9* in 5 sec.", meaning, as above explained, to depress the key 9* in five seconds, which brings on another series of motion-pictures, which run from the frame 63 in Fig. 3ᴴ, second section, up to and including the frame 90, but of course, it may be more or less than this. Similar directions to those before explained are made on the final group of frames of the changing-picture series, ending with frame 90, in Fig. 3ᴴ, to advise the control operator to cut off that series when it reaches its proper natural limit, whereupon the changing-picture series commences again. All this will be clear from Fig. 3ᴴ and the other figures and the description before given. In Fig. 3ᴳ all the pictures or frames shown are changing pictures as distinguished from moving pictures; and so in Fig. 44ᶜ, parts one and two, the pictures shown are changing pictures and not moving pictures.

3ᶻ 3ᶻ are holes in the case or shell 3ᶠ which constitute openings to the free air, from the space below the diaphragm 1ᵃ in the case 3ᶠ; seen in Fig. 9. The purpose of these holes 3ᶻ, which may well be larger and more numerous than shown in the drawings, is to prevent the formation of a resonance chamber below the diaphragm; that is, a chamber which would tend to reinforce some notes or tones unduly.

In divers places in this specification and in the statement of claims at the end hereof, I speak of picture-changing electrical impulses distributed from a central station, or use other words of similar import. By a picture-changing electrical impulse, I mean an electrical impulse or effect sent out from the central station, for the purpose of changing the pictures at the dependent stations; as electrical waves or vibrations or currents sent out from the central station or varied or altered from the central station in such a manner as to change the pictures at the dependent station; the picture changes at the dependent stations being thus effected or brought about each in response to an electrical action or change of some sort at the central station, taking effect through suitable receiving apparatus at the dependent station, so as to change the pictures there automatically, picture by picture, as required, in obedience to the electrical control exerted for that purpose from the central station. And I use this language or similar language to contrast my mode of working with the mode of working of motion-picture machines, the rotation of whose shafts is synchronized, by electrical impulses sent out from a central station, in which latter case the changing of the pictures is effected, in the dependent machines, by the Geneva movement or other similar movement, in the usual way, and the electrical impulses from the central station serve only to insure (or tend to insure) synchronism in the movements of the shafts of the projectors at the dependent stations with that of the master or controlling shaft, at the central station.

In this specification and in the statement of claims at the end hereof, I sometimes speak of a picture-changing device at a dependent station or on the subscriber's premises that is of itself inactive but which is responsive to and operated by electrical waves or electrical impulses from a central station. By such expressions or similar expressions I refer to that characteristic of my preferred form of apparatus, in which the picture film is not fed by the projector of itself and continuously as in a motion picture machine, but rather is fed from time to time, as required, by electrical impulses or effects sent out from the central station for that purpose, so that the changes of the pictures are effected from the central station.

In different places in this specification, and in the statement of claims at the end hereof, I speak of a "changing-picture projecting machine, in contradistinction to a motion-picture projecting machine", or of a "changing-picture projecting apparatus, in contradistinction to a motion-picture projecting apparatus" or use other similar language, or words of similar import. By a changing-picture projecting machine, or a changing-picture projecting apparatus, or other words of similar import, I refer to a projecting machine that is suitable for producing my changing pictures, as explained above, which usually differ substantially in that which they show, each from its next neighbor, and which ordinarily stand in the gate and show on the screen for periods of time longer than the period of visual persistence. By a motion-picture projecting machine, I refer to the well known machines in common use, for projecting motion pictures. Now, the leading characteristic of a motion picture machine is that it produces, on the screen, pictures or frames which, in general, are nearly alike and which are changed in times not greater than the period of visual persistence and, indeed, usually, in times much less than the period of visual persistence, so that the succession of pictures projected on to the screen, produces on the eye of the beholder the effect of a moving or gradually-changing scene. But with my changing-pictures, in contradistinction to motion pictures, as before explained, the individual pictures or frames preferably, differ ordinarily substantially from each other, as before explained, and ordinarily they show each on the screen for a period of time that is greater than the time of visual persistence—usually much greater than the time of visual persistence. Also, the motion pictures are changed periodically, or with a certain frequency of change, as before explained, usually at least sixteen times a second, and in New York motion picture theatres, and in most others, about twenty-four times a second. But preferably, my changing-pictures are changed, as before explained, at intervals of time greater than the period of visual persistence, and also, preferably, at unequal periods of time, sometimes rather short, sometimes quite long, according to the circumstances of the case.

In motion-picture machines, as these are usually constructed and used, (indeed, always, so far as I know) the changes of the pictures are effected in obedience to the movements of a controlling shaft that is revolved in some suitable manner. Ordinarily, the controlling shaft, through some gearing, gives movement to a cam-plate and this cam-plate gives movement to a star-wheel belonging to the Geneva movement, and in such a manner that the star-wheel is moved once for each rotation of the cam-plate, which usually runs from 960 to 1440 R. P. M.; and with each such movement of the star-wheel a change of the pictures is effected. But with my apparatus, when used to produce changing-pictures, the film is advanced, as before explained, from time to time and at intervals of time which are normally greater than the period of visual persistence; and preferably, these advances of the film are made, in my changing-picture machine, by movements (preferably, by reciprocating movements) which arise in response to suitable electrical impulses distributed from the central station for that purpose. Stated otherwise, with my changing-pictures, the film is not advanced every sixteenth of a second or every twenty-fourth of a second, because the controlling wheel or handle has turned a sufficient distance to compel such an advance (as in the motion-picture machines now in use) but, on the contrary, my changing-picture film, in my changing-picture projecting machine, is advanced from time to time and ordinarily at much greater intervals of time than the period of visual persistence, as before explained, by reason of the electrical impulses distributed from the central station for that purpose—for the very purpose of causing such advances of the film and the consequent changes of the pictures. And in my preferred form of apparatus, a reciprocating device, for example, the armature-lever of an electro-magnet, is used to control the advancing of the pictures. This reciprocating device is normally inactive, but becomes active whenever it is necessary to change a picture, and by its movement it effects such change. The difference, then, it will be seen, between my changing-picture system and my changing-picture machine or apparatus on the one hand, and the motion-picture system and the motion-picture projecting machines known and used in the art, on the other hand, is substantial and indeed striking; the two things, it will be seen, are widely different.

And this is so, notwithstanding the fact that my changing-picture projecting machine may, on occasion, be used for short intervals of time, to project motion-pictures; its nature is still widely different from motion-picture projecting machines heretofore known and now in universal use. For my peculiar projecting machine is still a changing-picture projecting machine, capable of being used to project my changing pictures, for periods of time much greater than the time of visual persistence, and with the changes from picture to picture preferably made at irregular intervals of time as desired (things that the motion picture machines heretofore known and used do not do and cannot do) even though my changing picture machine is susceptible also of being used, on occasion, to project motion pictures for short intervals of time.

One part of my invention herein disclosed, relates to the projection of what I have called changing pictures, in contradistinction to motion pictures. By these changing pictures, as before explained, a drama or other subject may be illustrated, with a small fraction of the number of pictures or frames that would be required to illustrate it in the motion picture way, as before explained, and as illustrated by Figs. 44⁰ and 44ᴰ. But another portion of my invention relates to producing motion picture effects, together with these changing pictures; that is, in alternation to them, preferably using the changing pictures for the most of the time and the motion pictures for comparatively brief intervals of time, sufficient, however, to show some facial expression, gesture, act, or change of scene, that cannot be shown so well in any other way. This has been before explained and has been described particularly with relation to Figs. 2ᵃ to 2ᶜ, 3, 3ᴬ to 3ᴴ.

But my changing pictures, as I have pointed out above, are preferably used for the most of the time, and in some cases, for all of the time. Indeed, the best effect, so far as cheapness is concerned, will be obtained by using the changing pictures exclusively; but at times, the artistic effect or dramatic effect is heightened by the use of the motion pictures, even for a short time.

Motion picture films may be made in various sizes, and the same is true of my changing picture films. Motion picture films for the theatres are usually, in this country, made with three-quarters of an inch lengthwise of the film for each frame. But for projectors to be used in residences, this three-quarters of an inch (¾") per frame is usually reduced to three-tenths of an inch ($\frac{3}{10}$"). Films, however, have been made with the pictures or frames larger than three-quarters of an inch lengthwise of the film, and also others smaller than three-tenths of an inch ($\frac{3}{10}$") have been made. If my films be used for changing pictures exclusively, I prefer to make the frames reasonably large, say as large as the usual residence size above mentioned, or even larger, though they may, of course, be made smaller; but for my films having changing pictures for use most of the time and motion pictures for use for short intervals of time (see particularly Fig. 3ᴴ) I prefer to make the frames lengthwise of the film rather small than large—preferably less than the usual three-tenths of an inch ($\frac{3}{10}$") each for residence films, rather than more.

In divers places in this specification, and in the statement of claim at the end hereof, I refer to the fact that my changing-pictures ordinarily differ substantially one from another in that which they show, and that motion-pictures ordinarily differ but little each from its next neighbor in that which it shows. My Fig. 44ᶜ gives one illustration of the substantial difference between successive pictures or frames, with my changing-pictures, as distinguished from motion pictures. The small difference which usually exists between successive frames of a motion-picture series is well known in the art; it is to be seen on any motion-picture film. And it necessarily and obviously results from the fact that the same scene is photographed rapidly, for the successive frames, at short intervals of time, (as $\frac{1}{16}$ or $\frac{1}{24}$ of a second) between the several photographings.

Many variations may be made in the apparatus described and illustrated herein without departing from the essentials of my invention. Thus:—

First. Equivalent or alternative constructions, well known in the art, may be used in many cases, instead of the things that I have shown in the drawings; as, for example:—

(a) Alternating-current vacuum tubes or heater tubes may be provided, thereby, eliminating the A-battery.

(b) Battery eliminators, usually rectifying devices with filters, are now well known and widely used in the art, and by their use either the A-battery or the B-battery, or both of these, may be eliminated.

(c) Screen-grid tubes may be provided,—they are, indeed, now well known and widely used. These increase the amplifying power of the radio-frequency tubes greatly, and eliminate the neutralizing condensers $C^{25}$, $C^{25}$, shown in my drawings.

(d) In some of my drawings, I show transformer couplings between the stages of the vacuum tubes; in others, I show resistance couplings between the tubes. Both of these couplings are well known in the art, and widely used, and yet other couplings, for example, reactance couplings or choke-coil couplings are, also, well known. Any coupling that is suitable for the purpose may be used. As I have before explained, transformer couplings, when well made, produce good results, but unless they are well made, they may give very poor results. In general, transformer couplings between the radio-frequency tubes and resistance couplings between the audio-frequency tubes give good results and are often preferred.

(e) In my drawings, I show a rectifier of the high-vacuum electron-discharge type. But other rectifiers, operating in other ways, are well known and may be used, for example, the helium-filled rectifying tube, well known in the art and trade under the name of Raytheon.

(f) In my drawings, I show the so-called C-battery or negatizing battery of Lowenstein, for giving a negative bias to the grid of a vacuum tube. But other ways of giving a negative bias to the grid of a vacuum tube are now well known in the art; and any mode that is suitable for the purpose may be used, instead of the C-battery.

(g) Many other variations may be made by persons skilled in the art in the apparatus described herein, without departing from the essential features of my invention, or, at least, without departing from certain of the essential features of my invention, set forth in the statement of claims at the end hereof.

In divers places in this specification and in the statement of claims at the end hereof, I speak, in effect, of means for absorbing the heat-rays from the projector lamp on their way to the film. The means which I have described for this purpose act partly, probably chiefly, by absorption, but partly, perhaps, also, by reflecting the heat-rays to a greater extent than the light rays. The phrase "absorbing" is used to cover both these actions, by which the heat-rays are dissipated, or prevented from reaching the film, to a greater extent than the light rays, whether this dissipation or prevention be by absorption or by reflection, or by both of these.

While I prefer, ordinarily, to distribute electrically the words of an opera or other dramatic work or of a lecture, address or talk, together with picture-control for my pictures, as before described, yet for some purposes and to a certain extent, the pictures may be used without the words or music; said pictures being controlled from the central station, as before described herein. This will be obvious. Thus, in Figs. 2ᵃ, 2ᶜ, 3, et cetera, the apparatus for transmitting speech, such as the electrical pick-up 1, the vacuum-tube amplifier, the modulator and the broadcasting device, serving for speech and music, may be omitted, and the apparatus for distributing pictures retained and used; and similarly, on the subscribers' premises, the picture-controlling and picture-producing apparatus may be retained and used, while the means for receiving speech or music may be omitted, or kept but not used, at times.

When I speak, in this specification, and particularly in the statement of claims at the end hereof, of the pictures of a set or a series being substantially different pictures, or substantially different one from another, or substantially different each from its immediate predecessor, or substantially different from its neighbors, or use other expressions of similar import, I mean thereby to distinguish my changing pictures before described from motion pictures, the successive pictures or frames of which are, in general, as before explained, each very much like its next neighbor in the series which naturally results from the fact that they are, in general, taken at short time-intervals apart, as, for example, one-sixteenth or one-twenty-fourth of a second. One illustration of this substantial difference in the successive pictures, which distinguishes my changing pictures from motion pictures, is afforded by my Fig. 44C, in which four pictures are shown, numbered 1 to 4 consecutively. Thus, in picture No. 1, the interior of Hunding's dwelling is seen, but neither Siegmund nor Sieglinde. Picture No. 2 differs substantially from No. 1 in that Siegmund is seen standing in the door at the right; picture No. 3 is different from the preceding picture in that Siegmund is now seen lying on the floor, by the hearth, and Sieglinde is seen standing in the door at the left. No. 4, again, differs substantially from No. 3 in that Sieglinde is now seen walking towards Siegmund. Thus these pictures, though they have much in common, yet they differ substantially each from its next neighbor, unlike motion pictures, each of which, in general, as before pointed out, differs but little from its immediate predecessor. But with these changing pictures of mine, which differ substantially from each other, I may use also at times, in some of my sets of pictures, successive pictures which differ but little, each from its immediate predecessor, as in motion pictures, and as before explained in connection with the apparatus of Figs. 3 to 3D, for with this apparatus the pictures are fed through the projecting machine in periods of time not greater than the time of visual persistence, as in motion pictures, and as before explained, in connection with said Figs. 3 to 3D.

In this specification, and particularly in the statement of claims, at the end hereof, I use the word "broadcast" or "broadcasting" in the sense of sending abroad, sending out, distributing. This broadcasting may be done by electrical waves through space, as shown in the drawings accompanying this specification, or it may be done by electrical waves over suitable wires, as illustrated and described in my other pending application No. 534,150, filed May 1, 1931.

When I speak in this specification, and particularly, in the statement of claims at the end hereof, of transmitting or distributing or broadcasting speech, as well as in other passages in which I speak of speech or of words or spoken words, I refer by speech or spoken words to articulate sounds intended to convey thoughts, whether the words or speech be spoken merely, or be chanted, recited or sung. Song, in effect, is a sort of musical speech.

While I have shown and described divers modifications of my invention, I do not limit myself to the same, but may employ such other modifications as may come within the spirit and scope of my invention.

I do not claim in this specification, anything that is claimed in my other pending application No. 534,150, filed May 1, 1931.

I wish it to be understood that my invention is susceptible of many modifications and alternative constructions, and that I do not intend or desire to abandon any portion of my invention to the public; and that I desire to obtain just and adequate protection under the present application for my invention described herein; and I desire to obtain, also, in the present application such broad protection as should justly and lawfully be given in the first patent on a broadly new art and apparatus. With this end in view, what I claim and desire to secure by Letters Patent hereunder is:

1. The method of producing simultaneously on the premises of subscribers sounds and pictures relevant thereto, which consists in (a) producing pictures suitable to accompany the intended sounds; (b) duplicating these pictures in a suitable manner; (c) distributing the pictures so duplicated to the subscribers for use on their several premises respectively; (d) distributing from a central station electrical impulses by which words are carried that are to be heard on the premises of the subscribers; and (e) controlling electrically from the central station, the pictures aforesaid, changing them simultaneously on the premises of the subscribers from time to time and at varying intervals of time, as required, so that said pictures show on the screen, in general, each for a period of time much greater than the time of visual persistence and, in some cases, for many times the time of visual persistence, and so that also the several pictures of a set are displayed on the premises of the subscribers at correct times with relation to the sounds broadcast from the central station and to which such pictures severally relate.

2. The method of producing a dramatic work audibly and visually on the premises of a plurality of subscribers simultaneously, which consists in (a) distributing from a central station electrical waves, by which words are carried belonging to the dramatic work aforesaid; (b) producing on the subscribers' premises, by means of the electrical waves aforesaid, audible sounds, corresponding to the words of the dramatic work aforesaid; (c) furnishing the subscribers with a series of pictures suitable to produce the visual part of the dramatic work aforesaid; and (d) controlling electrically from the central station aforesaid the pictures aforesaid, changing them simultaneously on the subscribers' premises, as required, from time to time and at intervals of time that are, in general, much longer than the time of visual persistence, and so that also the pictures of a set are displayed on the premises of the subscribers at correct times with relation to the words distributed and to which such pictures severally relate.

3. The method of producing a dramatic work audibly and visually on the premises of a plurality of subscribers simultaneously, which consists in (a) distributing from a central station electrical waves by which words are carried belonging to the dramatic work aforesaid; (b) producing on the subscribers' premises by means of the electrical waves aforesaid audible sounds, corresponding to the words of the dramatic work aforesaid; (c) furnishing the subscribers with a series of pictures suitable to produce the visual part of the dramatic work aforesaid; and (d) controlling electrically from the central station, the pictures aforesaid, changing them simultaneously on the premises of the subscribers, as required, from time to time and at varying intervals of time, so that said pictures show on the screen, in general, each for a period of time much greater than the time of visual persistence, and in some cases for many times the time of visual persistence, and so that also the several pictures of a series are displayed on the premises of the subscribers at correct times with relation to the words broadcast from the central station and to which such pictures severally relate.

4. The method of producing a dramatic work audibly and visually on the premises of a plurality of subscribers simultaneously, which consists in (a) distributing electrically from a central station the words of the dramatic work aforesaid; (b) reproducing those words electrically on the subscriber's premises; (c) displaying on the subscriber's premises, a series of changing-pictures, in contradistinction to motion pictures, suitable to produce the visual part of the dramatic work aforesaid; said changing pictures each differing ordinarily substantially in that which it shows from its next neighbor in the series and serving to show ordinarily each for a period of time much greater than the period of visual persistence; and (d) controlling electrically from the central station, the pictures aforesaid, changing them simultaneously on the premises of the subscribers, as required, from time to time, so that said pictures ordinarily show each for a period of time much greater than the time of visual persistence, and so that, also, the several pictures of the series are displayed on the premises of the subscribers at correct times with relation to the words broadcast from the central station and to which such pictures severally relate.

5. In combination (a) a central station for distributing electrically speech, music and picture control; (b) a plurality of receiving stations, each arranged to receive speech, music and picture control electrically from the central station aforesaid; (c) picture-projecting machines at the receiving stations aforesaid respectively; each such projecting machine having a picture-changing apparatus, said projecting machines acting synchronously and serving each to exhibit pictures at the receiving station; (d) electrical devices at the receiving stations aforesaid, connected with the picture-changing apparatuses aforesaid respectively and adapted to be operated each by electrical impulses sent out from the central station aforesaid and serving, when so operated, to change the pictures in the projecting machines aforesaid respectively, one picture change for each operation of the electrical device before mentioned as connected with the picture projecting machines aforesaid respectively, whereby the pictures are changed synchronously in the projecting machines at the receiving stations aforesaid, one picture for each of the controlling impulses sent out from the central station aforesaid for that purpose.

6. In combination (a) a central station for distributing electrically speech, music and picture control; (b) a plurality of receiving stations, each arranged to receive speech, music and picture control electrically from the central station aforesaid; (c) similar picture-carriers at the several receiving stations aforesaid, the successive pictures on one of said picture-carriers being, in general, substantially different one from another in the sense before described; (d) picture-projecting machines at the receiving stations aforesaid respectively, each such projecting machine having a picture-changing apparatus; said projecting machines acting synchronously and serving to exhibit pictures at the receiving stations; and (e) electrical devices at the receiving stations aforesaid, connected with the picture-changing apparatuses aforesaid respectively and adapted to be operated each by electrical impulses sent out from the central station aforesaid and serving, when so operated, to change the pictures in the projecting machines aforesaid respectively, one picture change for each operation of the electrical device before mentioned as connected with the picture projecting machines aforesaid respectively, whereby the pictures are changed synchronously in the projecting machines at the receiving stations aforesaid, one picture for each of the controlling impulses sent out from the central station aforesaid for that purpose.

7. In combination (a) a central station for distributing electrically, speech, music and picture control; (b) a plurality of receiving stations, each arranged to receive speech, music and picture control electrically from the central station aforesaid; (c) picture projecting machines at the receiving stations aforesaid respectively; each such projecting machine, in general, having a picture-changing apparatus; said projecting machines acting synchronously and serving each to exhibit pictures at the receiving station; and (d) electrical devices at the receiving stations aforesaid, connected with the picture-changing apparatuses aforesaid respectively, and each adapted to be operated by electrical impulses sent out from the central station aforesaid for that purpose, and serving when so operated, to change the pictures in the corresponding projecting machines, one picture for each operation of the electrical devices aforesaid belonging to the projecting machines aforesaid respectively; the controlling impulses from the central station for changing the several pictures being sent out at irregular time-intervals, that are spaced, in general, further apart in time than the usual time of visual persistence; whereby some of the pictures of a set are shown on the screen for relatively short intervals of time, and others for relatively long intervals, equal to many times the time of visual persistence, as before described.

8. In combination (a) a central station; (b) a plurality of dependent stations, capable of receiving electrically from the central station aforesaid; (c) changing-picture projecting machines, located at the dependent stations aforesaid and acting to show their pictures ordinarily for periods of time that are greater than the period of visual persistence, in contradistinction to motion-picture machines; (d) electrical devices connected with the changing-picture projecting machines aforesaid respectively, adapted to be operated by electrical impulses from the central station aforesaid and serving, when so operated, to change the pictures in the corresponding projecting machines; and (e) means connected with the central station aforesaid acting to distribute picture-changing electrical impulses, at intervals of time that are ordinarily greater than the period of visual persistence, to operate the electrical devices aforesaid, thereby to change the pictures in the picture-projecting machines at the dependent stations aforesaid.

9. In combination, (a) a broadcasting station; (b) a plurality of radio-receiving stations, capable of receiving from the broadcasting station aforesaid; (c) picture-projecting machines at the radio-receiving stations aforesaid respectively, each such projecting machine having a picture-changing apparatus; (d) an electrical device connected with the picture-changing apparatus aforesaid, and adapted to be operated by radio waves and serving, when so operated, to change the pictures in the corresponding projecting machine; and (e) means at the broadcasting station aforesaid for broadcasting successive trains of radio waves to operate the picture-changing devices aforesaid; each train of radio waves, in general, serving to change one picture; the successive trains of radio waves serving to change the successive pictures.

10. In combination, (a) a broadcasting station; (b) a plurality of radio-receiving stations, capable of receiving from the broadcasting station aforesaid; (c) changing-picture projecting machines, located at the receiving stations aforesaid and acting to show their pictures ordinarily for periods of time greater than the period of visual persistence, in contradistinction to motion-picture machines; (d) electrical devices connected with the changing-picture projecting machines aforesaid respectively; said devices being adapted to be operated by radio waves and serving, when so operated, to change the pictures in the corresponding projecting machines; and (e) means connected with the broadcasting station aforesaid, for broadcasting picture-changing electrical impulses, ordinarily at intervals of time that are greater than the period of visual persistence, to operate the electrical devices aforesaid, thereby to change the pictures in the projecting machines aforesaid.

11. In a system for producing visual effects at a plurality of places simultaneously, the combination of (A) a central station; (B) dependent stations each having (a) a picture-projecting machine; (b) a picture-changing device, connected with said picture-projecting machine and serving to change the pictures therein, said picture-changing device being normally inactive but responsive to and operated by picture-changing electrical impulses that are distributed from the central station aforesaid for that purpose; (c) means connected with the central station aforesaid acting to distribute to the dependent stations aforesaid picture-changing electrical impulses to operate the picture-changing devices aforesaid at said dependent stations, in such a manner that each of the picture-changes at the dependent stations is effected from the central station aforesaid.

12. In a system for producing audible and visual effects at a plurality of places simultaneously, controlled from a central station, the combination of (A) a central station; (B) dependent stations, each having (a) means for receiving electrical vibrations corresponding to speech or music, distributed from the central station aforesaid and for translating such electrical vibrations into audible aerial vibrations; (b) a picture-projecting machine; (c) a picture-changing device, connected with said picture-projecting machine and serving to change the pictures therein, said picture-changing device being normally inactive but responsive to and operated by picture-changing electrical impulses that are distributed from the central station aforesaid for that purpose; and (C) means connected with the central station aforesaid serving to distribute speech or music electrically to the dependent stations aforesaid and also acting to distribute to said dependent stations picture-changing electrical impulses to operate the picture-changing devices aforesaid at said dependent stations in such a manner that each of the picture-changes at the dependent stations is effected from the central station aforesaid.

13. In a system in which speech and picture control are distributed electrically from a central station to the premises of a plurality of subscribers, the combination of (A) a receiving apparatus for the subscriber's premises which comprises (a) means for receiving the electrical vibrations corresponding to speech, distributed from the central station aforesaid, and for translating said electrical vibrations into audible aerial vibrations; (b) a picture-projecting apparatus on the subscriber's premises; (c) an electromagnet connected with said picture-projecting apparatus and operating to change the pictures therein; and (B) means at the central station acting to send out electrical impulses to operate the electro-magnet aforesaid, one such impulse for each change of pictures, whereby each change of pictures is controlled directly from the central station.

14. In a system for producing co-ordinated audible and visual effects, at a plurality of dependent stations, controlled from a central station, the combination of (A) a receiving apparatus for the dependent station, which comprises (a) means for receiving electrical vibrations corresponding to speech or music, distributed from the central station aforesaid and for translating such electrical vibrations into audible aerial vibrations; (b) a changing-picture projecting machine, acting to show its pictures for periods of time that are normally greater than the period of visual persistence, in contradistinction to a motion-picture projecting machine; and (c) an electrical device connected with said changing-picture projecting machine, and operating to change the pictures therein, as required; and (B) means at the central station, acting to send out electrical impulses to operate the electrical device aforesaid, so that each change of pictures at the dependent station, is controlled from the central station.

15. In a system for producing co-ordinated audible and visual effects at a plurality of dependent stations, controlled from a central station, the combination of (A) a receiving apparatus for the subscriber's premises which comprises (a) means for receiving electrical vibrations corresponding to speech or music, distributed from the central station aforesaid and for translating such electrical vibrations into audible aerial vibrations; (b) a picture-projecting apparatus on the subscriber's premises; and (c) an electrical device, connected with said picture-projecting apparatus, and operating to change the pictures therein; said electrical device being normally inactive but responsive to and operated by electrical impulses that are distributed from the central station for that purpose; and (B) means at the central station, acting to send out, at varying intervals of time that are ordinarily greater than the period of visual persistence, and which sometimes are many times the period of visual persistence, electrical impulses to operate the electrical device aforesaid, so that the pictures at the dependent station show, ordinarily, for periods of time longer than the time of visual persistence, and the changes of said pictures are effected by electrical impulses sent out from the central station aforesaid for that purpose.

16. In combination (a) a broadcasting station having means for broadcasting speech and music electrically; (b) a plurality of radio-receiving stations adapted to receive from the broadcasting station aforesaid and having means for producing speech and music audibly, by means of the waves received from the broadcasting station aforesaid; (c) projecting machines at the radio-receiving stations aforesaid respectively, each such projecting machine constructed and arranged to project pictures individually in variable timed succession; said projecting machines serving each to exhibit pictures at the corresponding receiving station; (d) an electrical device connected with the picture-projecting apparatus aforesaid and adapted to be operated by radio waves, and serving, when so operated, to project the picture in the corresponding projecting machine; and (e) means at the broadcasting station aforesaid for broadcasting successive trains of radio waves to operate said electrical devices aforesaid, each train of radio waves, in general, serving to project one picture.

17. In a system for broadcasting speech and picture-control from a central station to a plurality of dependent stations, in which system the picture-changes at the dependent stations are made in response to picture-changing electrical impulses, distributed from the central station for that purpose, the combination of (a) a broadcasting device, operating on one wave-length and serving to broadcast speech or music; (b) another broadcasting device, operating on another wave-length and serving to broadcast picture-changing electrical impulses, that serve to change the pictures at the dependent stations, at intervals of time that are ordinarily greater than the period of visual persistence, picture by picture, as required; and (c) wave-receiving means at each dependent station for correlating the impulses broadcast on said separate wave-lengths to conform the changes in pictures appropriately to the broadcast speech or music.

18. In a system for broadcasting speech and picture-control from a central station to a plurality of dependent stations, in which system the picture-changes at the dependent stations are made in response to picture-changing electrical impulses, distributed from the central station for that purpose, the combination of (a) means connected with the central station for producing a carrier-wave of a given wave-length; (b) means for modulating this carrier-wave by electrical vibrations of lower frequency corresponding to speech or music; (c) means for producing another series of electrical waves of a different wave-length from the foregoing; (d) means for controlling this second series of electrical waves so as to broadcast from time to time from the central station to the dependent stations aforesaid, electrical waves for changing the pictures at the dependent stations aforesaid, at intervals of time that are ordinarily greater than the period of visual persistence, so that the several picture-changes at the dependent stations are controlled from the central station by means of the second series of electrical waves aforesaid; and (e) means whereby the several picture-changes at the dependent stations are simultaneously effected appropriately to the speech or music transmitted over said carrier-wave.

19. In a system for broadcasting speech or music and picture-control from a central station to a plurality of dependent stations, in which system the picture-changes at the dependent stations are made in response to picture-changing electrical impulses, broadcast from the central station for that purpose, the combination of (A) a broadcasting station having one broadcasting apparatus, operating on one wave-length and serving to broadcast speech or music, and another broadcasting device, operating on another wave-length and serving to broadcast picture-changing electrical impulses; (B) a plurality of dependent stations each having (a) a receiving apparatus, tuned to receive speech or music on one of the wave-lengths aforesaid; (b) a picture-projecting machine, having a picture-changing device; (c) means for changing the pictures in said projecting machine, operated by trains of radio waves sent out for that purpose from the second of the two broadcasting devices above mentioned so that the changes of the pictures at the dependent stations are effected each change by radio waves, sent out from the central station for that purpose; and (C) control means whereby the electrical impulses of said second broadcasting device effect said picture changes simultaneously at the several dependent stations in appropriate conformity with the speech or music broadcast by said first broadcasting apparatus.

20. In a system in which speech or music and picture-control are distributed electrically in the radio way from a central station to the premises of a plurality of subscribers, a receiving apparatus for the subscriber's premises, comprising (a) means for receiving speech or music electrically from the central station aforesaid; (b) a changing-picture projecting apparatus, on the subscriber's premises, in contradistinction to a motion-picture projecting apparatus; said picture-projecting apparatus having an electrically operated picture-changing device, connected with the same; (c) a rectifier, operated by electrical waves, the electrical currents from said rectifier serving to operate the picture-changing device aforesaid; and (d) means at the central station aforesaid, operating to send out, at intervals of time that are ordinarily greater than the time of visual persistence, electrical waves to operate the rectifier aforesaid and to change the pictures on the subscriber's premises, so that said pictures show ordinarily for periods of time much greater than the time of visual persistence.

21. A system for producing visual effects at a plurality of places simultaneously, said system including, in combination (a) a central station; (b) a plurality of dependent stations; (c) picture-projecting machines at the dependent stations; (d) means connected with the central station aforesaid acting to send out trains of radio waves, to change the pictures at the dependent stations aforesaid; (e) a picture-changing device at the dependent station that is of itself inactive but which is responsive to and operated by radio waves distributed from the central station aforesaid, so that the pictures at the dependent stations are changed, from time to time, picture by picture, as required, in response to radio waves, distributed from the central station aforesaid for that purpose.

22. In a system in which visual effects are produced simultaneously at a plurality of dependent stations, controlled from a central station, a receiving apparatus for a dependent station, including in combination, (a) a picture film for a picture-projecting machine, said film having a series of pictures that are ordinarily substantially different each from its predecessor in the series in some particular, constituting changing-pictures in contradistinction to motion pictures, as before described; (b) a picture-projecting machine for exhibiting the pictures on a film of the type above mentioned, and serving to exhibit said pictures for periods of time that are ordinarily greater than the period of visual persistence; said picture-projecting machine being provided with electrically-operated film-feeding means, for changing the pictures in the projecting machine aforesaid at intervals of time that are ordinarily greater than the period of visual persistence, as required; and (c) a wave-receiving device and means connected therewith, operated by radio waves and serving to change the pictures in the projecting machine aforesaid, picture by picture, each picture as required.

23. In a system in which visual effects are produced simultaneously at a plurality of dependent stations, controlled from a central station, a receiving apparatus for a dependent station, including, in combination (a) a picture film for a picture-projecting machine, said film having a series of pictures that are ordinarily substantially different each from its predecessor in the series in some particular, constituting changing-pictures in contradistinction to motion pictures, as before described; (b) a picture-projecting machine for exhibiting the pictures on a film of the type above mentioned, and serving to exhibit said pictures for periods of time that are ordinarily greater than the period of visual persistence; said picture-projecting machine being provided with a picture-changing device that is normally inactive; (c) an electro-magnet for operating said picture-changing device; (d) a wave-receiving device, operated by radio waves, and (e) means connected with said wave-receiving device and serving to supply electrical currents to the electro-magnet aforesaid to operate the same; so that the pictures are changed in the projecting machine aforesaid by the action of radio waves, picture by picture, each picture as required.

24. In a system for producing visual effects simultaneously at a plurality of dependent stations, controlled from a central station, the combination of (a) a central station; (b) a plurality of dependent stations, each having a picture-projecting machine and a reciprocating picture-feeding device for the same; said picture-feeding device being normally inactive, but operated electrically from the central station aforesaid, and serving when thus operated, to feed a picture; and (c) means connected with the central station aforesaid, acting to send out electrical impulses to operate the reciprocating picture-feeding device aforesaid; so that the pictures are changed at the dependent stations, picture by picture, as required, in response to picture-changing electrical impulses, distributed from the central station aforesaid for that purpose.

25. In a system for producing visual effects simultaneously at a plurality of dependent stations, controlled from a central station, the combination of (a) a central station; (b) a plurality of dependent stations, each having a picture-projecting machine and a reciprocating picture-feeding device for the same; said picture-feeding device being normally inactive; and (c) an electro-magnet, serving to operate the reciprocating picture-feeding device aforesaid; said electro-magnet being responsive to and operated by an electrical control from the central station aforesaid, such that the changing of the pictures at the dependent stations is effected from the central station aforesaid, through the electro-magnet aforesaid, picture by picture, as required.

26. In a system for producing speech or music and picture control at a plurality of dependent stations, controlled from a central station, the combination of (A) a central station and means at said station for distributing speech or music electrically to the dependent stations; (B) a plurality of dependent stations each having (a) means for receiving speech or music electrically from the central station aforesaid; (b) a picture-projecting machine having a reciprocating picture-feeding device, said picture-feeding device being normally inactive but operated electrically from the central station aforesaid; and (C) means connected with the central station aforesaid, acting, to send out electrical impulses to operate the reciprocating picture-feeding device aforesaid; so that the pictures are changed at the dependent stations, picture by picture, as required, in response to picture-changing electrical impulses, distributed from the central station aforesaid for that purpose.

27. In a system for producing speech or music and picture control at a plurality of dependent stations, controlled from a central station, the combination of (A) a central station and means at said station for distributing speech or music electrically to the dependent stations; (B) a plurality of dependent stations each having (a) means for receiving speech or music electrically from the central station aforesaid; (b) a changing picture projecting machine, in contradistinction to a motion picture projecting machine; said changing-picture projecting machine being adapted to show its pictures for intervals of time that are ordinarily greater than the period of visual persistence, and having a reciprocating picture-feeding device; and (c) an electro-magnet for operating said picture-feeding device; and (C) means connected with said central station acting, at intervals of time that are ordinarily greater than the period of visual persistence, to send out electrical impulses to operate the electro-magnet and the picture-feeding device aforesaid; so that the pictures are changed at the dependent stations, picture by picture, each picture as required, in response to picture-changing electrical impulses, distributed from the central station aforesaid for that purpose.

28. In a system in which pictures, at a plurality of dependent stations, are changed electrically from a central station, as required, the combination of (A) a central station; (B) a receiving apparatus for a dependent station having (a) a picture-projecting machine; (b) a toothed wheel and a reciprocating member co-operating with said toothed wheel in the changing of the pictures in the projecting machine aforesaid; said reciprocating member being normally inactive; and (c) means operated electrically from the central station aforesaid, serving to operate the reciprocating member aforesaid, to change the pictures in the projecting machine aforesaid, each picture as required.

29. In a system in which pictures, at a plurality of dependent stations, are changed electrically from a central station as required, the combination of (A) a central station; (B) a receiving apparatus for a dependent station having (a) a changing-picture projecting machine, acting to show its pictures for periods of time that are ordinarily greater than the period of visual persistence, in contradistinction to a motion-picture machine; (b) a toothed wheel and a reciprocating member co-operating with said toothed wheel in the changing of the pictures in the projecting machine aforesaid; said reciprocating member being normally inactive; and (c) means operated electrically from the central station aforesaid, serving to operate the reciprocating member aforesaid, to change the pictures in the projecting machine aforesaid, at intervals of time that are ordinarily greater than the period of visual persistence.

30. In combination, (a) a picture-exhibiting machine, provided with means for changing the pictures therein so as to substitute a following picture for one preceding; (b) a wave-receiving device, itself operated by radio waves and serving, in turn, to effect operation of the picture-changing means aforesaid thereby to cause picture substitutions; and means operatively associating said wave-receiving device and said picture-changing means including (c) a photo-electric cell rendered operative by the wave-receiving device aforesaid; (d) an amplfier for the currents given off by the photo-electric cell aforesaid; and (e) an electromagnet operated by electrical current from said amplifier; said electro-magnet serving, in turn, to operate the picture-changing device aforesaid as determined by said wave-receiving device.

31. In a system for producing visual effects at a plurality of dependent stations simultaneously, by means of pictures, located at the dependent stations respectively, in which system the changes of the pictures at the dependent stations are effected by a control, exerted electrically from the central station, and for the very purpose of effecting such picture changes, picture by picture, each picture as required, the combination of (A) a central station; (B) a plurality of dependent stations, each having (a) a picture-exhibiting machine, provided with means for changing the pictures therein, and normally acting to change its pictures at intervals of time that are greater than the period of visual persistence; and (b) a radio-receiving apparatus, connected with said dependent station and having (I) an electrical wave-receiving device; (II) a photo-electric cell apparatus, actuated by said wave-receiving device; (c) an amplifier controlled by the photo-electric cell apparatus aforesaid; and (d) an electro-magnet, operated by current from said amplifier, said magnet serving in turn to operate the picture-changing means aforesaid, so that the pictures are changed, in the picture-exhibiting machine aforesaid, picture by picture, each picture as required, in accordance with radio waves, sent out from the central station aforesaid for that purpose, and received by the wave-receiving device aforesaid.

32. In a system for producing visual effects at a plurality of dependent stations simultaneously, by means of pictures, located at the dependent stations respectively, in which system the changes of the pictures at the dependent stations are effected by a control, exerted electrically from the central station, and for the very purpose of effecting such picture changes, picture by picture, each picture as required, the combination of (A) a central station; (B) a plurality of dependent stations, each having (a) a picture-exhibiting machine, provided with means for changing the pictures therein, and normally acting to change its pictures at intervals of time that are greater than the period of visual persistence; (b) a radio-receiving apparatus, connected with said dependent station and having (I) an electrical wave-receiving device; (II) an amplifier fed by said wave-receiving device; (III) an electric lamp, affected by currents from said amplifier; (IV) a photo-electric cell, actuated by said lamp; (V) another amplifier, whose input circuit is fed by the output from the photo-electric cell aforesaid; and (VI) an electro-magnet operated by electric current from the output circuit of the last-mentioned amplifier, said magnet serving in turn to operate the picture-changing means aforesaid, so that the pictures are changed, in the picture-exhibiting machine aforesaid, picture by picture, each picture as required, in accordance with radio waves sent out from the central station aforesaid for the very purpose of effecting such picture changes, and taken up by the wave-receiving device aforesaid.

33. In combination (A) a broadcasting station having (a) a broadcasting device, operating on one wave length and serving to distribute electrical waves of radio frequency that are modulated by electrical vibrations of audio frequency corresponding to speech and music; (b) another broadcasting device, operating on a different wave-length from the preceding, and serving to broadcast electrical waves that serve for picture-control; and (B) a plurality of radio-receiving apparatuses, located on the premises of different subscribers respectively, said receiving apparatuses, in general, each including (a) means for receiving the radio waves that are broadcast from the broadcasting device first-above-mentioned, and which are modulated by electrical vibrations corresponding to speech or music; (b) a detector for separating the electrical vibrations corresponding to speech and music from the carrier waves aforesaid by which they are broadcast; (c) means for producing audible aerial vibrations from the electrical vibrations thus detected; (d) a picture-projecting apparatus on the subscriber's premises, acting to exhibit its pictures for intervals of time that are ordinarily greater than the period of visual persistence; (e) means for changing the pictures in said picture-projecting apparatus; and (f) means for receiving the picture-controlling waves aforesaid, and for amplifying them and for applying them to operate the picture-changing apparatus aforesaid; so that the pictures in the subscriber's projecting machine are changed, picture by picture, each picture as required, by an electrical control, exerted from the central station aforesaid for the very purpose of effecting such picture-changes.

34. In combination (A) a central station for distributing speech or music and picture-control electrically to a plurality of dependent stations, said central station having (a) means for producing electrical vibrations of a certain radio-frequency; (b) means for producing electrical vibrations of audio-frequency, corresponding to speech or music, or to both of these; (c) means for modulating the radio-frequency vibrations aforesaid by means of the audio-frequency vibrations aforesaid, corresponding to speech or music; (d) means for broadcasting the radio-frequency vibrations thus modulated; and (e) means for producing and broadcasting, for the purpose of picture-feeding, successive trains of radio-frequency vibrations of a substantially different character from the radio-frequency vibrations first-above-mentioned; and (B) a plurality of dependent stations, each having (a) means for receiving electrically speech and music distributed from the central station aforesaid; (b) a picture-projecting apparatus having picture-changing means connected therewith; and (c) means operated by the picture-feeding radio-frequency vibrations aforesaid and serving to change the pictures in the picture-projecting apparatuses at the dependent stations aforesaid; the successive trains of picture-feeding radio-frequency vibrations aforesaid serving, in general, to feed successive pictures through the picture-projecting machines aforesaid, so that the changing of the pictures at the dependent stations is effected, picture by picture, each picture as required, by a control which is exerted electrically from the central station aforesaid, for the very purpose of changing the pictures.

35. In combination, (A) a central station for distributing speech, music and picture-control electrically to a plurality of dependent stations, said central station having (a) means for producing electrical vibrations of a certain radio-frequency; (b) means for producing electrical vibrations of audio-frequency, corresponding to speech or music, or to both of these; (c) means for modulating the radio-frequency vibrations aforesaid by means of the audio-frequency vibrations aforesaid, corresponding to speech or music; (d) means for broadcasting the radio-frequency vibrations thus modulated; and (e) means for producing and broadcasting, for the purpose of picture-feeding, radio-frequency vibrations of a substantially different frequency from the radio-frequency vibrations first-above-mentioned; and (B) a plurality of dependent stations, serving each to receive speech, music and picture-control by radio waves from the central station aforesaid; said dependent stations each, having (a) means for receiving electrical vibrations of the radio-frequency first-above-mentioned; (b) a detector for separating vibrations of audio-frequency from the carrier vibrations of radio-frequency aforesaid, and for translating said vibrations of audio-frequency into audible sound; (c) a picture-projecting apparatus at the dependent station, provided with means for changing the pictures, as required; (d) an electro-magnet for operating the picture-changing means aforesaid step-by-step, one step for each actuation of said electro-magnet; (e) means for receiving and amplifying the picture-feeding radio-frequency vibrations broadcast from the central station as aforesaid; and (f) a suitable detector, fed by the amplified picture-feeding vibrations aforesaid, and serving, in turn, to feed the electro-magnet aforesaid, so that the pictures at the dependent stations are changed by a control which is exerted electrically from the central station for the very purpose of changing the pictures, picture by picture, each picture as required.

36. In a system for producing visual effects on the premises of a plurality of subscribers simultaneously (A) a central station and means connected with said station for distributing picture-changing impulses electrically to the premises of the subscribers, in combination with (B) receiving devices on the premises of the subscribers, said receiving devices each ordinarily having (a) a picture-projecting apparatus having picture-changing means connected with it; (b) a picture film for said picture-projecting apparatus, said film having a series of changing pictures in contradistinction to motion pictures, said changing pictures being adapted to be displayed for lengths of time that are ordinarily much longer than the period of visual persistence; the successive pictures of the series ordinarily differing substantially each from its predecessor in the series in that which it shows; and (c) an electrical device that is normally inactive but which is responsive to and operated by the picture-changing electrical impulses aforesaid, and serving, when thus operated, to change the picture in the subscriber's picture-projecting apparatus; so that the changing of the pictures on the subscriber's premises is effected by a control exerted electrically from the central station aforesaid for the very purpose of changing the picture.

37. In a system for controlling from a central station the changing of pictures on the premises of subscribers, the combination of (a) a central station; (b) picture films for use simultaneously by different subscribers respectively, each such film having a series of changing-pictures as distinguished from motion pictures, said changing-pictures, in general, differing substantially each from its predecessor in that which it shows, and being adapted to show ordinarily for periods of time that are greater than the period of visual persistence; (c) projecting machines on the subscriber's premises, having means for advancing the picture films aforesaid, when required; and (d) means operated electrically from the central station aforesaid, acting on the several projecting machines aforesaid to simultaneously advance the pictures in them at varying and unequal intervals of time, as required, whereby some pictures are exhibited for a short period of time, and others for a very much longer period, as respectively required.

38. Means for producing co-ordinated audible and visual effects at a plurality of places simultaneously, including (A) a central station with means for distributing electrically speech or music and picture-control; (B) a plurality of dependent stations connected electrically with the central station aforesaid, and each having (a) means adapted to receive electrical waves or vibrations corresponding to words or music, distributed from the central station aforesaid and to produce therefrom audible aerial vibrations; (b) a picture film having a series of changing-pictures, as distinguished from motion pictures, said changing-pictures differing ordinarily substantially each from its predecessor in the series; (c) a picture-projecting machine adapted to display these pictures for lengths of time which ordinarily are much longer than the time of visual persistence; said picture-projecting machine including (I) a projection lamp; (II) suitable lenses (III) a film feeding device; and (IV) means for protecting the film aforesaid, where it stands in the gate, from the heat of the projection lamp while admitting light to said film; and (d) means operated electrically from the central station aforesaid and serving, in turn, to operate the film-feeding device aforesaid; so that the feeding of the pictures through the projection machines at the dependent stations is effected, picture by picture, each picture as required, by a control which is exerted electrically from the central station aforesaid for the purpose of feeding the pictures.

39. Means for producing co-ordinated audible and visual effects at a plurality of places simultaneously, including (A) a central station with means for distributing electrically speech or music and picture-control; (B) a plurality of dependent stations connected electrically with the central station aforesaid, and each having (a) means adapted to receive electrical waves or vibrations corresponding to words or music, distributed from the central station aforesaid and to produce therefrom audible aerial vibrations; (b) a picture film having a series of changing-pictures, as distinguished from motion pictures, said changing-pictures differing ordinarily substantially each from its predecessor in the series; (c) a picture-projecting machine adapted to display these pictures for lengths of time which ordinarily are much longer than the time of visual persistence; said picture-projecting machine including (I) a projection lamp; (II) suitable lenses (III) a film-feeding device; and (IV) means interposed between the projection lamp and the film aforesaid, acting to intercept the heat rays from the projection lamp on their way to the film to a much greater extent than the light rays; and (d) means operated electrically from the central station aforesaid and serving, in turn, to operate the film-feeding device aforesaid; so that the feeding of the pictures through the projecting machines at the dependent stations is effected, picture by picture, each picture as required, by a control which is exerted electrically from the central station aforesaid for the purpose of feeding the pictures.

40. Means for producing pictures at a plurality of places simultaneously, including (A) a central station for distributing picture-changing electrical impulses; (B) a plurality of dependent stations connected electrically with the central station aforesaid, and each having (a) a picture film having a series of changing-pictures, as distinguished from motion pictures, said changing-pictures different ordinarily substantially each from its predecessor in the series in that which it shows; (b) a picture-projecting machine, adapted to display these pictures for lengths of time which ordinarily are much longer than the period of visual persistence; said picture-projecting machine including (I) a projection lamp; (II) suitable lenses; (III) a film-feeding device; and (IV) means for protecting the film aforesaid, where it stands in the gate, from the heat of the projection lamp while admitting light to said film; and (c) means operated electrically from the central station aforesaid and serving, in turn, to operate the film-feeding device aforesaid; so that the feeding of the pictures through the projection machines at the dependent stations is effected, picture by picture, each picture as required, by a control which is exerted electrically from the central station aforesaid for the purpose of feeding the pictures.

41. Means for producing pictures at a plurality of places simultaneously, including (A) a central station for distributing picture-changing electrical impulses; (B) a plurality of dependent stations, connected electrically with the central station aforesaid, and each having (a) a picture film having a series of changing-pictures, as distinguished from motion pictures, said changing-pictures differing ordinarily substantially each from its predecessor in the series in that which it shows; (b) a picture-projecting machine, adapted to display these pictures for lengths of time which ordinarily are much longer than the period of visual persistence; said picture-projecting machine including (I) a projection lamp; (II) suitable lenses; (III) a film-feeding device; and (IV) means interposed between the projection lamp and the film aforesaid, acting to intercept the heat rays from the projection lamp on their way to the film to a much greater extent than the light rays; and (c) means operated electrically from the central station aforesaid and serving, in turn, to operate the film-feeding device aforesaid; so that the feeding of the pictures through the projection machines at the dependent stations is effected, picture by picture, each picture as required, by a control which is exerted electrically from the central station aforesaid for the purpose of feeding the pictures.

42. Means for producing pictures at a plurality of places simultaneously, including (A) a central station for distributing picture-changing electrical impulses; (B) a plurality of dependent stations, connected electrically with the central station aforesaid, and each having (a) a picture film having a series of changing-pictures, as distinguished from motion pictures, said changing-pictures differing ordinarily substantially each from its predecessor in the series in that which it shows; (b) a picture-projecting machine, adapted to display these pictures for lengths of time which ordinarily are much longer than the period of visual persistence; said picture-projecting machine including (I) a projection lamp; (II) suitable lenses; (III) a film-feeding device; and (IV) means for blowing air on to the film aforesaid where it stands in the gate, to cool said film; and (c) means operated electrically from the central station aforesaid and serving, in turn, to operate the film-feeding device aforesaid; so that the feeding of the pictures through the projection machines at the dependent stations is effected, picture by picture, each picture as required, by a control which is exerted electrically from the central station aforesaid for the purpose of feeding the pictures.

43. Means for producing pictures at a plurality of places simultaneously, including (A) a central station for distributing picture-changing electrical impulses; (B) a plurality of dependent stations, connected electrically with the central station aforesaid, and each having (a) a picture film having a series of changing-pictures, as distinguished from motion pictures, said changing-pictures differing ordinarily substantially each from its predecessor in the series in that which it shows; (b) a picture-projecting machine, adapted to display these pictures for lengths of time which ordinarily are much longer than the period of visual persistence; said picture-projecting machine including (I) a projection lamp; (II) suitable lenses; (III) a film-feeding device; and (IV) means interposed between the projection lamp and the film aforesaid, acting to intercept the heat rays from the projection lamp on their way to the film to a much greater extent than the light rays, and also means for blowing air on to the film aforesaid, where it stands in the gate, to cool said film; and (c) means operated electrically from the central station aforesaid and serving, in turn, to operate the film-feeding device aforesaid, so that the feeding of the pictures through the projection machines at the dependent stations is effected, picture by picture, each picture as required, by a control which is exerted electrically from the central station aforesaid for the purpose of feeding the pictures.

44. In a system for producing audible and visual effects on the premises of a plurality of subscribers simultaneously (A) a central station for distributing speech and picture-controlling impulses electrically to the premises of subscribers, in combination with (B) receiving devices on the premises of the subscribers, said receiving devices each having (a) means for receiving electrical waves corresponding to speech from the central station aforesaid; (b) means for producing audible aerial vibrations from said electrical waves thus received; (c) a picture-projecting apparatus having picture-changing means connected with it; (d) a picture film for said picture-projecting apparatus, said film having a series of changing pictures in contradistinction to motion pictures, as before explained, said changing pictures being adapted to be displayed for lengths of time that are, in general, much longer than the time of visual persistence; the successive pictures of the series differing, in general, substantially each from its predecessor in the series in that which it shows; and (e) means operated electrically from the central station aforesaid, and serving to change the pictures in the projecting apparatus aforesaid, picture by picture, each picture as required.

45. In a system for producing audible and visual effects on the premises of a plurality of subscribers simultaneously (A) a central station for distributing speech and picture-controlling impulses electrically to the premises of subscribers, in combination with (B) receiving devices on the premises of the subscribers, said receiving devices each, in general, having (a) means for receiving electrical waves corresponding to speech from the central station aforesaid; (b) means for producing audible aerial vibrations from said electrical waves thus received; (c) a picture-projecting apparatus having picture-changing means connected with it; (d) a picture film for said picture-projecting apparatus, said film having a series of changing pictures in contradistinction to motion pictures, as before explained, said changing pictures being adapted to be displayed for varying and unequal lengths of time that are, in general longer than the time of visual persistence and in some cases, many times as long as the time of visual persistence; the successive pictures of the series differing in general, substantially each from its predecessor in the series in that which it shows; and (e) means operated electrically from the central station aforesaid at varying intervals of time, acting, at varying intervals of time that are ordinarily longer than the period of visual persistence, to change the pictures in the projecting apparatus aforesaid, picture by picture, each picture as required.

46. In a system for distributing speech and picture-control electrically from a central station to a plurality of dependent stations, the combination of (A) a central station; (B) a plurality of dependent stations each having (a) a picture-projecting machine with means for changing the pictures therein, operated electrically from the central station aforesaid; (b) a shutter for cutting off the light from the picture while the same is being changed; said shutter being normally at rest; and (c) an electrical device for operating said shutter; said electrical device being responsive to and operated by electrical impulses distributed from the central station aforesaid.

47. In a system of distributing speech and picture-control electrically from a central station to the premises of subscribers as before described, a receiving apparatus for the subscriber, including (a) a picture-projecting machine; (b) a picture-carrier and means for actuating it, by which successive pictures are brought into showing position, each as required; (c) a projection-lamp for illuminating the picture and throwing it on to the screen; (d) suitable lenses; (e) a reciprocating shutter for cutting off light from the screen while the picture is being changed; and (f) means operated electrically from the central station aforesaid and serving to cause the shutter aforesaid to reciprocate, as required.

48. In a system of distributing speech and picture-control from a central station to the premises of subscribers as before described, a receiving apparatus for the subscriber, including (a) a picture-projecting machine; (b) a picture-carrier and means for actuating it, by which successive pictures are brought into showing position each as required; (c) a projection lamp for illuminating the picture and throwing it on to the screen; (d) suitable lenses; (e) a reciprocating shutter for cutting off the light from the screen while the picture is being moved, said shutter being located in part, inside the projection lens, so as to act, with a small movement, on the beam of light where the same is narrow; and (f) means operated from the central station aforesaid and serving to cause the shutter aforesaid to reciprocate, as required.

49. In combination (a) a central station for distributing picture-control electrically; (b) a plurality of receiving stations, each adapted to receive picture-control electrically from the central station aforesaid; (c) picture-projecting machines at the receiving stations aforesaid respectively; each such projecting machine having a picture-changing device connected with it; (d) electrical devices at the receiving stations aforesaid, connected with the picture-changing devices aforesaid respectively and serving to operate the same; said electrical devices being each normally inactive but responsive to and operated by electrical impulses sent out from the central station aforesaid for that purpose and serving, when so operated, each to change the picture in the corresponding projecting machine; and (e) means connected with the central station aforesaid, serving to send out electrical impulses for operating the electrical picture-changing devices aforesaid, at the receiving stations aforesaid, with sufficient rapidity, so that the picture changes effected thereby produce on the eye of the beholder the effect of motion pictures.

50. In combination (a) a central station for distributing picture-control electrically; (b) a plurality of receiving stations, each adapted to receive picture-control electrically from the central station aforesaid; (c) picture-projecting machines at the receiving stations aforesaid respectively; each such projecting machine having a picture-changing device connected with it; (d) electrical devices at the receiving stations aforesaid, connected with the picture-changing devices aforesaid respectively and serving to operate the same; said electrical devices being each normally inactive but responsive to and operated by electrical impulses sent out from the central station aforesaid for that purpose and serving, when so operated, each to change the picture in the corresponding projecting machine; and (e) means connected with the central station aforesaid, and serving to send out electrical impulses, at times, relatively slowly, so that the pictures are changed at the receiving stations, only at intervals of time greater than the time of visual persistence; and at other times sending out electrical impulses much more rapidly, so that the pictures are changed, at the receiving stations, in times not longer than the time of visual persistence; whereby at times, motion pictures are produced, and at other times, my changing pictures, in contradistinction to motion pictures are produced, at the receiving stations, as before explained.

51. In a system for producing picture changes simultaneously at a plurality of dependent stations, controlled from a central station, the combination of (A) a central station; (B) dependent stations and receiving devices therefor, each such receiving device having (a) a picture projecting machine, said machine having a picture-changing device connected with it; (b) an electro-magnet for operating said picture-changing device, said electro-magnet being itself operated from the central station aforesaid and serving to change the pictures in the corresponding projecting machine at the dependent station, the central station aforesaid having (a) means operating at intervals of time greater than the time of visual persistence, to send out electrical impulses from the central station aforesaid, to change the pictures in the projecting machines, at the dependent stations; and (b) means also connected with the central station aforesaid, and acting, at times, to send out electrical impulses much more rapidly than the preceding, so as to change the pictures at the dependent stations, at intervals of time not longer than the time of visual persistence, thereby to produce motion picture effects.

52. In a system for producing picture changes simultaneously at a plurality of dependent stations, controlled from a central station, the combination of (A) a central station; (B) dependent stations and receiving devices therefor, each such receiving device having (a) a changing-picture projecting machine, in contradistinction to a motion picture projecting machine, said changing-picture projecting machine being adapted to show its pictures for intervals of time that are ordinarily greater than the period of visual persistence; (b) an electrical device operated from the central station aforesaid and serving to change the pictures in the corresponding projecting machine at the dependent station; the central station aforesaid having (a) a broadcasting device for broadcasting picture-controlling electrical impulses; (b) a picture-controlling key connected with the central station aforesaid; (c) a power device operated by said key; and (d) a circuit-controlling device operated by said power device and acting to control the emission of picture-changing electrical waves from the broadcasting device aforesaid.

53. In a system for producing co-ordinated audible and visual effects at a plurality of dependent stations simultaneously, controlled from a central station, the combination of (A) a central station for distributing electrically speech or music and also picture-control; (B) a plurality of dependent stations, each having (a) means for receiving electrical vibrations distributed from the central station aforesaid; (b) means for producing from such electrical vibrations, audible aerial vibrations; (c) a picture-projecting machine, having a picture-changing device connected with it; (d) an electrical device connected with the picture-changing device aforesaid, and serving to operate the same; said electrical device being normally inactive but responsive to and operated by electrical impulses sent out from the central station aforesaid for that purpose and serving, when so operated, to change the pictures in the corresponding projecting machine; and (e) means connected with the central station aforesaid, serving to send out electrical impulses for operating the electrical picture-changing devices aforesaid, at the receiving stations aforesaid, with sufficient rapidity, so that the picture changes effected thereby produce on the eye of the beholder the effect of motion pictures.

54. In a system for producing picture changes simultaneously at a plurality of dependent stations, but controlled from a central station, the combination of (A) a central station; (B) a dependent station, having (a) a picture-projecting machine; (b) a film for such projecting machine, said film having (I) changing pictures in contradistinction to motion pictures thereon, said changing pictures, in general, differing substantially each in that which it shows from its next neighbor in the same group; said changing pictures being adapted to be displayed each ordinarily for a period of time much greater than the period of visual persistence; said film having also (II) one or more groups of motion pictures, each of which pictures differs but little from its next neighbor in the group; said motion pictures being adapted to be displayed each for a period of time not greater than the time of visual persistence; (c) a picture-changing device connected with the projecting machine at the dependent station; and (C) means connected with the central station aforesaid and serving to send out electrical impulses to operate the picture-changing device aforesaid, feeding the changing-pictures through the respective projecting machines at intervals of time that are ordinarily greater than the period of visual persistence, but feeding the motion pictures aforesaid at intervals of time that are not greater than the period of visual persistence.

55. In a system for producing electrically, speech or music and picture changes at a plurality of dependent stations simultaneously, but controlled from a central station, the combination of (A) a central station and means connected with the same for distributing speech or music electrically to the dependent stations aforesaid; (B) a receiving device for a dependent station, such receiving device having (a) means for receiving electrical vibrations corresponding to speech or music from the central station aforesaid and means for producing from said electrical vibrations so received, audible aerial vibrations; (b) a picture-projecting machine; (c) a film for such projecting machine, said film having (I) changing pictures in contradistinction to motion pictures thereon, said changing pictures ordinarily differing substantially each in that which it shows from its next neighbor in the same group; said changing pictures being adapted to be displayed each ordinarily for a period of time much greater than the period of visual persistence; said film having also (II) one or more groups of motion pictures, each of which pictures differs ordinarily but little from its next neighbor in the group; said motion pictures being adapted to be displayed each for a period of time not greater than the period of visual persistence; (d) a picture-changing device connected with the projecting machine at the dependent station; and (C) means connected with the central station aforesaid, serving at times, to send out electrical impulses to the dependent stations aforesaid, at intervals of time much greater than the time of visual persistence, to operate the picture-changing devices at such dependent stations, so as to feed the changing-pictures on the films aforesaid, showing them for intervals of time that are much longer than the period of visual persistence, and at other times serving to send out electrical impulses much more rapidly, so as to feed the motion pictures of the groups mentioned in (II) above, on the films aforesaid, at intervals of time not greater than the period of visual persistence; whereby my changing-pictures are produced, at times, and at other times, motion-pictures are produced, as required, and under control from the central station.

56. In a system for producing synchronized audible and visual effects at a plurality of dependent stations simultaneously, the combination of (A) two broadcasting stations, operating on different wave-lengths respectively and each having means for distributing speech or music in the radio way, by itself and on its own wave-length; (B) means enabling said stations to co-act at times in the production of synchronized audible and visual effects at the dependent stations aforesaid; one of said broadcasting stations serving, when the two are co-acting, to distribute speech or music in the radio way, on its wave-length, and the other broadcasting station aforesaid serving to distribute at the same time, and from time to time, on its wave-length, electrical impulses for changing the pictures at the dependent stations aforesaid, in suitable synchronism with the audible effects from the other broadcasting station aforesaid; and (C) receiving devices at the dependent stations aforesaid, said receiving devices each having (a) means for receiving electrical waves at the same time, on the two wave-lengths aforesaid; (b) means, operated by the waves of one of the wave-lengths aforesaid, and serving to produce audible aerial vibrations corresponding to speech or music; (c) a picture projecting machine, having a picture-changing device connected with it; said picture-changing device being normally inactive; (d) an electromagnet for operating said picture-changing device; (e) an amplifier for amplifying the waves of the other wave-length aforesaid; and (f) means operated by said amplifier, and serving to operate the picture-changing electro-magnet aforesaid, so that the pictures are changed at the dependent stations in response to electrical waves distributed from one of the two broadcasting stations aforesaid for that purpose.

57. In a system for producing synchronized audible and visual effects at a plurality of dependent stations simultaneously, the combination of two broadcasting stations, operating on different wave-lengths respectively and each having means for distributing speech or music in the radio way, by itself and on its own wave-length; said stations being arranged also in such a manner that they co-act, at times, in the production of synchronized audible and visual effects at the dependent stations aforesaid; one of said broadcasting stations serving, when the two are co-acting, to distribute speech or music in the radio way, on its wave-length, and the other broadcasting station aforesaid serving to distribute at the same time, and from time to time, on its wave-length, electrical impulses for controlling the displaying of the pictures at the dependent stations, in suitable synchronism with the audible effects from the other broadcasting station aforesaid, and associated means whereby an operator controlling the picture-displaying impulses is enabled to hear the audible effects as distributed from the speech or music broadcasting station and to view the visual effects as controlled by the impulses from said other broadcasting station and as visible at the several dependent stations.

58. In a system for producing synchronized audible and visual effects at a plurality of dependent stations simultaneously, the combination of (A) two broadcasting stations, operating on different wave-lengths respectively and each having means for distributing speech or music in the radio way, by itself and on its own wave-length; (B) means enabling said stations to co-act at times in the production of synchronized audible and visual effects at the dependent stations aforesaid; one of said broadcasting stations serving, when the two are co-acting, to distribute speech or music in the radio way, on its wave-length, and the other broadcasting station aforesaid serving to distribute on its wave length and at intervals of time that are ordinarily greater than the period of visual persistence, electrical impulses for changing the pictures at the dependent stations aforesaid, in suitable synchronism with the audible effects from the other broadcasting station aforesaid; and (C) receiving devices at the dependent stations aforesaid, said receiving devices each having (a) means for receiving electrical waves at the same time, on the two wave-lengths aforesaid; (b) means, operated by the waves of one of the wavelengths aforesaid, and serving to produce audible aerial vibrations corresponding to speech or music; (c) a changing-picture projecting machine, in contradistinction to a motion-picture projecting machine; said changing-picture projecting machine being adapted to show its pictures for intervals of time that are ordinarily much greater than the period of visual persistence; the picture-projecting machine aforesaid having a picture-changing device that is normally inactive; and (d) means, operated by the waves of the other wave-length aforesaid, and serving, in turn, to operate said picture-changing device; so that the pictures are changed at the dependent stations in response to electrical waves distributed from one of the two broadcasting stations aforesaid for that purpose.

59. In a system for producing co-ordinated audible and visual effects at a plurality of dependent stations, controlled from a central station, the combination of (A) a central station and means connected with said station for distributing speech or music electrically to the dependent stations; (B) a receiving apparatus for a dependent station, which includes (a) means for receiving speech and music electrically from the central station aforesaid; (b) a picture film for my changing picture system, in contradistinction to motion pictures, said film having a series of pictures thereon that are approximately in natural colors, said pictures being, for the most part, substantially different one from another in that which they show and being adapted to show on the screen ordinarily each for a period of time that is much greater than the period of visual persistence, so that a relatively small number of pictures, as compared with motion pictures, is made to illustrate a subject and to show it in natural colors; (c) a changing picture projecting machine, in contradistinction to a motion picture projecting machine, for feeding the film aforesaid, and acting to change the pictures at intervals of time that are ordinarily greater than the period of visual persistence; (d) an electrical device, connected with the changing picture projecting machine aforesaid and adapted to be operated by electrical impulses from the central station aforesaid, and serving, when so operated, to feed the film aforesaid, so as to change the picture; and (C) means connected with the central station aforesaid, acting to distribute picture-changing electrical impulses at intervals of time that are ordinarily greater than the period of visual persistence, to operate the electrical device aforesaid, thereby to change the picture in the projecting machine at the dependent station aforesaid.

60. In a system for producing co-ordinated audible and visual effects at a plurality of dependent stations, controlled from a central station, the combination of (A) a central station and means connected with said station for distributing speech or music electrically to the dependent stations; (B) a receiving apparatus for a dependent station, which includes (a) means for receiving speech and music electrically from the central station aforesaid; (b) a picture film for my changing picture system, in contradistinction to motion pictures, said film being provided with perforations for feeding it through a projecting machine and having a series of pictures thereon that are approximately in natural colors, said pictures being, ordinarily substantially different one from another in that which they show and being adapted to show on the screen ordinarily each for a period of time that is much greater than the period of visual persistence, whereby a relatively small number of pictures, as compared with motion pictures, is made to illustrate a subject and to show it in natural colors; (c) a picture-projecting machine for exhibiting the pictures on a film of the type above mentioned, for intervals of time that ordinarily are greater than the period of visual persistence, said projecting machine having a picture-changing device; (d) an electro-magnet for operating the picture-changing device aforesaid; said electro-magnet being normally inactive, but responsive to and operated by an electrical control which is exerted from the central station aforesaid; and (C) means connected with the central station aforesaid acting to exert this control at intervals of time that are ordinarily greater than the period of visual persistence, so that the changes of the pictures at the dependent station are effected from the central station, each change, as required.

61. In a system in which speech or music and picture control are distributed electrically from a central station to a plurality of dependent stations, the combination of (A) a central station, and means connected with said station serving to distribute electrically speech or music and picture-control; (B) a dependent station, controlled electrically from the central station aforesaid and having, in combination (a) means for receiving speech and music electrically from the central station aforesaid; (b) a changing-picture projecting machine, acting to show its pictures for periods of time that are ordinarily greater than the period of visual persistence, in contradistinction to a motion picture machine; (c) a film for said projecting machine, controlled from the central station aforesaid, said film having a series of changing pictures, in natural colors, thereon, in contradistinction to motion pictures, the pictures on said film being, for the most part, substantially different one from another, and being adapted to stand in the gate and to show on the screen ordinarily each for a period of time that is much greater than the period of visual persistence, so that a relatively small number of pictures, as compared with motion pictures, is made to illustrate a subject, and to show it in natural colors; (d) means for protecting said film from the heat of the projection lamp so that said film can stand in the rays of said lamp for periods of time much longer than the period of visual persistence, without damage; (e) an electrical device, connected with the changing-picture projecting machine aforesaid, adapted to be operated electrically from the central station aforesaid, and serving, when so operated, to change the picture in the projecting machine aforesaid; and (C) means connected with the central station aforesaid, serving to operate the electrical device aforesaid, so as to change the pictures in the projecting machine aforesaid, as required, and at intervals of time that are ordinarily longer than the period of visual persistence.

62. In a system for producing visual effects at a plurality of dependent stations simultaneously, by means of pictures, controlled from a central station, in which system the changes of the pictures at the dependent stations are effected by a control, exerted electrically from the central station, and for the very purpose of effecting such picture changes, picture by picture, each picture as required, the combination of (A) a central station; (B) a dependent station having (a) a picture-exhibiting machine, acting to exhibit its pictures for intervals of time that are ordinarily longer than the period of visual persistence; said picture-exhibiting machine having picture-changing means connected with it; (b) an electromagnet for operating said picture-changing means; (c) an electrical wave-receiving device for receiving radio waves from the central station aforesaid; (d) a vacuum-tube amplifier for amplifying the radio waves thus received; and (e) a rectifier fed from the amplifier aforesaid; said rectifier serving to feed the picture-changing electro-magnet aforesaid; so that the pictures in the picture-exhibiting machine aforesaid are changed, picture by picture, each picture as required, in accordance with radio waves sent out from the central station aforesaid for the very purpose of effecting such picture change.

63. In a system for producing visual effects to illustrate a dramatic work at a plurality of places simultaneously, the combination of (A) a central station and means connected therewith serving to distribute picture-changing electrical impulses from time to time, as required; and (B) a dependent station having (a) a picture film for illustrating a dramatic work, said film being provided with perforations for feeding it through a projection machine, said film having a series of changing-pictures, as before described, in contradistinction to motion pictures, the series of changing pictures aforesaid being much less numerous than motion pictures for the same time of showing; the several pictures of the series serving to show scenes, acts and incidents of the drama, said pictures being adapted to show on the screen for much greater periods of time than the time of visual persistence; (b) a picture-projecting machine, adapted to display the pictures on the film aforesaid for intervals of time in general much greater than the period of visual persistence; said projecting machine having (I) a projection lamp; (II) suitable lenses; (III) a film-feeding device; and (IV) means for protecting the film aforesaid, where it stands in the gate, from the heat of the projection lamp, while admitting the light from said lamp to the film aforesaid; and (c) an electrical device that is normally inactive but which is responsive to and operated by the picture-changing electrical impulses which are distributed from the central station aforesaid, and serving, when thus operated, to operate the film-feeding device aforesaid; so that the feeding of the pictures at the dependent station is effected, from time to time, picture by picture, as required, by a control exerted electrically from the central station aforesaid.

64. In a system for producing a dramatic work both audibly and visually at a plurality of places simultaneously, the combination of (A) a central station and means connected therewith, serving to distribute speech and music electrically to dependent stations, and means serving also to distribute picture-changing electrical impulses to said dependent stations from time to time, as required; (B) a dependent station having (a) means for receiving speech and music electrically from the central station aforesaid; (a') a picture film for illustrating a dramatic work, said film being provided with perforations for feeding it through a projection machine, said film having a series of changing-pictures, as before described, in contradistinction to motion pictures, the series of changing pictures aforesaid being much less numerous than motion pictures for the same time of showing; the several pictures of the series serving to show scenes, acts and incidents of the drama, said pictures being adapted to show on the screen for much greater periods of time than the time of visual persistence; (b) a picture-projecting machine, adapted to display the pictures on the film aforesaid for intervals of time in general much greater than the period of visual persistence; said projecting machine having (I) a projection lamp; (II) suitable lenses; (III) a film-feeding device; and (IV) means for protecting the film aforesaid, where it stands in the gate, from the heat of the projection lamp, while admitting the light from said lamp to the film aforesaid; and (c) an electrical device that is normally inactive but which is responsive to and operated by the picture-changing electrical impulses which are distributed from the central station aforesaid, and serving, when thus operated, to operate the film-feeding device aforesaid; so that the feeding of the pictures at the dependent station is effected, from time to time, picture by picture, as required, by a control exerted electrically from the central station aforesaid.

65. The method of producing a dramatic work audibly and visually on the premises of a plurality of subscribers simultaneously, which consists in (a) distributing electrically from a central station, the words of the dramatic work aforesaid; (b) reproducing those words electrically on the subscriber's premises; and (c) displaying, on the subscriber's premises a series of changing-pictures in contradistinction to motion-pictures, suitable to produce visual effects belonging to the dramatic work aforesaid and ordinarily displaying each picture for a period of time substantially greater than the period of visual persistence; and (d) changing the pictures on the subscriber's premises from time to time and in response to a control impulse from the central station, to suit the words that are distributed from said central station electrically.

66. The method of producing simultaneously on the premises of subscribers sound effects and pictures relevant thereto, wherein one or more dependent stations are equipped with sound-effect-receiving and reproducing means and electro-magnetic picture-changing means, said method comprising transmitting a carrier modulated by sound signals, transmitting another carrier modulated by temporally controlled impulses, receiving and demodulating the signal from the first carrier, receiving and rectifying the impulses of the second carrier, and impressing said impulses on the picture-changing electro-magnetic means, so as to change the pictures at desired and controllable intervals and appropriately to the sound effects.

67. In a system for producing at a plurality of receiving stations sound effects and synchronized pictures, in combination with a broadcasting station equipped to broadcast sound effects, means at each receiving station for receiving and audibly producing the broadcast sound effects, a picture-projecting machine at each receiving station constructed and arranged to project a series of individual pictures in variably timed individual sequence, each projecting machine including operating means for so projecting the pictures in the desired timed sequence to conform them to the broadcast sound effects, each succeeding picture being projected in response to a remotely originating projection-control impulse, means at each receiving station for receiving such impulses, and for responsively actuating said operating means, and shutter means for the projecting machines automatically operable responsively to said impulses to obscure the light beam between successive picture projections.

68. In a system for producing at a plurality of receiving stations sound effects and synchronized pictures, in combination with a broadcasting station equipped to broadcast sound effects, means at each receiving station for receiving and audibly producing the broadcast sound effects, a picture-projecting machine at each receiving station constructed and arranged to project a series of individual pictures in variably timed individual sequence, each projecting machine including operating means for so projecting the pictures in the desired timed sequence to conform them to the broadcast sound effects, each succeeding picture being projected in response to a remotely originating projection-control impulse, means at each receiving station for receiving such impulses, and for responsively actuating said operating means, and said operating means comprising film pay-off mechanism, cooperating film pull-through mechanism, and electro-magnetic means for actuating said mechanisms responsively to said impulses.

69. In a system for producing at a plurality of receiving stations sound effects and synchronized pictures, in combination with a broadcasting station equipped to broadcast sound effects, means at each receiving station for receiving and audibly producing the broadcast sound effects, a picture-projecting machine at each receiving station constructed and arranged to project a series of individual pictures in variably timed individual sequence, each projecting machine including operating means for so projecting the pictures in the desired timed sequence to conform them to the broadcast sound effects, each succeeding picture being projected in response to a remotely originating projection-control impulse, means at each receiving station for receiving such impulses, and for responsively actuating said operating means, and said operating means comprising film pull-through mechanism, electro-magnetic means for actuating said mechanism responsively to said impulses, and cooperating means for relieving the film to eliminate undue stress thereon by the pull-through mechanism.

70. In a system for producing at a plurality of receiving stations sound effects and synchronized pictures, in combination with a broadcasting station equipped to broadcast sound effects, means at each receiving station for receiving and audibly producing the broadcast sound effects, a picture-projecting machine at each receiving station constructed and arranged to project a series of individual pictures in variably timed individual sequence, each projecting machine including operating means for so projecting the pictures in the desired timed sequence to conform them to the broadcast sound effects, each succeeding picture being projected in response to a remotely originating projection-control impulse, means at each receiving station for receiving such impulses, and for responsively actuating said operating means, and said operating means comprising film pull-through mechanism, electromagnetic means for actuating said mechanism responsively to said impulses, and film-protecting means associated with the gate of each projecting machine to protect the film against undue heating and whereby any given picture may stand in the gate for intervals between successive projection-control impulses exceeding to any desired extent the period of visual persistence.

71. In a system for producing at a plurality of receiving stations sound effects and synchronized pictures, in combination with a broadcasting station equipped to broadcast sound effects, means at each receiving station for receiving and audibly producing the broadcast sound effects, a picture-projecting machine at each receiving station constructed and arranged to project a series of individual pictures in variably timed individual sequence, remotely-located means for also broadcasting picture-projection control impulses in timed relation to the sound effects, each projecting machine including operating means for so projecting the pictures in the desired timed sequence to conform them to the broadcast sound effects, each succeeding picture being projected in response to a remotely originating projection-control impulse, means at each receiving station for receiving such impulses, and for responsively actuating said operating means, means affording audibility of the sound effects at the location of said means for broadcasting the picture-projection control impulses, a visual record viewable at said impulse-control location informing as to the sound effects to be broadcast and including indicia pertinent to the order and timing of the synchronously corresponding picture or pictures, and a picture-projecting machine also at said impulse-control location, the film projected thereat having at the appropriate intervals along its indicia corresponding to those on said visual record.

72. In a system for producing at a plurality of receiving stations sound effects and synchronized pictures, in combination with a broadcasting station equipped to broadcast sound effects, means at each receiving station for receiving and audibly producing the broadcast sound effects, a picture-projecting machine at each receiving station constructed and arranged to project a series of individual pictures in variably timed individual sequence, remotely-located means for also broadcasting picture-projection control impulses in timed relation to the sound effects, means at each receiving station for receiving said control impulses, and associated means at the receiving stations operable responsively to said control impulses to project the individual pictures sequentially at intervals between succeeding pictures as dictated by said control impulses thereby to conform the picture projection to the sound effects.

73. A system for distributing electrically sound effects and synchronized picture control from a source station or stations to one or more receiving localities, comprising, in combination, means at a source station for transmitting electrical vibrations corresponding to the desired sound effects, apparatus at each receiving locality for receiving and translating said vibrations into sound effects audible thereat, a light-beam apparatus at each receiving locality for projecting pictures from a picture-carrying medium, mechanism associated with each projecting apparatus for relatively shifting the picture-carrying medium and light beam to change the pictures projected, intermittent actuating means for said mechanism arranged to accomplish at each actuation a predetermined relative shifting of said picture-carrying medium and light beam, means for transmitting from a source station a timed series of electrical impulses, and means at each receiving locality to receive said impulses and to cause them to effect a like-timed series of actuations of said actuating means.

THADDEUS CAHILL.